United States Patent
Naruse

(10) Patent No.: US 12,141,958 B2
(45) Date of Patent: Nov. 12, 2024

(54) IMAGE MEASUREMENT APPARATUS

(71) Applicant: Keyence Corporation, Osaka (JP)

(72) Inventor: Takashi Naruse, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 66 days.

(21) Appl. No.: 18/122,751

(22) Filed: Mar. 17, 2023

(65) Prior Publication Data

US 2023/0368362 A1    Nov. 16, 2023

(30) Foreign Application Priority Data

May 12, 2022   (JP) ................................ 2022-078535

(51) Int. Cl.
| | |
|---|---|
| G06T 7/00 | (2017.01) |
| G06T 7/13 | (2017.01) |
| G06T 7/60 | (2017.01) |
| G06T 7/73 | (2017.01) |

(52) U.S. Cl.
CPC .............. *G06T 7/0006* (2013.01); *G06T 7/13* (2017.01); *G06T 7/60* (2013.01); *G06T 7/74* (2017.01); *G06T 2200/24* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 9,835,433 B1* | 12/2017 | Antreasyan | G01B 11/007 |
| 10,088,301 B2 | 10/2018 | Naruse et al. | |
| 10,088,302 B2 | 10/2018 | Takahashi et al. | |
| 10,846,881 B2 | 11/2020 | Hashimoto et al. | |
| 11,024,049 B2 | 6/2021 | Hashimoto et al. | |
| 2020/0302642 A1* | 9/2020 | Hashimoto | H04N 5/445 |
| 2022/0028106 A1* | 1/2022 | Jacot | G01B 11/24 |

FOREIGN PATENT DOCUMENTS

| | | |
|---|---|---|
| JP | 2004294311 A | 10/2004 |
| JP | 2006234737 A | 9/2006 |

OTHER PUBLICATIONS

U.S. Appl. No. 18/122,752, filed Mar. 17, 2023 (128 pages).

* cited by examiner

*Primary Examiner* — Rebecca A Volentine
(74) *Attorney, Agent, or Firm* — Kilyk & Bowersox, P.L.L.C.

(57) ABSTRACT

A first contact target position, a second contact target position, and a characteristic pattern for specifying a position and a posture of the workpiece are set in association with each other. First and second contact target positions for measurement are specified from a workpiece image newly generated during the execution of measurement such that a driving section is controlled to bring the touch probe into contact with the side surface of the workpiece with the specified first contact target position for measurement as a reference, and the driving section is controlled to bring the touch probe into contact with the upper surface of the workpiece with the specified second contact target position for measurement as a reference. Three-dimensional coordinates of a contact point are measured based on a contact signal output when the touch probe comes into contact with the workpiece.

15 Claims, 31 Drawing Sheets

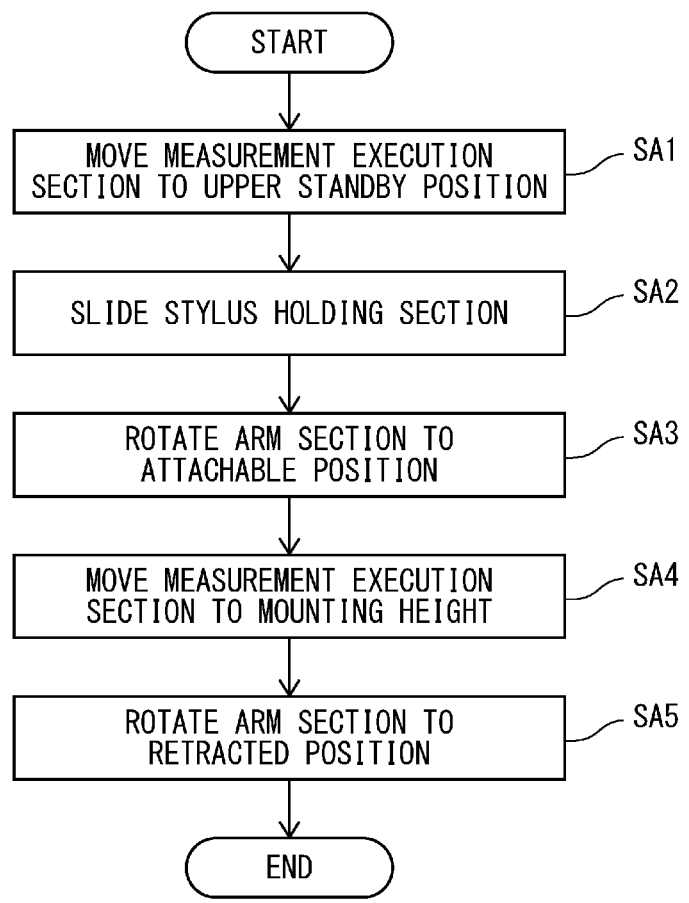

TOUCH PROBE MEASUREMENT OPERATION

IMAGE MEASUREMENT APPARATUS

CROSS-REFERENCE TO RELATED APPLICATIONS

The present application claims foreign priority based on Japanese Patent Application No. 2022-078535, filed May 12, 2022, the contents of which are incorporated herein by reference.

BACKGROUND OF THE INVENTION

1. Field of the Invention

The disclosure relates to an image measurement apparatus that displays a workpiece image and measures three-dimensional coordinates of the workpiece using a touch probe.

2. Description of Related Art

Conventionally, there has been known a three-dimensional measurement apparatus in which a workpiece is placed on a stage and a probe is brought into contact with a desired point on a surface of the workpiece on the stage to measure three-dimensional coordinates of the point with which the probe is brought into contact (see, for example, JP 2006-234737 A and JP 2004-294311 A).

In JP 2006-234737 A, prior to execution of coordinate measurement, a tip of a probe is brought into contact with three predetermined reference points on a surface of a workpiece, and reference coordinates having three-dimensional coordinates of the three reference points as coordinate home positions are set from outputs of a position sensor during contact. That is, when the tip of the probe is brought into contact with three points of a first reference point, a second reference point, and a third reference point, the first reference point is set as a coordinate home position, an axis passing through coordinates of the first reference point and the second reference point is set as an X axis, and an axis passing through coordinates of the first reference point and the third reference point is set as a Y axis. As a result, a dimension and the like can be measured with high accuracy regardless of a position and a posture of the workpiece.

Further, in JP 2004-294311 A, a camera capable of capturing an image of a workpiece is mounted separately from a probe.

A measurement site of the probe can be set on a workpiece image acquired by capturing the image the workpiece by the camera.

Meanwhile, in JP 2006-234737 A, when the reference coordinates are set prior to the execution of the coordinate measurement, an operation of sequentially bringing the probe into contact with the plurality of reference points of the workpiece is required, but this operation is a troublesome and requires time and effort for a user.

Further, the measurement point of the probe can be set on the workpiece image in JP 2004-294311 A, but this is for enabling setting of the measurement site even for a fine workpiece that is difficult to observe with naked eyes, and it is necessary to set reference coordinates prior to execution of coordinate measurement similarly to JP 2006-234737 A. That is, for example, at the time of continuous measurement in which three-dimensional coordinates of a plurality of workpieces of the same type are sequentially measured, it is necessary to perform an operation of moving the probe to set reference coordinates every time each of the workpieces is placed on a stage, which is troublesome and requires time and effort, and hinders easy execution of the measurement.

SUMMARY OF THE INVENTION

The disclosure has been made in view of the above points, and an object thereof is to enable easy execution of measurement when three-dimensional coordinates on a workpiece surface are measured using a touch probe.

According to one embodiment of the disclosure, an image measurement apparatus includes: a light projecting section which irradiates a workpiece on a stage with detection light; an imaging section which receives the detection light and generates a workpiece image; a touch probe which outputs a contact signal when coming into contact with the workpiece on the stage; a driving section which moves at least one of the stage and the touch probe with respect to the other to bring the touch probe into contact with the workpiece placed on the stage; and a display section which displays the workpiece image generated by the imaging section at the time of measurement setting. When a direction of an imaging axis of the imaging section is defined as a Z axis, a direction orthogonal to the Z axis is defined as an X axis, and a direction orthogonal to the Z axis and orthogonal to the X axis is defined as a Y axis, it is possible to set, on the workpiece image displayed on the display section, a first contact target position serving as a reference for bringing the touch probe into contact with a side surface of the workpiece in XY directions, a second contact target position serving as a reference for bringing the touch probe into contact with an upper surface of the workpiece in a Z direction, and a characteristic pattern for specifying a position and a posture of the workpiece at the time of measurement execution in association with each other. The set characteristic pattern, a relative positional relationship between the first and second contact target positions with respect to the characteristic pattern, and a fixed positional relationship between the imaging section and the touch probe can be stored in a storage section. It is possible to specify a position and a posture of the characteristic pattern stored in the storage section from a workpiece image newly generated for measurement by the imaging section at the time of measurement execution and to specify first and second contact target positions for measurement based on the specified position and posture, and the relative positional relationship and the fixed positional relationship stored in the storage section. It is possible to control the driving section to bring the touch probe into contact with the side surface of the workpiece with the specified first contact target position for measurement as a reference, control the driving section to bring the touch probe into contact with the upper surface of the workpiece with the specified second contact target position for measurement as a reference, and to measure three-dimensional coordinates of a contact point at which the touch probe comes into contact with the workpiece based on the contact signal output when the touch probe comes into contact with the workpiece by an operation of the driving section.

That is, at the time of measurement setting, the first contact target position serving as the reference for bringing the touch probe into contact with the side surface of the workpiece and the second contact target position serving as the reference for bringing the touch probe into contact with the upper surface of the workpiece are set on the workpiece image. Furthermore, the characteristic pattern for specifying the position and posture of the workpiece is also set. The relative positional relationship between the first contact target position and the second contact target position with respect to the characteristic pattern and the fixed positional relationship between the imaging section and the touch probe are held in the image measurement apparatus. Thus, when a workpiece image is newly generated at the time of measurement execution, a position and a posture of the workpiece placed on the stage at the time of measurement are specified by applying the characteristic pattern to the workpiece image. Further, the first and second contact target positions for measurement are specified based on the relative positional relationship and the fixed positional relationship. Then, the touch probe comes into contact with the side surface of the workpiece with the specified first contact target position for measurement as the reference, and the touch probe comes into contact with the upper surface of the workpiece with the specified second contact target position for measurement as the reference. The three-dimensional coordinates of the contact point are measured based on the contact signal output at this time. That is, a user does not need to perform an operation of moving the probe to set a reference coordinate each time a workpiece is placed on the stage, and thus, the measurement becomes simple.

According to another embodiment of the disclosure, an edge measurement element to be used for image measurement is extracted on the workpiece image at the time of setting the first and second contact target positions, and the first and second contact target positions can be set in association with the extracted edge measurement element.

Further, at the time of measurement execution, it is possible to specify an edge measurement element by executing a pattern search on a workpiece image newly generated for measurement. In this case, an edge can be extracted from the specified edge measurement element, and the first contact target position can be specified based on the extracted edge.

Further, when a setting section sets the first contact target position, it is possible to set a position in the XY directions on the workpiece image and set a height position in the Z direction.

Further, the setting section can also set path information for causing the touch probe to approach the workpiece from an operation start position included in the first contact target position.

Further, the image measurement apparatus may include: a base that supports the stage to be movable in a horizontal direction; and a support section that is connected to the base and supports the imaging section above the stage. In this case, the first and second contact target positions can be set based on absolute coordinates in a three-dimensional space surrounded by the stage, the support section, and the imaging section.

Further, in a case where the workpiece on the stage is located outside a visual field range of the imaging section, it is also possible to control the driving section to move the stage in the XY directions until the workpiece enters the visual field range of the imaging section, and cause the imaging section to capture an image of the workpiece entering the visual field range when the workpiece enters the visual field range. In a case where a workpiece is larger than the visual field range, it is also possible to cause the stage to be moved in the XY directions such that another part of the workpiece enters the visual field range of the imaging section after imaging is performed for the first time, and then, cause the imaging section to capture an image of the another part of the workpiece entering the visual field range. A connected image, obtained by connecting a plurality of the images acquired by performing imaging a plurality of times in this manner, may be used as the workpiece image, and the position and posture of the characteristic pattern can be specified from the connected image obtained by connecting the plurality of images.

Further, at the time of measurement execution, a bird's-eye view image acquired by imaging the entire workpiece using the imaging section or another imaging section may be displayed on the display section. It is also possible to receive designation of a search region by the user on the bird's-eye view image displayed on the display section, and specify the position and posture of the characteristic pattern by narrowing down to the search region designated by the user.

Further, at the time of measurement execution, it is also possible to cause the display section to display an image, acquired by capturing the workpiece using the imaging section or another imaging section, and perform ghost display of a preset search region on the display section to guide the workpiece to be placed at an appropriate position on the stage. The image to be displayed on the display section at this time can be a plan-view image of the stage viewed from above, and thus, accurate alignment can be performed.

Since the first and second contact target positions for measurement are specified based on the position and posture of the characteristic pattern specified from the workpiece image, the relative positional relationship between the target position at which the touch probe is brought into contact with the side surface of the workpiece and the target position at which the touch probe is brought into contact with the upper surface of the workpiece, and the fixed positional relationship between the imaging section and the touch probe such that the touch probe is brought into contact with the side surface and the upper surface of the workpiece with the specified target positions for measurement as the references as described above, when three-dimensional coordinates on a surface of the workpiece are measured using the touch probe, the measurement can be easily performed.

BRIEF DESCRIPTION OF THE DRAWINGS

FIG. 13 is a flowchart illustrating an example of a stylus mounting procedure;

DETAILED DESCRIPTION OF PREFERRED EMBODIMENTS

Hereinafter, embodiments of the present invention will be described in detail with reference to the drawings. Note that the following preferred embodiments are described merely as examples in essence, and there is no intention to limit the present invention, its application, or its use.

Figure 1:
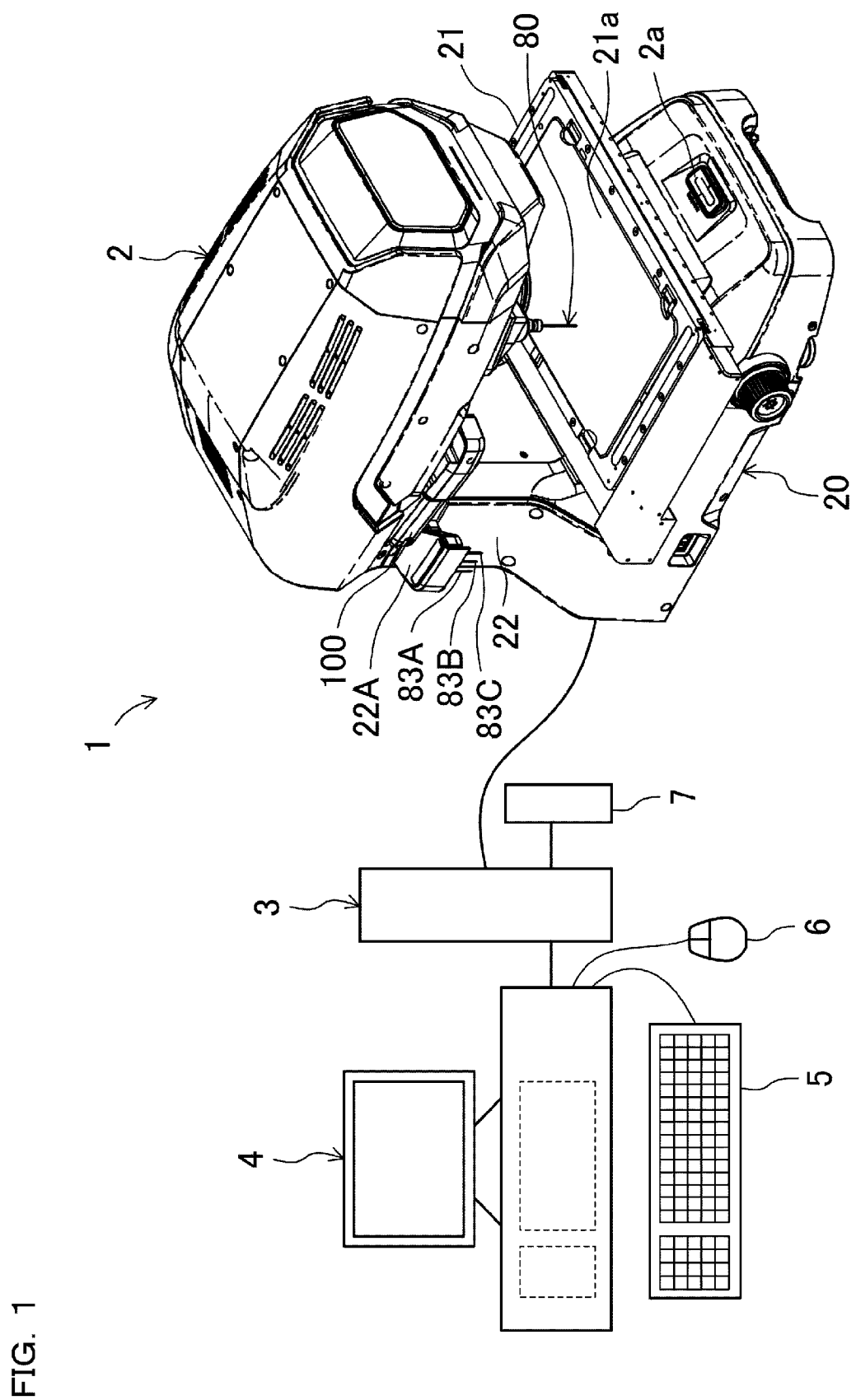
FIG. 1 is a diagram illustrating an overall configuration of an image measurement apparatus according to an embodiment of the present invention.

FIG. 1 is a diagram illustrating an overall configuration of an image measurement apparatus 1 according to an embodiment of the present invention. The image measurement apparatus 1 includes an apparatus body 2, a control unit 3 configured using a personal computer or the like, and a display section 4, and is configured to be capable of performing arithmetic processing on data, acquired by the apparatus body 2, in the control unit 3 to measure a dimension of each portion of a workpiece W, and also executing quality determination or the like of a measurement result as necessary. The control unit 3 may be incorporated in and integrated with the apparatus body 2. Although details will be described later, the data acquired by the apparatus body 2 includes data on a contact point when a touch probe 80, which will be described later, comes into contact with the workpiece W, data measured by a non-contact displacement meter 70 (illustrated in FIG. 3), and the like in addition to image data of the workpiece W.

The display section 4 displays, for example, various setting screens, image data, a measurement result, and the like. The display section 4 includes, for example, a liquid crystal display, an organic EL display, or the like. The display section 4 is illustrated as a separate member from the apparatus body 2 and the control unit 3 in the present example, but may be incorporated in the apparatus body 2 or the control unit 3 without being limited thereto.

The image measurement apparatus 1 further includes a keyboard 5, a mouse 6, and the like as operation devices for a user. The operation device is not limited to the keyboard 5 and the mouse 6, and may be a touch panel operation device or the like. For example, the control unit 3 can also be configured using a laptop personal computer, and in this case, the keyboard 5 and the mouse 6 are provided in a form of being integrated with the control unit 3 together with the display section 4.

The image measurement apparatus 1 further includes a storage section 7. The storage section 7 can be configured using, for example, a hard disk drive, a solid-state drive, or the like, and is a part that stores various types of data acquired by the apparatus body 2, information set by the user, an image, a measurement result, a quality determination result, and the like. The storage section 7 may be built in the control unit 3 or may be provided outside the control unit 3. In a case where the storage section 7 is provided outside the control unit 3, the storage section 7 may be, for example, a cloud storage or the like connected via a communication line such as the Internet.

(Configuration of Apparatus Body 2)

Figure 2:
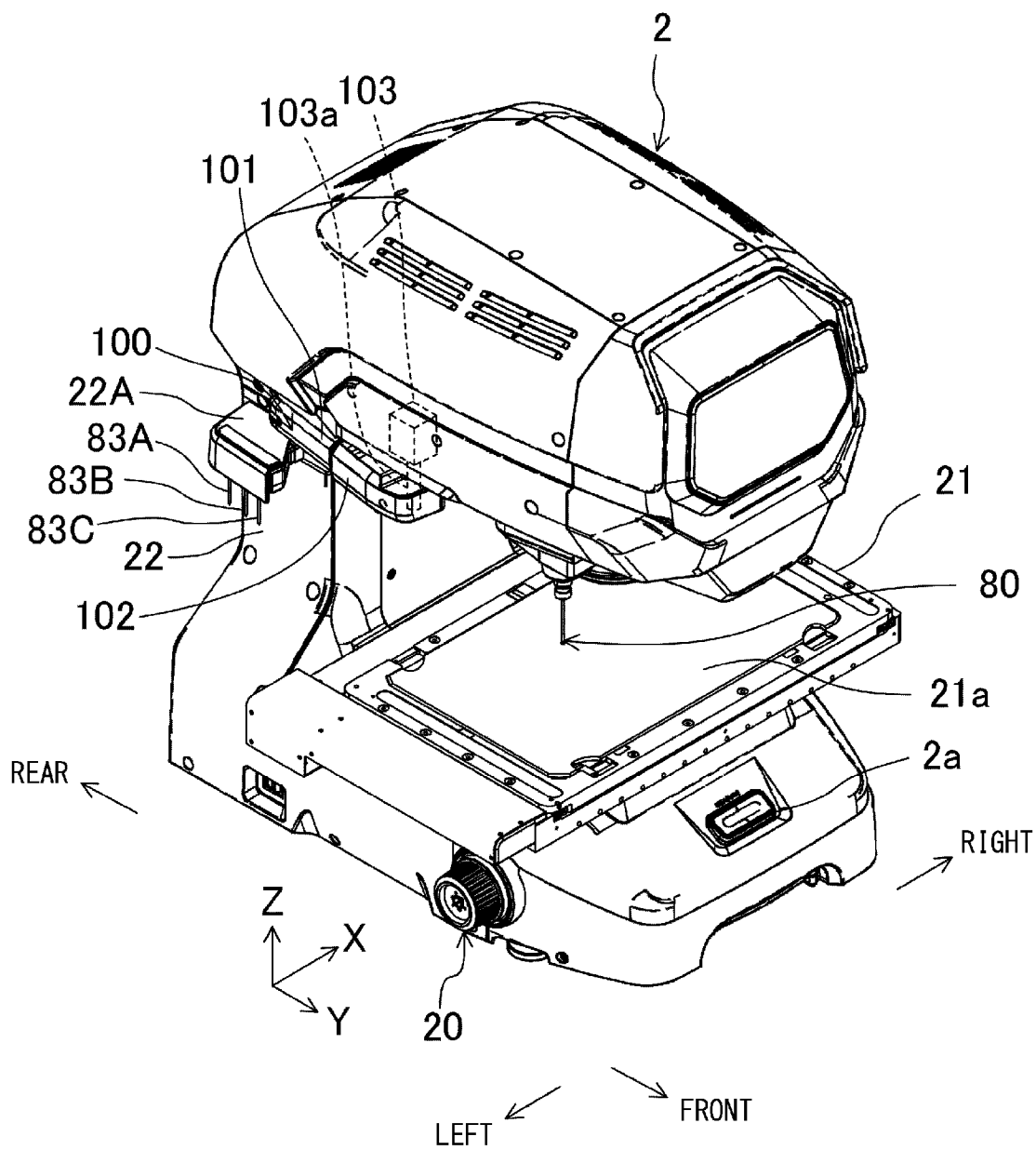
FIG. 2 is a perspective view of an apparatus body as viewed from above.

As illustrated in FIG. 2, the apparatus body 2 includes a base 20 and a stage 21 that is horizontally movable with respect to the base 20. Note that the stage 21 is movable up and down. In the vicinity of the central portion of the stage 21, a placement table 21a made of a member that transmits light, such as glass, is provided, and the workpiece W can be placed on the placement table 21a. The stage 21 is supported by the base 20 so as to be movable in the horizontal direction (an X direction which is a width direction of the apparatus body 2 and a Y direction which is a depth direction of the apparatus body 2). That is, the apparatus body 2 includes an XY-direction driving section 23 (schematically illustrated in FIGS. 3 and 4) that drives the stage 21, and the XY-direction driving section 23 can move the stage 21 within a predetermined range in the X direction and within a predetermined range in the Y direction. Not only the stage 21 is linearly moved in the X direction and linearly moved in the Y direction but also the stage 21 can be moved such that a movement trajectory is inclined with respect to an X axis and a Y axis in plan view, or the stage 21 can be moved so as to draw an arbitrary curve.

The XY-direction driving section 23 includes an X-direction linear scale 23a configured to detect a movement distance in the X direction and a Y-direction linear scale 23b configured to detect a movement distance in the Y direction. The X-direction linear scale 23a enables detection of a position and the movement distance of the stage 21 in a left-right direction. The Y-direction linear scale 23b enables detection of a position and the movement distance of the stage 21 in the depth direction.

The XY-direction driving section 23 is controlled by the control unit 3. The XY-direction driving section 23 is controlled based on a control signal output from the control unit 3, a current position of the stage 21 is determined based on detection signals of the X-direction linear scale 23a and the Y-direction linear scale 23b, the stage 21 is moved to a desired position, and the stage 21 is moved so as to draw a desired movement trajectory.

Although a Z direction is referred to as an up-down direction or a height direction, the X direction is referred to as the left-right direction, and the Y direction is referred to as a front-rear direction in the description of the present embodiment, this is for convenience of the description and does not limit a posture of the apparatus body 2 during use. Further, the user is usually on the front side of the apparatus body 2 in many cases, a side of the apparatus body 2 closer to the user is simply referred to as the front, a side opposite to the user is simply referred to as the rear, a right side as viewed from the user is simply referred to as the right side, and a left side as viewed from the user is simply referred to as the left side.

Figure 3:
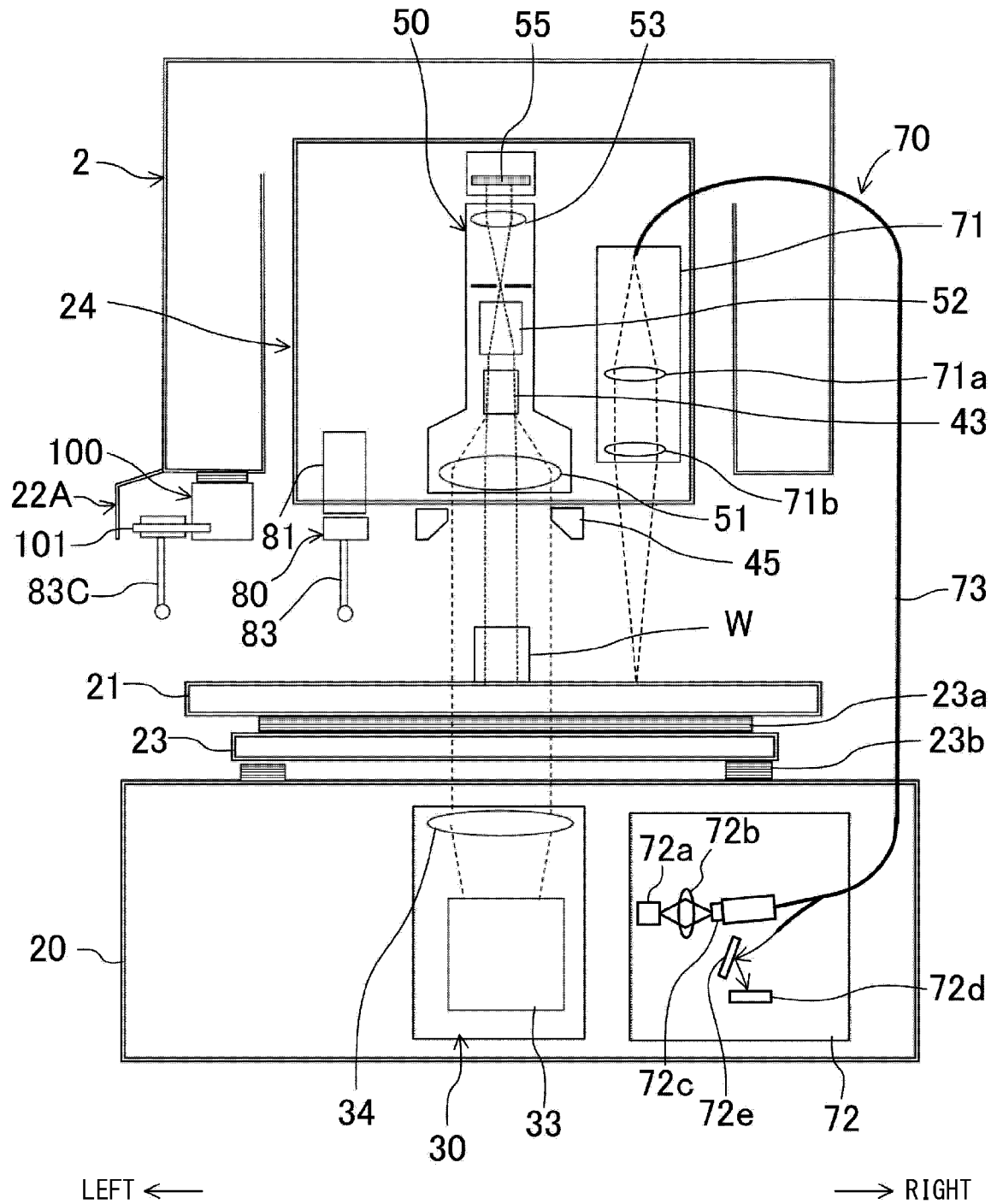
FIG. 3 is a schematic view of the apparatus body as viewed from the front side.
Figure 4:
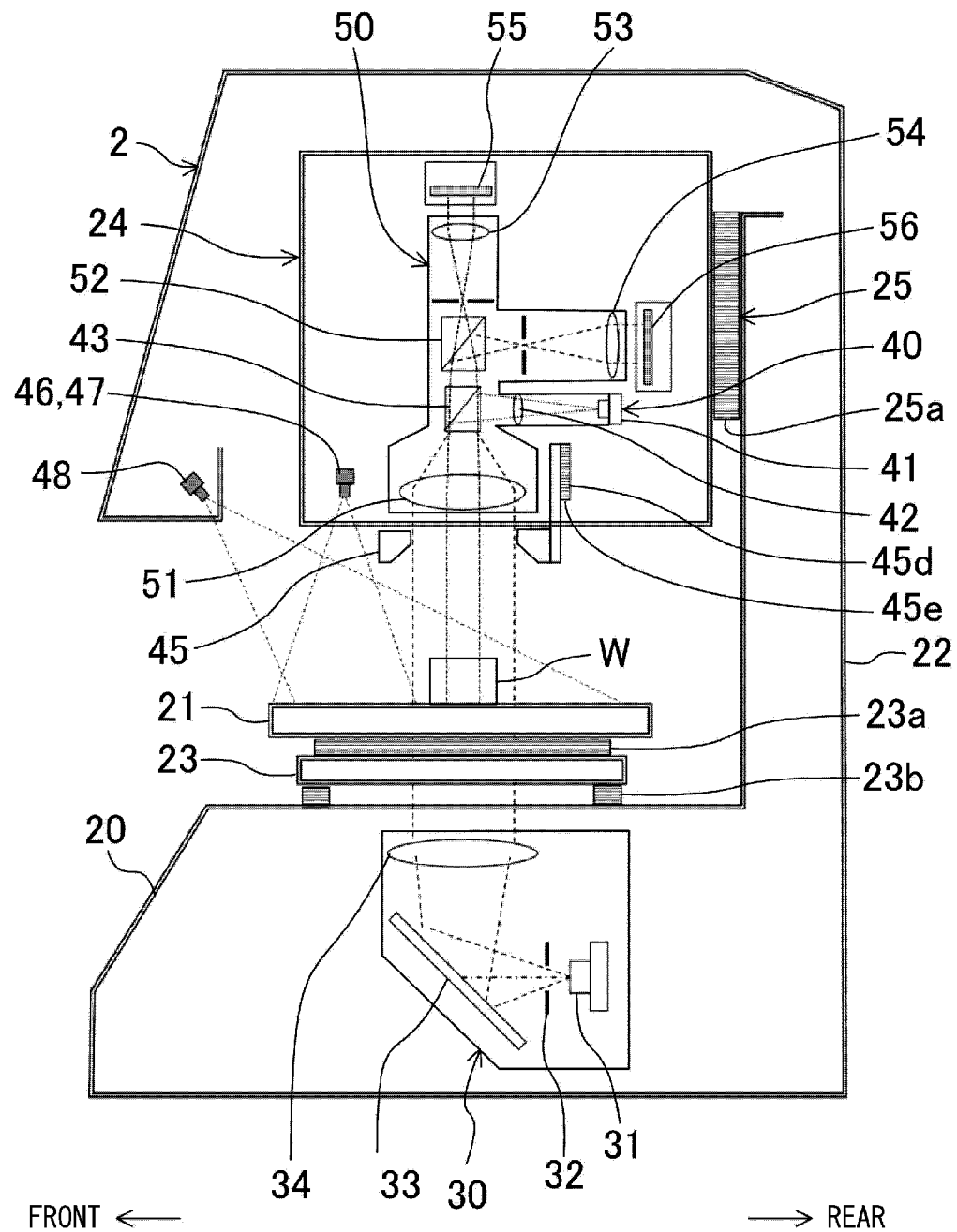
FIG. 4 is a schematic view of the apparatus body as viewed from the lateral side.

As illustrated in FIGS. 3 and 4, a transmission illumination 30 as a light projecting section is provided in a lower part of the base 20 below the stage 21. As illustrated in FIG. 4, the transmission illumination 30 includes: a transmission illumination light emitter 31 having, for example, a light emitting diode or the like; a slit 32 through which light emitted from the transmission illumination light emitter 31 is transmitted; a mirror 33 configured to direct the light transmitted through the slit 32 upward; and a lens 34 on which the light directed upward by the mirror 33 is incident. The lens 34 is a lens capable of emitting the incident light as parallel light. The light emitted from the lens 34 is directed to the placement table 21a of the stage 21, is transmitted through the placement table 21a, and is emitted to the workpiece W placed on the placement table 21a from below.

As illustrated in FIG. 2, a measurement start button 2a is provided on the front side of the base 20 of the apparatus body 2. The measurement start button 2a is a button configured to be operated by the user at the time of starting the measurement of the workpiece W. A measurement operation is executed only by pressing the measurement start button 2a once at the time of executing the measurement.

The apparatus body 2 includes a support section 22 and a measurement execution section 24. As illustrated in FIGS. 3 and 4, the support section 22 is connected to a rear part of the base 20 and extends upward from the rear part of the base 20. The measurement execution section 24 is supported by an upper part of the support section 22. The measurement execution section 24 is provided with a coaxial epi-illumination 40, a ring illumination 45, an imaging section 50, a non-contact displacement meter 70, a housing 81 of the touch probe 80, and the like.

The measurement execution section 24 is configured separately from the support section 22, and is movable in the Z direction with respect to the support section 22. That is, the apparatus body 2 includes a Z-direction driving section 25 that drives the measurement execution section 24, and the measurement execution section 24 is linearly movable from an ascending end position to a descending end position by the Z-direction driving section 25. An imaging axis of the imaging section 50 coincides with the Z axis, and thus, the imaging axis extends in the Z direction. The measurement execution section 24 is an example of a movable unit that moves along an imaging axis of the imaging section 50.

The Z-direction driving section 25 includes a Z-direction linear scale 25a configured to detect a movement distance in the Z direction, and the Z-direction linear scale 25a can detect a height of the measurement execution section 24, the movement distance in the height direction, and the like. The Z-direction driving section 25 is controlled by a control section 3d included in the control unit 3. The control section 3d controls the Z-direction driving section 25 by a control signal, determines a current position of the measurement execution section 24 based on a detection signal of the Z-direction linear scale 25a, and moves the measurement execution section 24 to a desired position. A moving speed of the measurement execution section 24 can be changed in a plurality of stages or continuously.

The coaxial epi-illumination 40 is a light projecting section, and includes a coaxial epi-illumination light emitter 41 having, for example, a light emitting diode or the like, a lens 42 on which light emitted from the coaxial epi-illumination light emitter 41 is incident, and a direction conversion member 43 that directs the light emitted from the lens 42 downward as illustrated in FIG. 4. The direction conversion member 43 is configured using a light transmitting member capable of transmitting light in the up-down direction. The light emitted from the direction conversion member 43 is detection light. The detection light emitted from the direction conversion member 43 is directed to the placement table 21a of the stage 21, and is emitted from above to the workpiece W placed on the placement table 21a, that is, the workpiece W on the stage 21.

The imaging section 50 includes a light receiving lens 51, a beam splitter 52, a high-magnification-side image forming lens 53, a low-magnification-side image forming lens 54, a high-magnification-side imaging element 55, and a low-magnification-side imaging element 56, and these constitute a first imaging section. The imaging section 50 is supported by the support section 22 in a posture with an imaging direction being a normal direction of the stage 21 (the Z direction) above the stage 21.

Figure 5:
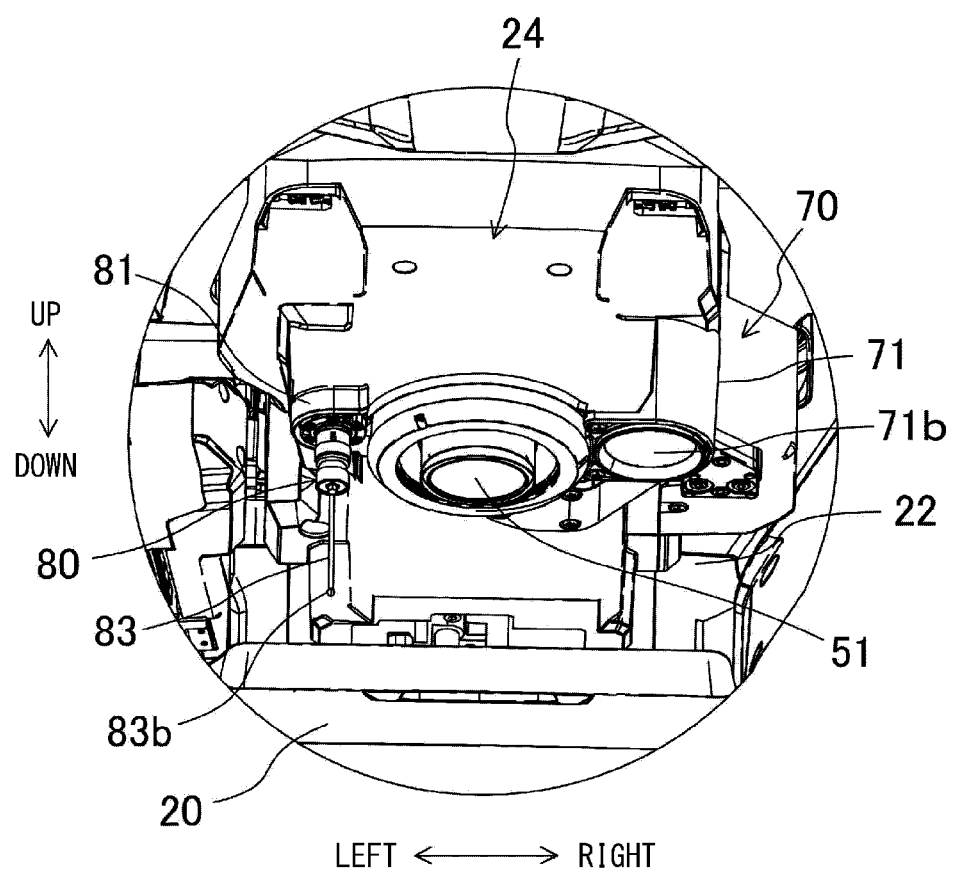
FIG. 5 is a perspective view of a light receiving lens and the vicinity thereof as viewed obliquely from below.

Specifically, as also illustrated in FIG. 5, the light receiving lens 51 of the imaging section 50 is disposed on a lower surface of the measurement execution section 24, and is positioned such that a light receiving surface faces an upper surface of the placement table 21a of the stage 21. Therefore, detection light emitted from the coaxial epi-illumination 40 and reflected by the surface of the workpiece W can be received by the light receiving lens 51, and light emitted from the transmission illumination 30 can also be received by the light receiving lens 51.

An optical axis of the light receiving lens 51 coincides with the Z direction. In the present example, the direction conversion member 43 of the coaxial epi-illumination 40 is located directly above the light receiving lens 51, and thus, detection light emitted from the coaxial epi-illumination 40 is transmitted through the light receiving lens 51 and emitted to the workpiece W on the stage 21.

The beam splitter 52 is disposed above the direction conversion member 43, and is configured using a prism that causes light emitted upward from the light receiving lens 51 to branch in two directions. As the beam splitter 52, for example, a cube beam splitter or a plate beam splitter can be used. The cube beam splitter is preferable since light passing through the beam splitter is not refracted as compared with the plate beam splitter so that an optical axis does not deviate, and alignment adjustment of a branch angle is easy. In the present example, light incident on the beam splitter 52 via the light receiving lens 51 branches into the upper side and the rear side. Thus, the high-magnification-side image forming lens 53 is disposed on the upper side of the beam splitter 52, and the low-magnification-side image forming lens 54 is disposed on the rear side of the beam splitter 52. Further, the high-magnification-side imaging element 55 is disposed on the upper side of the high-magnification-side image forming lens 53, and light incident on the high-magnification-side image forming lens 53 forms an image on a light receiving surface of the high-magnification-side imaging element 55. Further, the low-magnification-side imaging element 56 is disposed on the rear side of the low-magnification-side image forming lens 54, and light incident on the low-magnification-side image forming lens 54 forms an image on a light receiving surface of the low-magnification-side imaging element 56.

The high-magnification-side imaging element 55 and the low-magnification-side imaging element 56 are configured using a charge-coupled device (CCD) image sensor, a complementary MOS (CMOS) image sensor, and the like. A workpiece image acquired by the low-magnification-side imaging element 56 is a low-magnification image, and a workpiece image acquired by the high-magnification-side imaging element 55 is a high-magnification image having a higher magnification than the low-magnification image. In the present example, each of the high-magnification-side imaging element 55 and the low-magnification-side imaging element 56 is configured using a single-channel imaging element to acquire a high-resolution workpiece image in order to enhance measurement accuracy. Accordingly, the workpiece images output from the high-magnification-side imaging element 55 and the low-magnification-side imaging element 56 become monochrome images (grayscale images).

A focal position of the imaging section 50 is adjusted by the Z-direction driving section 25. That is, the control section 3*d* can move the measurement execution section 24 in the Z direction by controlling the Z-direction driving section 25, but the imaging section 50 can be moved along an imaging axis since the Z direction coincides with a direction of the imaging axis of the imaging section 50. That is, the Z-direction driving section 25 is a focus adjustment mechanism that adjusts the focal position of the imaging section 50, and the focus of the imaging section 50 can be adjusted by the movement of the measurement execution section 24 in the direction along the imaging axis. In the focus adjustment, not only autofocus using an algorithm such as a conventionally known contrast scheme or phase difference scheme but also manual focus in which the user performs a predetermined operation for adjustment is also possible.

The above-described configuration of a bifurcated optical system including the light receiving lens 51 and the beam splitter 52 enables simultaneous acquisition of the high-magnification image and the low-magnification image without mechanically switching the optical system. Note that the configuration of the bifurcated optical system using the beam splitter 52 may be omitted, and a high-magnification lens and a low-magnification lens may be mechanically switched to acquire the high-magnification image and the low-magnification image.

The ring illumination 45 is a light projecting section that irradiates the workpiece W on the stage 21 with monochromatic light (white light) or detection light having a plurality of different wavelengths. Examples of the detection light having the plurality of different wavelengths include red light, green light, and blue light. The ring illumination 45 has a circular shape surrounding the outer periphery of the light receiving lens 51, and is arranged coaxially with the light receiving lens 51 below the light receiving lens 51.

Figure 6:
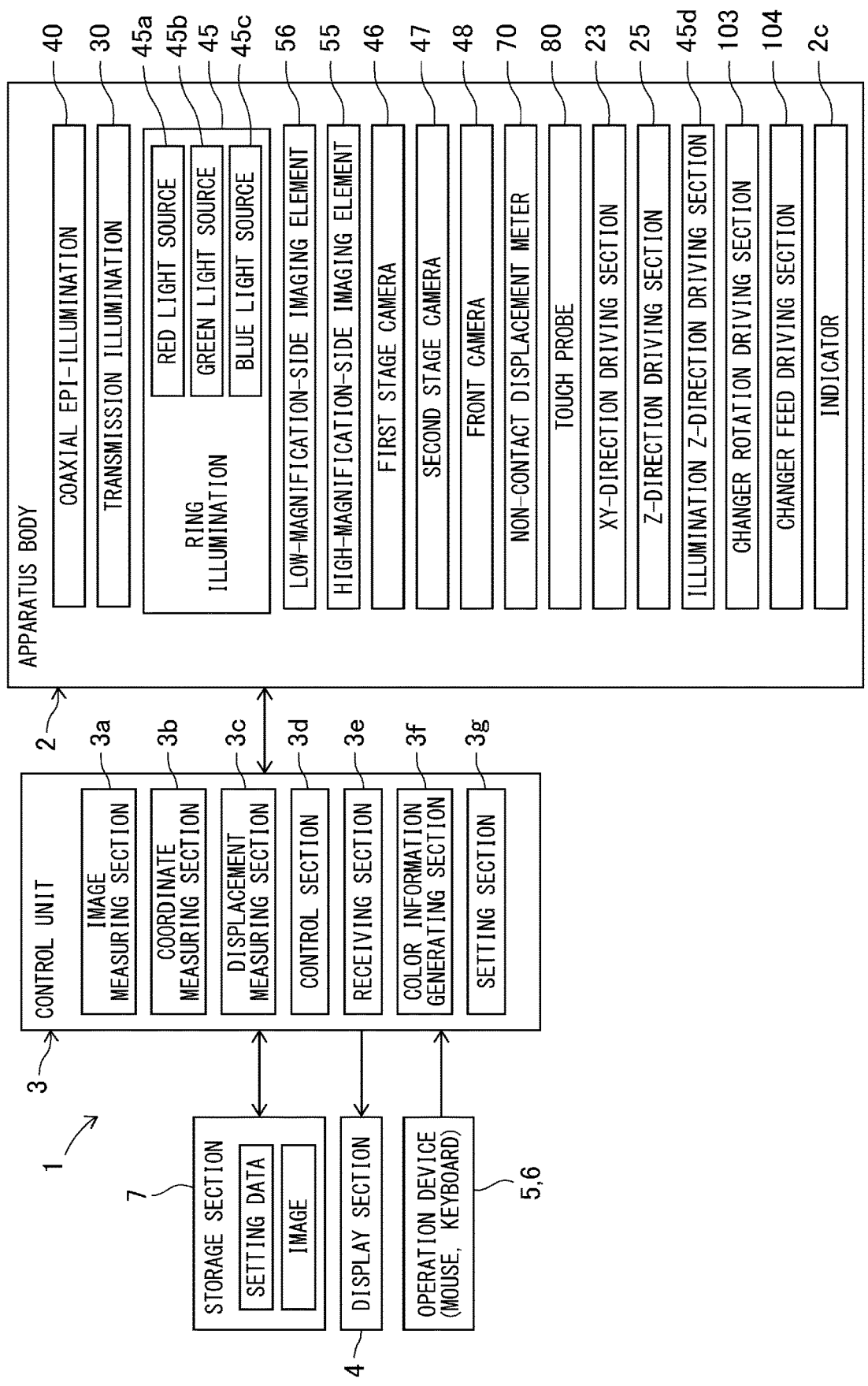
FIG. 6 is a block diagram of the image measurement apparatus.

As illustrated in FIG. 6, the ring illumination 45 includes a red light source 45*a* that emits red light, a green light source 45*b* that emits green light, and a blue light source 45*c* that emits blue light. Each of the red light source 45*a*, the green light source 45*b*, and the blue light source 45*c* is configured using a light emitting diode or the like, and can be individually turned on and off. That is, the workpiece W is illuminated with red light by turning on only the red light source 45*a*, the workpiece W is illuminated with green light by turning on only the green light source 45*b*, the workpiece W is illuminated with blue light by turning on only the blue light source 45*c*, and the workpiece W is illuminated with white light by turning on all of the red light source 45*a*, the green light source 45*b*, and the blue light source 45*c*.

The ring illumination 45 includes an illumination Z-direction driving section 45*d*, and the ring illumination 45 is linearly movable from an ascending end position to a descending end position by the illumination Z-direction driving section 45*d*. As the ring illumination 45 is moved according to a height of the workpiece W, detection light can be emitted from a place close to the workpiece W. The illumination Z-direction driving section 45*d* includes a Z-direction linear scale 45*e* configured to detect a movement distance in the Z direction, and the Z-direction linear scale 45*e* can detection a height of the ring illumination 45, the movement distance in the height direction, and the like. Note that the ring illumination 45 is arranged outside a casing of the measurement execution section 24 in the present embodiment, but the present invention is not limited thereto, and the ring illumination 45 may be arranged inside the housing of the measurement execution section 24.

As illustrated in FIG. 3, the mirror 33 that guides the transmission illumination 30 to the stage 21, the ring illumination 45, the direction conversion member 43 that guides the coaxial epi-illumination 40 to the stage 21, and the imaging section 50 (for example, the high-magnification-side imaging element 55) are arranged substantially linearly in the vertical direction. Then, the ring illumination 45, the direction conversion member 43, and the imaging section 50 are fixed to the casing of the measurement execution section 24 movable up and down to be integrally movable in the Z direction. In addition, in the present embodiment, a housing 81 of the touch probe 80, which will be described later, is also fixed to the casing of the measurement execution section 24 such that the housing 81 is also integrally movable in the Z direction.

The measurement execution section 24 includes a first stage camera 46, a second stage camera 47, and a front camera 48. Since the measurement execution section 24 is provided in the upper part of the support section 22, the first stage camera 46, the second stage camera 47, and the front camera 48 are also provided in the upper part of the support section 22. Each of the first stage camera 46, the second stage camera 47, and the front camera 48 includes an imaging element capable of acquiring a color image. Further, the first stage camera 46, the second stage camera 47, and the front camera 48 have fewer pixels than the high-magnification-side imaging element 55 and the low-magnification-side imaging element 56, but may have substantially the same number of pixels without being limited thereto.

As illustrated in FIG. 4, the first stage camera 46 and the second stage camera 47 are disposed on the front side of the light receiving lens 51, and are provided to be spaced apart from each other in the left-right direction. Imaging directions (optical-axis directions) of the first stage camera 46 and the second stage camera 47 are the same as the imaging direction of the imaging section 50. Imaging visual fields of the first stage camera 46 and the second stage camera 47 are located on the front side of an imaging visual field of the imaging section 50, and can capture an image of a front part of the stage 21. Note that the first stage camera 46 or the second stage camera 47 captures an image of the entire stage 21 in a bird's-eye view manner from directly above to generate a bird's-eye view image (planar image), and may be referred to as a bird's-eye view image generating section.

The front camera 48 is a second imaging section that captures an image of the workpiece W in a posture with an imaging direction being different from the normal direction of the stage 21 above the stage 21 to generate a bird's-eye view image, and can also be referred to as the bird's-eye view image generating section. The front camera 48 is disposed on the front side of the light receiving lens 51, and is positioned on the front side of the first stage camera 46 and the second stage camera 47 in a positional relationship in the front-rear direction. Therefore, it can be said that the front camera 48 is a camera disposed closest to the user. An imaging visual field of the front camera 48 is set to be wider than imaging visual fields of the high-magnification-side imaging element 55 and the low-magnification-side imaging element 56, includes the imaging visual fields of the high-magnification-side imaging element 55 and the low-magnification-side imaging element 56, and can also capture an image of the outside of the imaging visual fields of the high-magnification-side imaging element 55 and the low-magnification-side imaging element 56. In the present example, the front camera 48 can capture an image of the entire upper surface of the stage 21. Further, the front camera 48 is a camera that is configured to be capable of capturing an image in real time and can acquire a live-view image.

The imaging direction (optical-axis direction) of the front camera 48 is directed from obliquely above on the front side of the stage 21 to the upper surface of the stage 21, that is, from the front to the back when viewed from the user. This is to make a line-of-sight direction when the stage 21 is viewed from the user at the time of measurement execution substantially coincide with the imaging direction of the front camera 48. As a result, the bird's-eye view image generated by the front camera 48 corresponds to what the user can see when viewing the workpiece W in a bird's-eye view manner with a natural measurement posture.

(Configuration of Non-Contact Displacement Meter 70)

The non-contact displacement meter 70 is a non-contact measuring section that emits measurement light along the normal direction of the stage 21 and receives reflected light from the workpiece W on the stage 21 to measure a height of the workpiece W on the stage 21 in a non-contact manner. The non-contact displacement meter 70 is a laser coaxial displacement meter, more specifically, a white confocal displacement meter, and includes a lens unit 71, a light projecting and receiving unit 72, and an optical fiber section 73 connecting both the units 71 and 72 as illustrated in FIG. 3. The light projecting and receiving unit 72 is built in the base 20, and includes a laser light source 72a, a light source optical member 72b, a phosphor 72c, and a light receiving element 72d.

The laser light source 72a is configured to emit light having a single wavelength, and preferably emit blue or ultraviolet light having a wavelength of 450 nm or less. In particular, when blue light is emitted, it is possible to project, onto the workpiece W, light in which light that has been used to excite the phosphor 72c and has undergone wavelength conversion and light that has not been used to excite the phosphor 72c but remains blue are mixed.

The phosphor 72c is excited by the light from the laser light source 72a and emits light converted to have a different wavelength. The phosphor 72c includes one or a plurality of kinds of phosphors 72c, and may be, for example, excited by blue light and emit light converted into yellow light, or two kinds of phosphors 72c may be used to excited by blue light and emit light converted into green and to be excited by blue light and emit light converted into red.

The optical fiber section 73 includes one or a plurality of optical fibers. A ferrule 73a may be used at an end of the optical fiber in order to facilitate handling. A core diameter of an emission end, which is an end of the optical fiber section 73 on the lens unit 71 side, can be set to 200 µm or less in diameter and may be set to 50 µm or less in diameter because of the influence on a diameter of a spot formed on the workpiece W.

The phosphor 72c is fixed to an incident end side of the optical fiber section 73. The phosphor 72c may be fixed in a light-transmissive medium such as resin or glass that transmits light from the laser light source 72a and light emitted by the phosphor 72c, and the light-transmissive medium may be fixed to the incident end of the optical fiber section 73. At this time, a refractive index of the light-transmissive medium is set to be equal to or lower than a refractive index of a core on the incident end side of the optical fiber section 73 in order to cause the light from the laser light source 72a and the light from the phosphor 72c to be efficiently incident on the optical fiber section 73.

The light receiving element 72d is configured using an imaging element such as a multi-division photodiode (PD), a CCD, or a CMOS, and selectively receives light from the workpiece W according to a wavelength via a spectroscope 72e configured using a diffraction grating, a prism, or the like, a color selection optical filter, or the like. The light receiving element 72d may receive light from the workpiece W via the optical fiber section 73 or may receive light via another optical path.

The lens unit 71 is attached to the measurement execution section 24, and thus, is movable in the Z direction together with the imaging section 50. The lens unit 71 is a member configured to collect light emitted from the emission end of the optical fiber section 73 toward the workpiece W, and includes an upper lens 71a and a lower lens 71b. The lens unit 71 is arranged at the right of the imaging section 50 and has an optical axis extending in the Z direction.

When the lens unit 71 is configured to have a confocal position with the emission end of the optical fiber section 73, the light from the workpiece W is separated according to a wavelength by the spectroscope 72e configured using a diffraction grating, a prism, or the like, and a wavelength-luminance distribution of the light from the workpiece W is detected based on a light receiving position in the light receiving element 72d. A signal related to the light receiving position and a light receiving amount of the light receiving element 72d is transmitted to a displacement measuring section 3c provided in the control unit 3.

For example, in a case where a chromatic aberration lens is used as the lens unit 71, the displacement measuring section 3c illustrated in FIG. 6 evaluates that the workpiece W exists at a closer distance when light having a shorter wavelength is detected, and that the workpiece W exists at a farther distance when light having a longer wavelength is detected. Further, in a case where a diffractive lens is used as the lens unit 71, the displacement measuring section 3c measures the displacement of the workpiece W by evaluating that the workpiece W exists at a farther distance when light having a shorter wavelength is detected and that the workpiece W exists at a closer distance when light having a longer wavelength is detected.

As illustrated in FIG. 3, a focal length of the non-contact displacement meter 70 is set to be longer than a focal length of the imaging section 50. Further, a focal height of the non-contact displacement meter 70 is set to be substantially the same as a focal height of the imaging section 50. That is, an attachment height of the lens unit 71 of the non-contact displacement meter 70 with respect to the measurement execution section 24 and an attachment height of the imaging section 50 with respect to the measurement execution section 24 can be arbitrarily set, but in the present example, a height of the lens unit 71 and a height of the imaging section 50 are set such that the focal height of the non-contact displacement meter 70 and the focal height of the imaging section 50 are substantially the same. For example, the lower lens 71b of the lens unit 71 is disposed above the light receiving lens 51 of the imaging section 50.

Since the non-contact displacement meter 70 can be moved by the Z-direction driving section 25 in the present example, for example, when the focal length of the imaging section 50 and the focal length of the non-contact displacement meter 70 are matched, the height measurement by the non-contact displacement meter 70 can be executed only by moving the stage 21 in the horizontal direction such that the non-contact displacement meter 70 is focused on a measurement target position at the focal length of the imaging section 50.

(Configuration of Touch Probe)

The touch probe 80 illustrated in FIG. 3 is a member that outputs a contact signal when coming into contact with the workpiece W on the stage 21. In the present example, the touch probe 80 is provided in the measurement execution section 24, and thus, the Z-direction driving section 25 can relatively move the touch probe 80 with respect to the stage 21 in the Z direction. Further, the stage 21 can be relatively moved in the XY directions with respect to the touch probe 80 by the XY-direction driving section 23. In this manner, the Z-direction driving section 25 and the XY-direction driving section 23 move at least one of the stage 21 and the touch probe 80 with respect to the other such that the touch probe 80 can be brought into contact with the workpiece W placed on the stage 21. Note that the stage 21 may be moved in the Z direction, or the touch probe 80 may be moved in the XY directions. An axis orthogonal to the Z axis and coinciding with the left-right direction of the apparatus body 2 is defined as the X axis. An axis orthogonal to the Z axis and coinciding with a direction (front-rear direction of the apparatus body 2) orthogonal to the X axis is defined as the Y axis.

The contact signal output from the touch probe 80 is transmitted to a coordinate measuring section 3b of the control unit 3 illustrated in FIG. 6. When receiving the contact signal output when the touch probe 80 is brought into contact with the workpiece W by the Z-direction driving section 25 and the XY-direction driving section 23, the coordinate measuring section 3b measures three-dimensional coordinates of the contact point at which the touch probe 80 comes into contact with the workpiece W based on the contact signal.

For example, a position in the X direction and a position in the Y direction of the stage 21 when the contact signal of the touch probe 80 is output can be acquired by the X-direction linear scale 23a and the Y-direction linear scale 23b, respectively. Further, a position of the touch probe 80 in the Z direction when the contact signal of the touch probe 80 is output can be acquired by the Z-direction linear scale 25a. Further, when a relative positional relationship between the touch probe 80 and the workpiece W is set in advance and calibration of the imaging section 50 or the like is executed, the three-dimensional coordinates of the contact point can be measured based on detection results of the linear scales 23a, 23b, and 25a.

Figure 7:
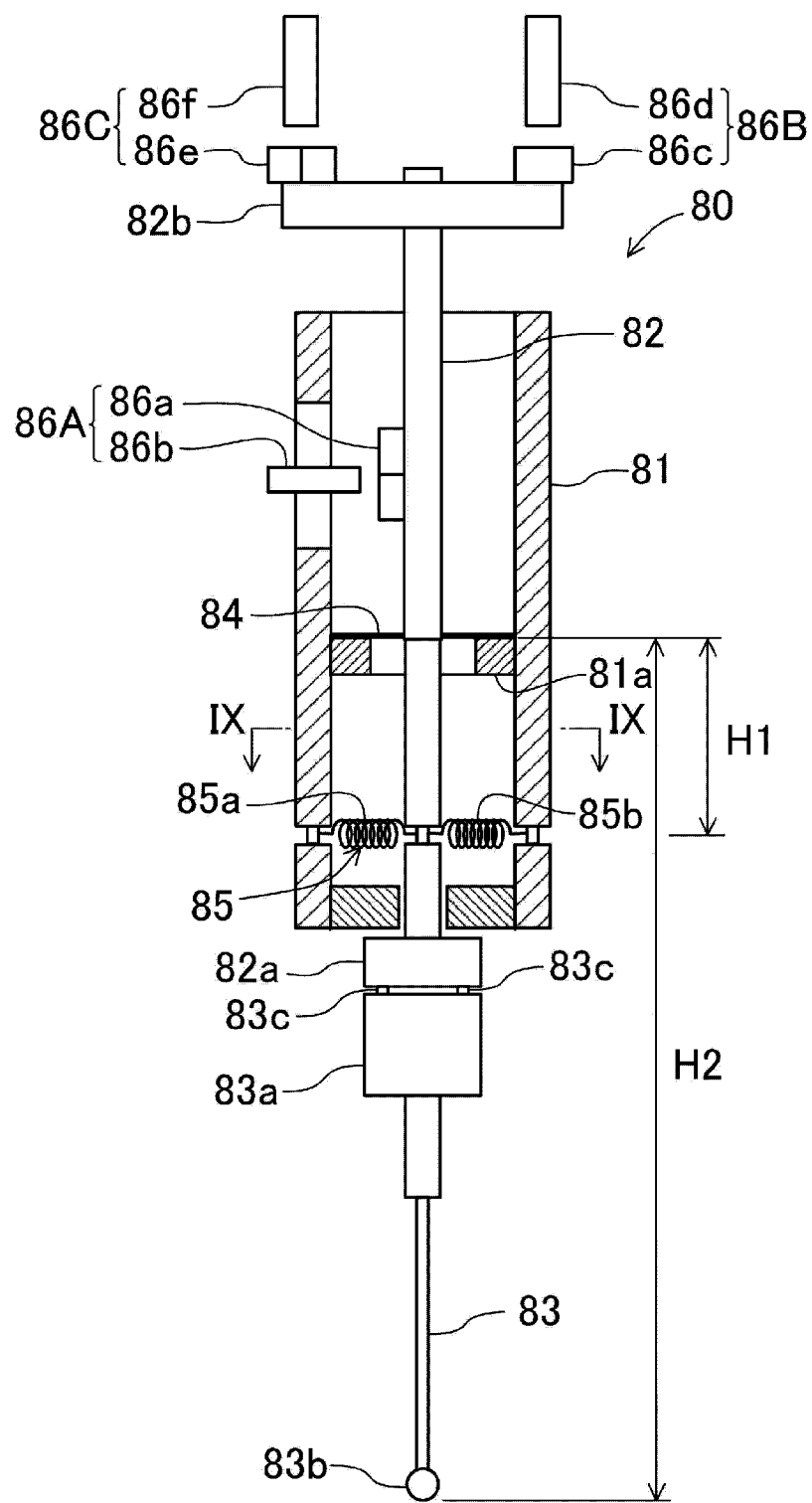
FIG. 7 is a longitudinal cross-sectional view of a touch probe.

As illustrated in FIG. 7, the touch probe 80 includes the housing 81, a probe shaft 82, a stylus 83, a fulcrum-forming elastic member (first elastic member) 84, a home-position-returning elastic member (second elastic member) 85, and a displacement detection mechanism 86. The housing 81 has a tubular shape extending in the Z direction, is fixed to the measurement execution section 24, and is disposed at the left of the imaging section 50 as illustrated in FIG. 5. Therefore, the imaging section 50 is interposed between the touch probe 80 and the lens unit 71 of the non-contact displacement meter 70.

As illustrated in FIG. 7, the probe shaft 82 is a rod-like member provided inside the housing 81 and extends in the Z direction. An upper cylindrical member 82a having a diameter larger than an outer diameter of the probe shaft 82 is fixed to a lower end of the probe shaft 82. The stylus 83 is also configured using a rod-like member extending in the Z direction similarly to the probe shaft 82, but is thinner than the probe shaft 82. A contact portion 83b that has a spherical shape and comes into contact with the workpiece W is provided at a lower end portion of the stylus 83.

An upper end portion of the stylus 83 is detachably attached to a lower surface of the cylindrical member 82a of the probe shaft 82 That is, the lower cylindrical member 83a having a larger diameter than the outer diameter of the stylus 83 is fixed to the upper end portion of the stylus 83. The upper cylindrical member 82a and the lower cylindrical member 83a have substantially the same diameter, but a dimension in the up-down direction is set to be longer in the lower cylindrical member 83a. Note that the probe shaft 82 is integrated with the housing 81, and thus, it can be said that the stylus 83 is detachably attached to the housing 81.

Although an attachment and detachment structure of the stylus 83 with respect to the probe shaft 82 is not particularly limited, for example, a kinematic mount or the like can be used. That is, permanent magnets (not illustrated) having polarities to be attracted to each other are fixed to the lower surface of the upper cylindrical member 82a and an upper surface of the lower cylindrical member 83a. For example, three steel balls 83c are fixed at equal intervals in the circumferential direction around the magnet on one of the lower surface of the upper cylindrical member 82a and the upper surface of the lower cylindrical member 83a, and fitting grooves (not illustrated) in which the steel balls 83c are fitted are formed around the magnet on the other surface so as to correspond to positions of the steel ball 83c. As a result, when the stylus 83 is brought closer to the probe shaft 82 from below the probe shaft 82, the stylus 83 is held in a state of being attracted to the probe shaft 82 by an attraction force of the magnets fixed to the upper cylindrical member 82a and the lower cylindrical member 83a. Alternatively, when the probe shaft 82 is brought closer to the stylus 83 from above the stylus 83, the stylus 83 is held in a state of being attracted to the probe shaft 82 by the attraction force of the magnets fixed to the upper cylindrical member 82a and the lower cylindrical member 83a. At this time, the stylus 83 is arranged coaxially with the probe shaft 82 as the steel balls 83c are fitted in the fitting grooves.

When the stylus 83 is removed from the probe shaft 82, the stylus 83 is moved downward against a magnetic force with the probe shaft 82 being fixed thereto, or the probe shaft 82 is moved upward against the magnetic force with the stylus 83 being fixed thereto. As a result, the lower cylindrical member 83a is separated from the upper cylindrical member 82a, and the stylus 83 is removed.

Figure 8:
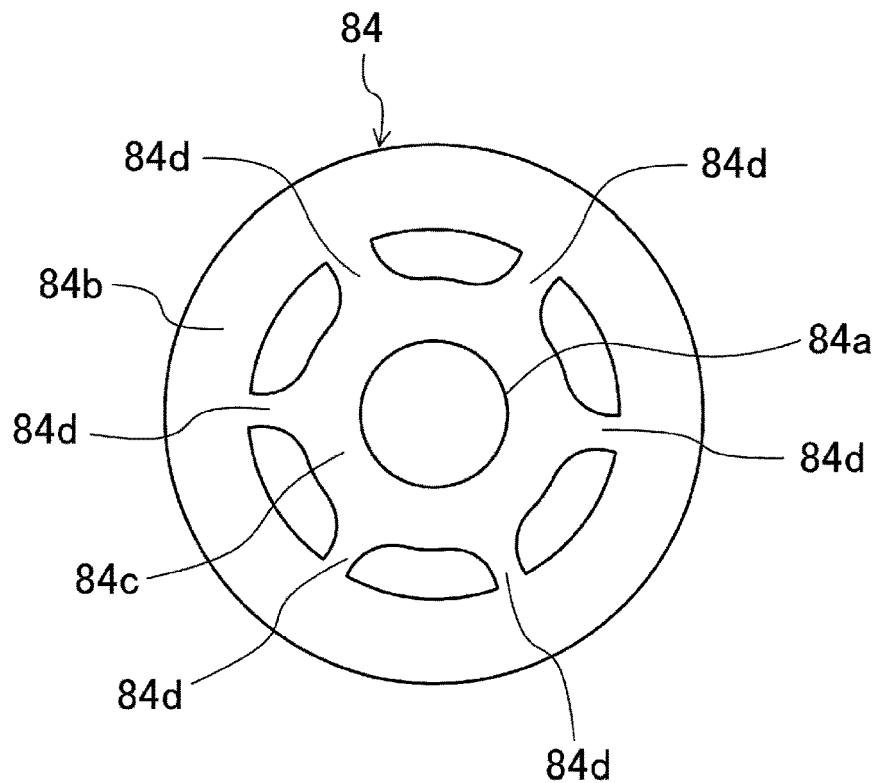
FIG. 8 is a plan view of a fulcrum-forming elastic member.

The fulcrum-forming elastic member 84 is a member connected to the housing 81 and the probe shaft 82 to form a deflection fulcrum of the probe shaft 82, and is configured using, for example, a flat spring or the like. Specifically, the fulcrum-forming elastic member 84 is configured using a leaf spring extending along an extension line in the radial direction of the probe shaft 82 and having a radially outer end portion connected to an inner surface of the housing 81. An example of a shape of the fulcrum-forming elastic member 84 is illustrated in FIG. 8, and an outer shape of the fulcrum-forming elastic member 84 is a circle formed along the inner surface of the housing 81. An insertion hole 84a through which the probe shaft 82 can be inserted is formed in a central portion of the fulcrum-forming elastic member 84, and the probe shaft 82 is fixed in a state of being inserted into the insertion hole 84a. In the fulcrum-forming elastic member 84, an outer portion 84b, an inner portion 84c in which the insertion hole 84a is formed, and three connecting portions 84d connecting the outer portion 84b and the inner portion 84c are integrally molded.

The fulcrum-forming elastic member 84 can be made of an elastic material having an axial shape restoring property. Further, the material and the shape of the fulcrum-forming elastic member 84 are set such that a state in which the inner portion 84c is located at the axial center is maintained and a radial deviation is suppressed. As a result, the deflection fulcrum of the probe shaft 82 can be kept by the fulcrum-forming elastic member 84. Further, when the stylus 83 comes into contact with the workpiece W, the fulcrum-forming elastic member 84 is deformed with a small force that does not affect contact resistance. Further, since the probe shaft 82 can be displaced in the Z direction with a small force, the fulcrum-forming elastic member 84 is configured such that the inner portion 84c can be displaced in the Z direction with a small force relative to the outer portion 84b.

As illustrated in FIG. 7, a support section 81a configured to support the outer portion 84b (illustrated in FIG. 8) of the fulcrum-forming elastic member 84 from below is provided inside the housing 81. Since the outer portion 84b is supported by the support section 81a, the probe shaft 82 is held at a predetermined height set in advance and stabilized, and is less likely to vibrate, so that the measurement accuracy is improved.

The home-position-returning elastic member 85 is a member that is connected to the housing 81 and the probe shaft 82 at a part away from the fulcrum-forming elastic member 84 in the axial direction of the probe shaft 82 to return the probe shaft 82 to a home position. In this manner, the fulcrum-forming elastic member 84 configured to form the deflection fulcrum and the home-position-returning elastic member 85 configured for returning to the home position are separately provided, and the respective elastic members 84 and 85 are designed to satisfy mutually different functions. That is, a displacement suppressing force in the radial direction of the probe shaft 82 is set to be stronger in the fulcrum-forming elastic member 84 than in the home-position-returning elastic member 85, and a biasing force for biasing the probe shaft 82 toward the home position is set to be stronger in the home-position-returning elastic member 85 than in the fulcrum-forming elastic member 84.

Figure 9:
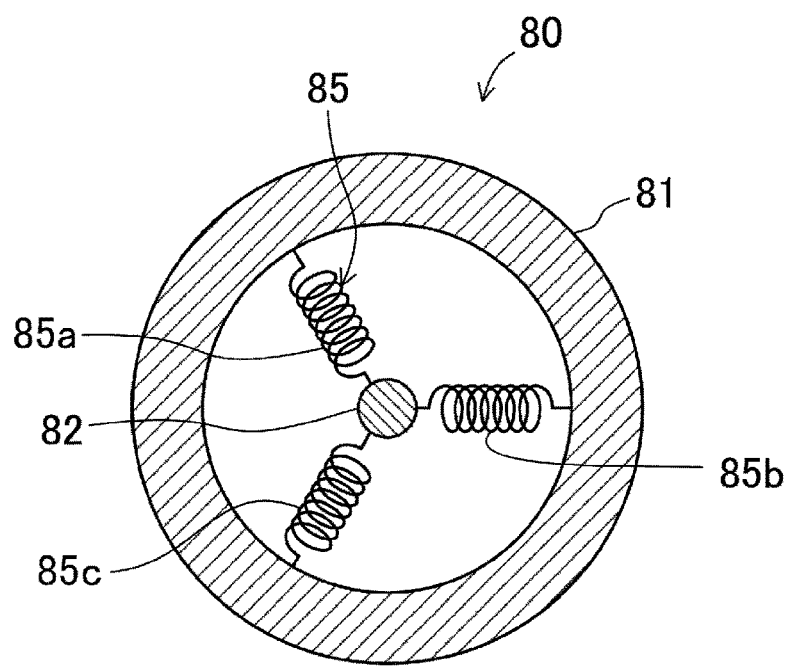
FIG. 9 is a sectional view taken along line IX-IX in FIG. 7.

The home-position-returning elastic member 85 is provided closer to a distal end side (lower side) of the probe shaft 82 than the fulcrum-forming elastic member 84, includes three or more tension springs 85a, 85b, and 85c that extend radially from the probe shaft 82 along the extension line in the radial direction of the probe shaft 82 and have outer end portions connected to the housing 81 as illustrated in FIG. 9, and is set such that spring forces of the three or more tension springs 85a, 85b, and 85c are balanced. Although the three tension springs 85a, 85b, and 85c constitute the home-position-returning elastic member 85 in the present example, the number of the tension springs 85a, 85b, and 85c is not limited thereto.

Inner end portions of the tension springs 85a, 85b, and 85c are fixed to an outer surface of the probe shaft 82, and such three fixing portions are arranged at equal intervals (120° intervals) in the circumferential direction. Axes of the tension springs 85a, 85b, and 85c are orthogonal to an axis of the probe shaft 82, and extension lines of the axes of the tension springs 85a, 85b, and 85c intersect on the axis of the probe shaft 82. The tension springs 85a, 85b, and 85c have the same spring constant.

Here, it is assumed that the probe shaft 82 is displaced in any direction of the three tension springs 85a, 85b, and 85c. In a case where a balance is made at a position where the tension spring 85a is contracted by $\Delta A$, the remaining tension spring 85b and tension spring 85c are in a relationship of A/2 displacement based on vector division. A strength of each of the remaining tension spring 85b and tension spring 85c acts in half in a direction of the tension spring 85a to eventually having a relationship of adding half of a spring strength of the tension spring 85a, and a balance is made while applying strength of $1.5 \times \Delta A$ in total. Since the three tension springs 85a, 85b, and 85c have the same spring constant, only the spring constant$\times \Delta A \times 1.5$ and the spring constant are design parameters. That is, when the same spring constant is set for the tension springs 85a, 85b, and 85c, the touch probe 80 that makes low-pressure contact can be obtained even if a length for maintaining the balance varies.

Further, there is a possibility that an elastic limit may be exceeded or the probe shaft 82 may be deformed if an excessive stroke is applied to the probe shaft 82 since the touch probe 80 that makes low-pressure contact is used. For this reason, it is sometimes desirable to provide a limiting mechanism for protection and adopt a configuration that is acceptable when a stronger external force is received. For example, in a case where it is assumed that the contact portion 83b is strongly pushed in the X direction, if the limiting mechanism for such a case is located above the probe shaft 82 receives a bending force, which may induce deformation of the probe shaft 82. That is, if the home-position-returning elastic member 85 is located above the fulcrum-forming elastic member 84, the probe shaft 82 having received the large external force in the X direction as described above may receive the bending force. In the present example, the home-position-returning elastic member 85 is provided below the fulcrum-forming elastic member 84 to make the probe shaft 82 less likely receive the bending force. Note that the above-described problem is not applied to all cases, and thus, the home-position-returning elastic member 85 can also be provided above the fulcrum-forming elastic member 84.

Further, for example, the probe shaft 82 is radially pulled by the three tension springs 85*a*, 85*b*, and 85*c* having the same spring constant, and thus, displacement of an amount reduced by the principle of leverage at a ratio of H1/H2 (illustrated in FIG. 7) relative to an amount of movement of the contact portion 83*b* is applied to the tension springs 85*a*, 85*b*, and 85*c* with respect to the home position where a balance is made with predetermined elongation, and a difference from the balance can be calculated only by the displacement and the spring constant. For example, when it is assumed that the contact with the workpiece W is detected at an extremely low contact pressure of about 2 g, the spring constant is derived backward, so that an extremely simple relationship can be established. Due to this relationship, even if the tension springs 85*a*, 85*b*, and 85*c* are configured using springs having relatively firm strengths, a resistance force at the contact portion 83*b* does not excessively increase, and the touch probe 80 that makes low-pressure contact can be obtained.

As illustrated in FIG. 7, displacement detection mechanisms 86A, 86B, and 86C are magnetic sensors that detect displacement of the probe shaft 82 in three-dimensional directions in a non-contact manner, and are provided closer to a proximal end side (upper side) of the probe shaft 82 than the fulcrum-forming elastic member 84. Specifically, the displacement detection mechanisms 86A, 86B, and 86C include: the Z-direction displacement detection mechanism 86A (first displacement detection mechanism) that detects displacement in the Z direction (first direction) along the axial direction of the probe shaft 82; the X-direction displacement detection mechanism 86B (second displacement detection mechanism) that detects displacement in the X direction (second direction) along the radial direction of the probe shaft 82; and the Y-direction displacement detection mechanism 86C (third displacement detection mechanism) that detects displacement in the Y direction (third direction) extending along the radial direction of the probe shaft 82 and orthogonal to the Z direction.

The Z-direction displacement detection mechanism 86A includes a Z-direction detection magnet 86*a* in which an N pole and an S pole are arranged side by side in the Z direction, and a Z-direction magnetic sensor 86*b*. The Z-direction detection magnet 86*a* is fixed to the probe shaft 82, and the Z-direction magnetic sensor 86*b* is fixed to the housing 81. The Z-direction magnetic sensor 86*b* is arranged so as to face a boundary part between the N-pole and the S-pole of the Z-direction detection magnet 86*a*. Therefore, when the probe shaft 82 is displaced even slightly in the Z direction, a magnetic field detected by the Z-direction magnetic sensor 86*b* changes, whereby the displacement of the probe shaft 82 in the Z direction can be detected in a non-contact manner.

A magnet fixing member 82*b* is provided at an upper end portion of the probe shaft 82. The X-direction displacement detection mechanism 86B includes an X-direction detection magnet 86*c* in which an N pole and an S pole are arranged side by side in the X direction, and an X-direction magnetic sensor 86*d*. The X-direction detection magnet 86*c* is fixed to an upper surface of the magnet fixing member 82*b*, and the X-direction magnetic sensor 86*d* is fixed to the housing 81. The X-direction magnetic sensor 86*d* is arranged so as to face a boundary part between the N-pole and the S-pole of the X-direction detection magnet 86*c*. Therefore, when the probe shaft 82 slightly swings in the X direction about the deflection fulcrum and is displaced, a magnetic field detected by the X-direction magnetic sensor 86*d* changes, whereby the displacement of the probe shaft 82 in the X direction can be detected in a non-contact manner.

The Y-direction displacement detection mechanism 86C includes a Y-direction detection magnet 86*e* in which an N pole and an S pole are arranged side by side in the Y direction, and a Y-direction magnetic sensor 86*f*. The Y-direction detection magnet 86*e* is fixed to a site away from the X-direction detection magnet 86*c* on the upper surface of the magnet fixing member 82*b*, and the Y-direction magnetic sensor 86*f* is fixed to the housing 81. The Y-direction magnetic sensor 86*f* is arranged so as to face a boundary part between the N-pole and the S-pole of the Y-direction detection magnet 86*e*. Therefore, when the probe shaft 82 slightly swings in the Y direction about the deflection fulcrum and is displaced, a magnetic field detected by the Y-direction magnetic sensor 86*f* changes, whereby the displacement of the probe shaft 82 in the Y direction can be detected in a non-contact manner.

The displacement detection mechanism 86 may be a sensor other than the magnetic sensor, and may be, for example, an optical or capacitive detection sensor.

Damping grease for generating a damping force is applied to the tension springs 85*a*, 85*b*, and 85*c*. The damping grease has a high viscosity and a nonvolatile paste shape, and is applied to the tension springs 85*a*, 85*b*, and 85*c* so as to fill gaps among lines of the tension springs 85*a*, 85*b*, and 85*c*. As a result, it is possible to apply the damping force many times in a short time when the tension springs 85*a*, 85*b*, and 85*c* elongate and contract, desired damping is easily obtained, and further, it is unnecessary to apply excessive damping which is likely to cause noise.

Note that the damping grease or the like can be made effective in a distant place where a damping effect is easily enhanced based on the principle of leverage when the tension springs 85*a*, 85*b*, and 85*c* are damped. For example, a gap between the Z-direction detection magnet 86*a* and the Z-direction magnetic sensor 86*b*, a gap between the X-direction detection magnet 86*c* and the X-direction magnetic sensor 86*d*, and a gap between the Y-direction detection magnet 86*e* and the Y-direction magnetic sensor 86*f* may be filled with the damping grease. Further, the tension springs 85*a*, 85*b*, and 85*c* may be damped using other damping members.

Figure 10:
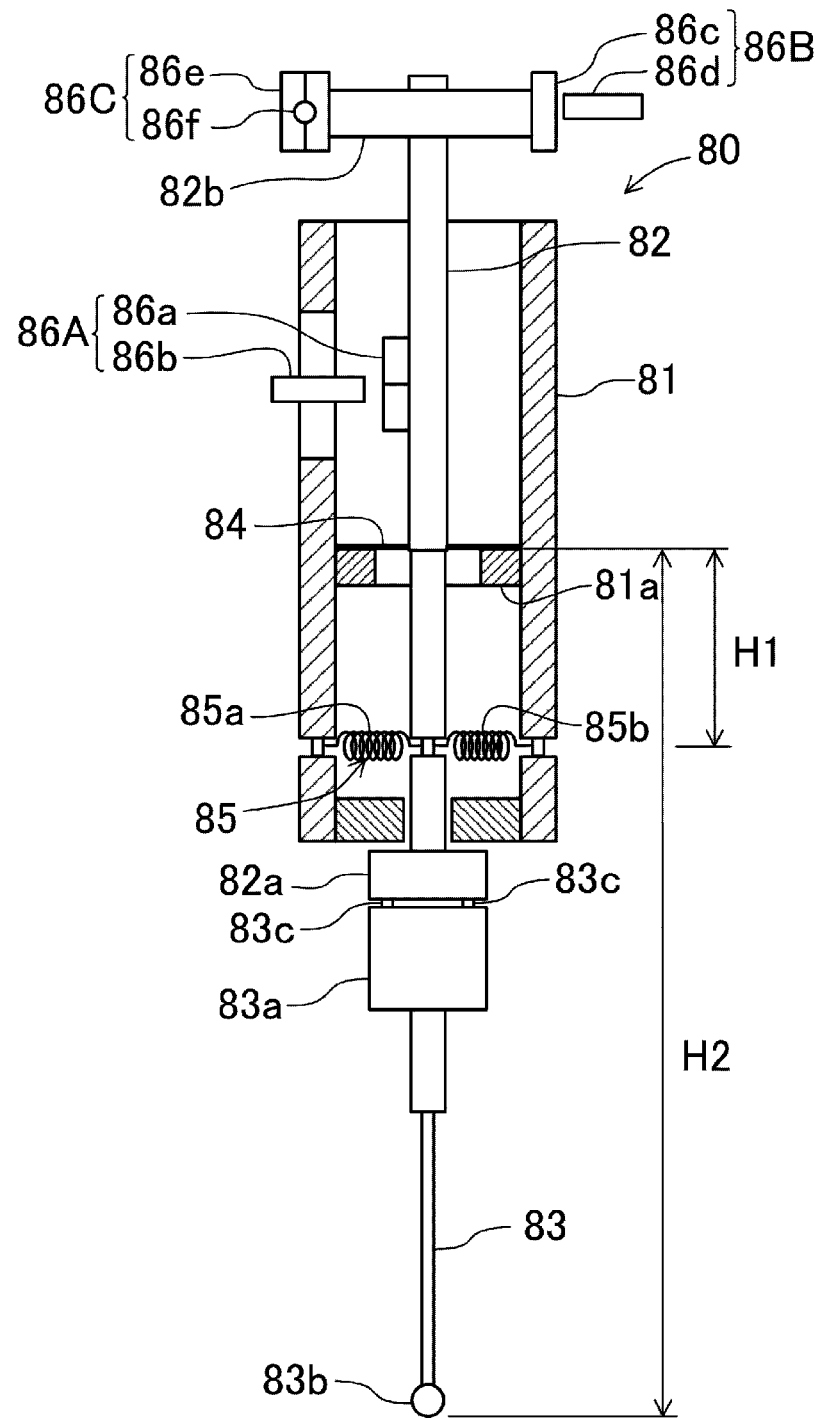
FIG. 10 is a view corresponding to FIG. 7 and illustrating another example of the touch probe.

FIG. 10 is a view illustrating another example of the touch probe 80. In the present example, an orientation of the X-direction magnetic sensor 86*d* of the X-direction displacement detection mechanism 86B and an orientation of the Y-direction magnetic sensor 86*f* of the Y-direction displacement detection mechanism 86C are different from those in the above-described example. Specifically, the X-direction magnetic sensor 86*d* and the X-direction detection magnet 86*c* are arranged so as to face each other in the horizontal direction, and the Y-direction magnetic sensor 86*f* and the Y-direction detection magnet 86*e* are arranged so as to face each other in the horizontal direction.

(Changer Mechanism of Stylus)

Examples of the stylus 83 include a cross-shaped stylus, an L-shaped stylus, a T-shaped stylus, and the like having different overall shapes, styluses having different diameters, styluses whose contact portions 83*b* at tips have different sizes, and the like, and are selectively used according to the workpiece W, measurement applications, and the like. As illustrated in FIGS. 1 and 2, the support section 22 of the apparatus body 2 is provided with a changer mechanism (exchanger) 100 that holds different styluses 83A, 83B, and 83C and automatically exchange desired styluses at a predetermined timing. In the present example, the touch probe 80 is provided on the left side of the measurement execution section 24, and thus, the changer mechanism 100 is provided on the left side of the support section 22 so as to correspond thereto. Note that the changer mechanism 100 may be provided on the right side of the support section 22 in a case where the touch probe 80 is provided on the right side of the measurement execution section 24.

Figure 11:
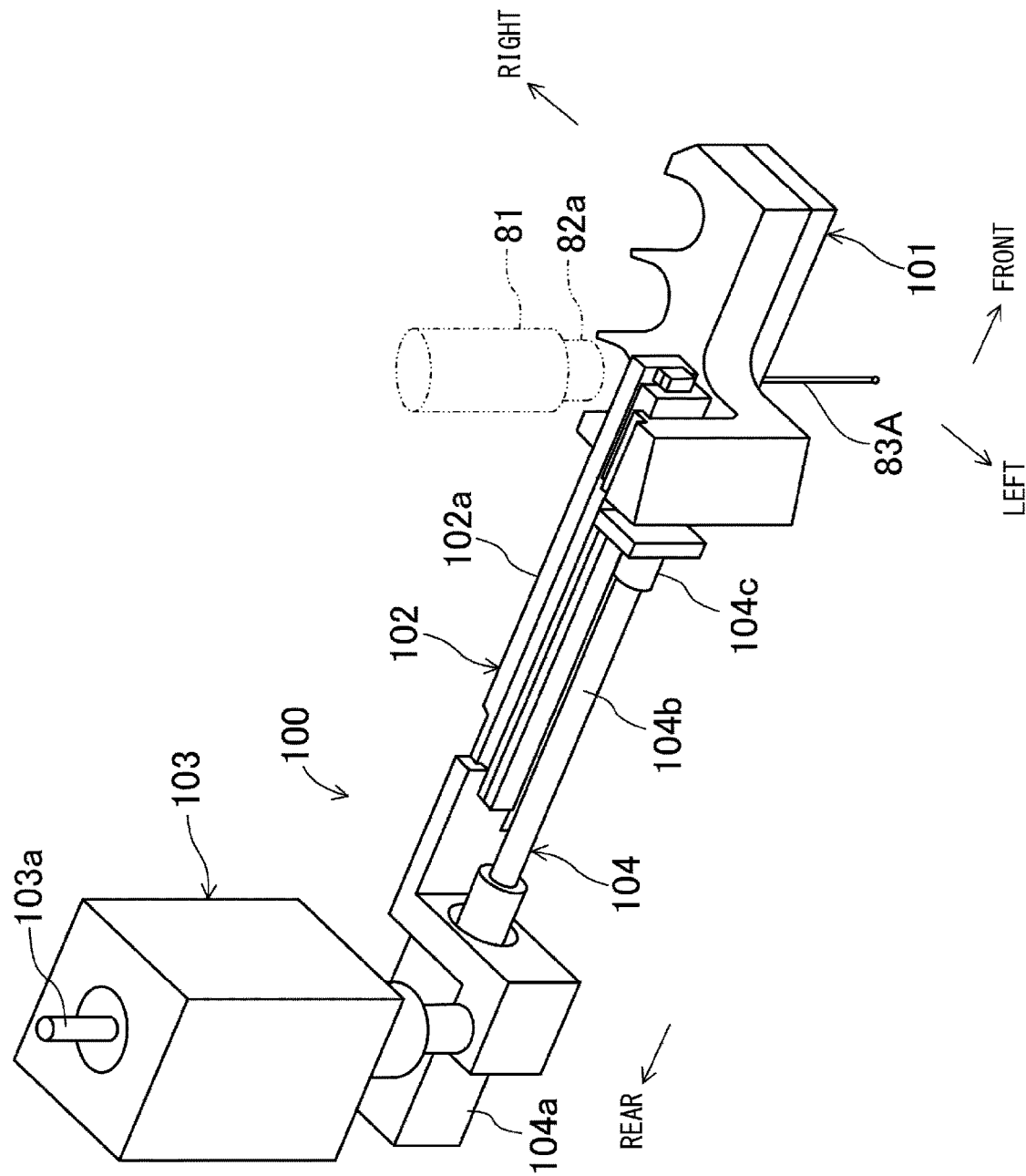
FIG. 11 is a perspective view of a changer mechanism of a stylus.

FIG. 11 is a perspective view of the changer mechanism 100 of the stylus. The changer mechanism 100 includes a stylus holding section 101 that holds one or a plurality of styluses, an arm section 102 that supports the stylus holding section 101, a changer rotation driving section (rotating section) 103 that rotates the arm section 102, and a changer feed driving section (slider section) 104 that moves the stylus holding section 101 along the arm section 102.

Figure 12:
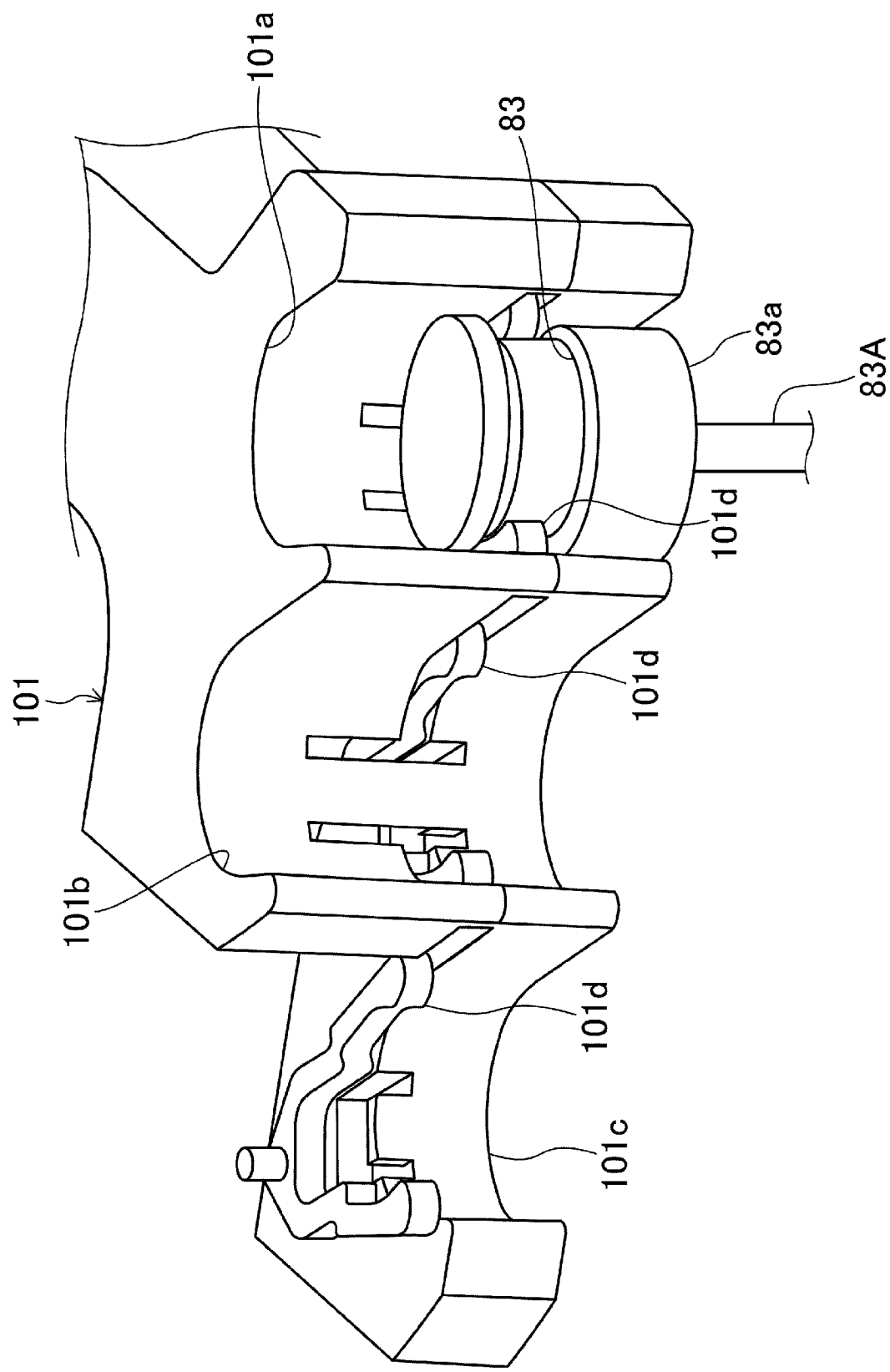
FIG. 12 is a perspective view of a stylus holding section.

As illustrated in FIG. 12, the stylus holding section 101 includes first to third cutout portions 101a, 101b, and 101c that hold the styluses 83A, 83B, and 83C of different types, respectively. Each of the cutout portions 101a, 101b, and 101c is opened in the up-down direction and also opened to one side in the horizontal directions, and opening directions are the same in all the cutout portions 101a, 101b, and 101c. Note that FIG. 12 illustrates the third cutout portion 101c from which a member forming an upper part has been removed for the purpose of describing an internal structure, but the third cutout portion 101c also has the same shape as the first cutout portion 101a and the second cutout portion 101b. Note that the number of the cutout portions is not limited to three, and may be set to any number.

Holding claws 101d configured to hold the stylus are provided, respectively, at intermediate portions of the cutout portions 101a, 101b, and 101c in the up-down direction. The holding claw 101d is made of a member having elasticity such as resin, and has a shape that is opened in the same direction as the opening part in the horizontal direction of each of the cutout portions 101a, 101b, and 101c. Both end portions of the holding claw 101d protrude from an inner surface of each of the cutout portions 101a, 101b, and 101c, and both the end portions of the holding claw 101d are engaged with a groove 83d formed in an outer peripheral surface of the lower cylindrical member 83a of the stylus 83. A dimension of the groove 83d in the up-down direction is set to be longer than a dimension of the holding claw 101d in the up-down direction, and a difference between the dimensions allows the stylus held by the holding claw 101d to relatively move up and down with respect to the holding claw 101d.

An interval between both the end portions of the holding claw 101d is narrower than an outer diameter of a part of the lower cylindrical member 83a where the groove 83d is formed. When the lower cylindrical member 83a is held, the part of the lower cylindrical member 83a where the groove 83d is formed is pressed against both the end portions of the holding claw 101d from the opening side of the holding claw 101d, so that the holding claw 101d is elastically deformed to widen the interval between both the end portions. As a result, the part of the lower cylindrical member 83a where the groove 83d is formed can be inserted into the inner side of the holding claw 101d from a gap between both the end portions of the holding claw 101d and engaged with the holding claw 101d. When the lower cylindrical member 83a held by the holding claw 101d is to be removed, the lower cylindrical member 83a is relatively moved in the opening direction of the holding claw 101d, so that the holding claw 101d is elastically deformed to widen the interval between both the end portions, and the lower cylindrical member 83a is withdrawn from the opening side of the holding claw 101d.

The arm section 102 illustrated in FIG. 11 is a member configured to move between an attachable position where the styluses 83A, 83B, and 83C (reference signs 83B and 83C are illustrated in FIG. 2) held by the stylus holding section 101 can be attached to the housing 81 and a retracted position retracted from the attachable position. The attachable position may also be referred to as a stylus attachment preparation position, and the retracted position may also be referred to as a stylus storage position. Specifically, the arm section 102 is configured using a member extending in the horizontal direction, and has a proximal end portion being attached to the support section 22 via the changer rotation driving section 103. The changer rotation driving section 103 is configured using an electric motor having a rotary shaft 103a extending in the Z direction. The rotary shaft 103a is parallel to the imaging axis of the imaging section 50, and a proximal end side of the arm section 102 is connected to a lower end portion of the rotary shaft 103a.

As indicated by a broken line in FIG. 2, the changer rotation driving section 103 is disposed above the stage 21. FIG. 2 illustrates a state in which the styluses 83A, 83B, and 83C held by the stylus holding section 101 are moved to the retracted position. The stylus holding section 101 and the styluses 83A, 83B, and 83C at the retracted position are arranged so as not to interfere during measurement setting and during measurement execution, specifically, such that the stylus holding section 101 and the styluses 83A, 83B, and 83C do not enter a movable range of the measurement execution section 24 or the imaging visual field of the imaging section 50.

The support section 22 includes an eave portion 22A that covers at least a portion of an upper portion of the stylus holding section 101 at the retracted position. The eave portion 22A is formed to project leftward from a left wall of the support section 22, and the stylus holding section 101 can be arranged immediately below the eave portion 22A. As a result, it is possible to prevent surrounding articles and the like from coming into contact with the stylus holding section 101 and the styluses 83A, 83B, and 83C held by the stylus holding section 101. The eave portion 22A may be formed to cover the entire upper portion of the stylus holding section 101.

As illustrated in FIG. 11, the arm section 102 is provided with the changer feed driving section 104. The changer feed driving section 104 includes a feeding electric motor 104a, a screw rod 104b rotationally driven by the feeding electric motor 104a, and a threaded member 104c threaded to the screw rod 104b. The feeding electric motor 104a is fixed to the proximal end portion of the arm section 102, and a rotation center line thereof is oriented in the longitudinal direction of the arm section 102. The screw rod 104b is arranged in parallel with the arm section 102 and is supported to be rotatable with respect to the arm section 102. The stylus holding section 101 is fixed to the threaded member 104c.

The arm section 102 is provided with a guide rail 102a that guides the stylus holding section 101 in the longitudinal direction of the arm section 102. The stylus holding section 101 is movable only in the longitudinal direction of the arm section 102 in a state of being engaged with the guide rail 102a not to be rotatable. That is, the styluses 83A, 83B, and 83C held by the stylus holding section 101 can be moved in a direction orthogonal to the imaging axis.

When the screw rod 104b is rotated by the feeding electric motor 104a, the stylus holding section 101 can be moved to a distal end side of the arm section 102 as illustrated in FIG. 11, and the stylus holding section 101 can be moved to the proximal end side of the arm section 102 or the vicinity thereof although not illustrated. The stylus holding section 101 can be stopped at any position relative to the arm section 102. The position of the stylus holding section 101 is detected by a position detector such as a rotary encoder and output to the control section 3d.

FIG. 11 illustrates a state in which the styluses 83A, 83B, and 83C held by the stylus holding section 101 are moved to the attachable position where attachment to the housing 81 is possible. A position of the changer rotation driving section 103 is set such that the rotary shaft 103a of the changer rotation driving section 103 is positioned between the styluses 83A, 83B, and 83C at the attachable position and the styluses 83A, 83B, and 83C at the retracted position, and the changer rotation driving section 103 at such a position is attached to the support section 22.

The changer rotation driving section 103 rotates the arm section 102 by 180° when moving the stylus holding section 101 from the retracted position to the attachable position and from the attachable position to the retracted position That is, the position of the stylus holding section 101 can be greatly switched from the front side to the rear side and from the rear side to the front side of the changer rotation driving section 103.

Figure 14A:
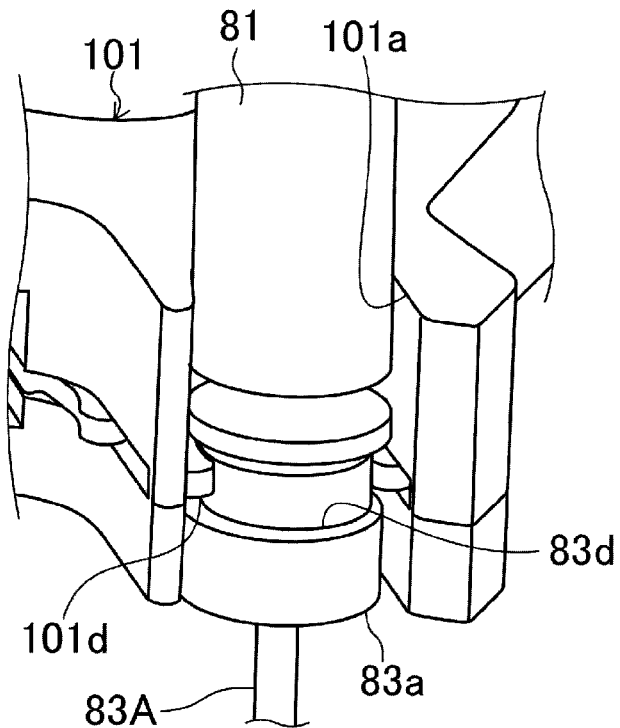
FIG. 14A is a perspective view illustrating a state in which a housing is arranged above the stylus holding section at an attachable position.

Next, an outline of stylus exchange will be described. FIG. 13 is a flowchart illustrating an example of a stylus mounting procedure. In step SA1 after the start, the control section 3d of the control unit 3 controls the Z-direction driving section 25 to move the measurement execution section 24 to an upper standby position. In step SA2, the control section 3d controls the changer feed driving section 104 to move the stylus holding section 101 in the longitudinal direction of the arm section 102 such that a desired cutout portion (set to be the first cutout portion 101a) among the first to third cutout portions 101a, 101b, and 101c is arranged at a predetermined position. As a result, the stylus holding section 101 moves outward from a space immediately below the eave portion 22A (for example, the stylus holding section 101 moves to the vicinity of the center of the arm section 102 and exits to the outer side of the eave portion 22A). In step SA3, the control section 3d controls the changer rotation driving section 103 to rotate the arm section 102 such that the stylus holding section 101 is arranged at the attachable position. This state is illustrated in FIG. 14A of FIG. 14. Since the measurement execution section 24 is at the upper standby position, the stylus 83A is not yet mounted to the housing 81. Note that the position of the stylus holding section 101 may be finely adjusted along the longitudinal direction of the arm section 102 after step SA3.

Figure 14B:
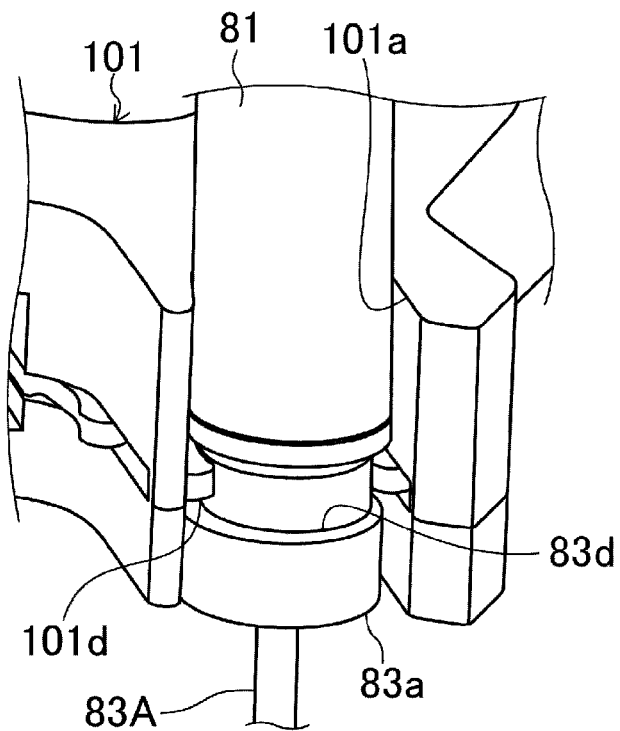
FIG. 14B is a perspective view illustrating a state in which the housing is lowered and the stylus is mounted.

Thereafter, the flow proceeds to step SA4, and the control section 3d controls the Z-direction driving section 25 to lower the measurement execution section 24 to be moved to a mounting height. Then, the lower cylindrical member 83a of the stylus 83A is attracted to the upper cylindrical member 82a of the probe shaft 82 by a magnetic force. A state after the attraction is illustrated in FIG. 14B of FIG. 14. Next, the flow proceeds to step SA5, where the control section 3d controls the changer rotation driving section 103 to rotate the arm section 102 such that the stylus holding section 101 is arranged at the retracted position. At this time, the holding claw 101d is elastically deformed so that the lower cylindrical member 83a comes out of the holding claw 101d.

Figure 15:
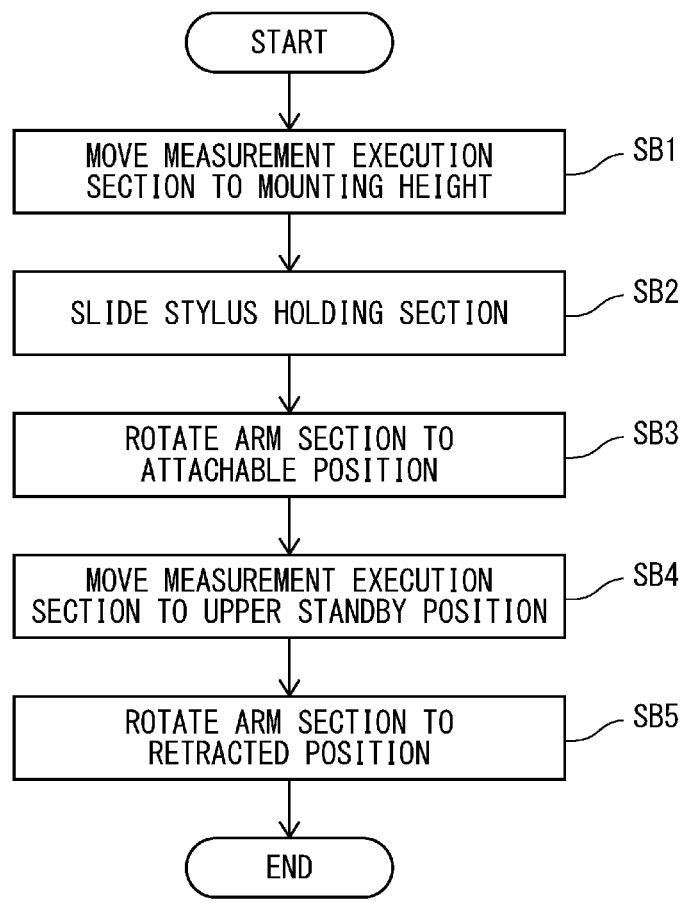
FIG. 15 is a flowchart illustrating an example of a stylus detachment procedure.

Next, a procedure for detaching the stylus attached to the housing 81 is illustrated in FIG. 15. In step SB1 after the start, the control section 3d of the control unit 3 controls the Z-direction driving section 25 to move the measurement execution section 24 to the mounting height similarly to step SA4. In step SB2, the control section 3d controls the changer feed driving section 104 to move the stylus holding section 101 in the longitudinal direction of the arm section 102 such that a desired cutout portion (set to be the first cutout portion 101a) among the first to third cutout portions 101a, 101b, and 101c is arranged at a predetermined position. At this time, the cutout portion where no stylus is held is arranged at the predetermined position. Further, the stylus holding section 101 moves outward from a space immediately below the eave portion 22A (for example, the stylus holding section 101 moves to the vicinity of the center of the arm section 102 and exits to the outer side of the eave portion 22A).

In step SB3, the control section 3d controls the changer rotation driving section 103 to rotate the arm section 102 such that the stylus holding section 101 is arranged at the attachable position. This flow is a flow during the detachment, and thus, does not correspond to an "attachable" state, but the stylus holding section 101 is at the same position as the "attachable position" in the flow illustrated in FIG. 13, and thus, the "attachable position" is also used in this flow. The "attachable position" may be replaced with a "detachable position". This state is the same as that illustrated in FIG. 14B of FIG. 14, and the holding claw 101d is engaged with the part of the lower cylindrical member 83a of the stylus 83A where the groove 83d is formed.

Thereafter, the flow proceeds to step SB4, and the control section 3d controls the Z-direction driving section 25 to raise the measurement execution section 24 to be moved to the upper standby position. Then, the upper cylindrical member 82a of the probe shaft 82 relatively moves upward with respect to the lower cylindrical member 83a of the stylus 83A, and the lower cylindrical member 83a of the stylus 83A is withdrawn from the upper cylindrical member 82a of the probe shaft 82 against a magnetic force. A state after the withdrawal is the same as that illustrated in FIG. 14A of FIG. 14. Next, the flow proceeds to step SB5, where the control section 3d controls the changer rotation driving section 103 to rotate the arm section 102 such that the stylus holding section 101 is arranged at the retracted position.

As described above, the control section 3d controls the changer rotation driving section 103 and the changer feed driving section 104 such that the stylus held by the stylus holding section 101 is arranged to the attachable position from the retracted position, and controls the changer rotation driving section 103 and the changer feed driving section 104 such that the stylus held by the stylus holding section 101 is arranged to the retracted position from the attachable position. Further, the control section 3d controls the changer feed driving section 104 such that the stylus holding section 101 at the retracted position is positioned closer to the proximal end side of the arm section 102 than the stylus holding section 101 at the attachable position.

Note that the holding claw 101d is configured to be engaged with the groove 83d formed on the outer peripheral surface of the lower cylindrical member 83a in the present embodiment, but a modified example in which the groove 83d is not formed is also conceivable. For example, a movable member (preferably an elastic member) that is relatively movable (abuts or separates) in the radial direction with respect to the outer peripheral surface of the lower cylindrical member 83a may be provided on the inner side of each of the cutout portions 101a to 101c. The movable member may be moved by the control section 3d. In this case, in step SA4 described above, the control section 3d controls the movable member to separate from the outer peripheral surface of the lower cylindrical member 83a after the lower cylindrical member 83a of the stylus 83A is attracted to the upper cylindrical member 82a of the probe shaft 82. Further, in step SB4 described above, the control section 3d controls the movable member to abut on the outer peripheral surface of the lower cylindrical member 83a before the measurement execution section 24 is raised and moved to the upper standby position. In this manner, attachment and detachment operations of the stylus 83A may be realized without forming the groove 83d on the outer peripheral surface of the lower cylindrical member 83a.

(Configuration of Control Unit)

The control unit 3 illustrated in FIG. 6 includes, for example, a central processing unit (CPU), a RAM, a ROM, an internal bus, and the like (not illustrated). The CPU is connected to the display section 4, the keyboard 5, the mouse 6, the storage section 7, and the apparatus body 2 via the internal bus. The control unit 3 acquires operation states of the keyboard 5, the mouse 6, the measurement start button 2a of the apparatus body 2, and the like. Further, the control unit 3 can acquire image data acquired by the imaging section 50, the first stage camera 46, the second stage camera 47, and the front camera 48 of the apparatus body 2. Further, a result of the calculation in the control unit 3, the image data acquired by the imaging section 50, the first stage camera 46, the second stage camera 47, and the front camera 48, and the like can be displayed on the display section 4.

Further, the control unit 3 controls the Z-direction driving section 25, the XY-direction driving section 23, the coaxial epi-illumination 40, the ring illumination 45, the illumination Z-direction driving section 45d, the imaging section 50, the non-contact displacement meter 70, the touch probe 80, the changer rotation driving section 103, the changer feed driving section 104, and the like of the apparatus body 2. Specifically, the control unit 3 is connected to each hardware via the internal bus, and thus, controls the operation of the above-described hardware and executes various software functions according to a computer program stored in the storage section 7. For example, the control unit 3 is provided with an image measuring section 3a that measures a dimension of the workpiece W based on a workpiece image generated by the imaging section 50, the coordinate measuring section 3b that measures three-dimensional coordinates of a contact point at which the touch probe 80 comes into contact with the workpiece W, the displacement measuring section 3c that measures displacement of the workpiece W on the stage 21 based on an output signal from the non-contact displacement meter 70, and the like. The displacement measurement is also referred to as height measurement.

Hereinafter, details of functions that can be executed by the control unit 3 will be described separately for the time of measurement setting before measurement of the workpiece W and the time of measurement execution in which the measurement of the workpiece W is executed.

(At Time of Measurement Setting)

Figure 16:
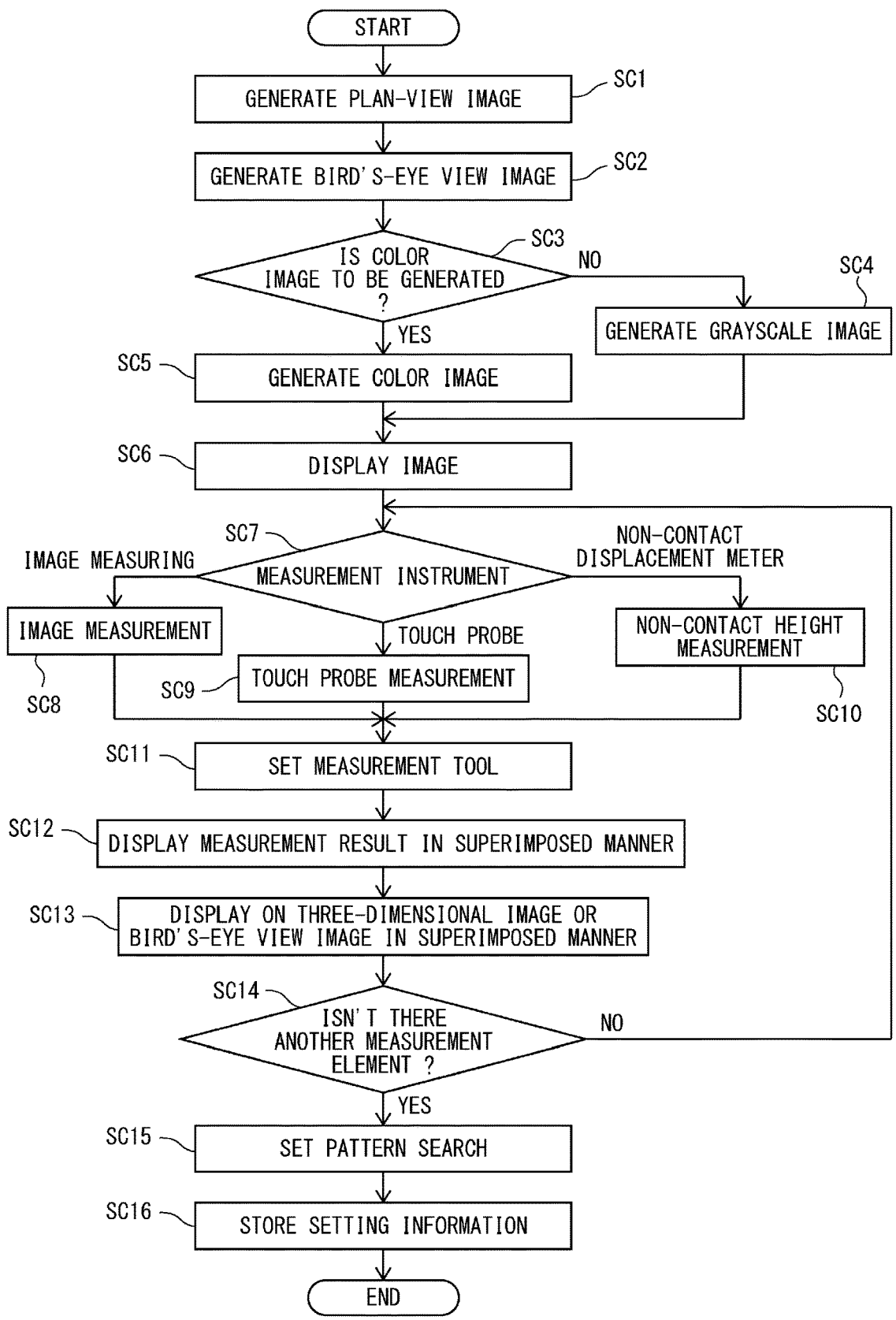
FIG. 16 is a flowchart illustrating an example of a procedure at the time of measurement setting of the image measurement apparatus.

FIG. 16 is a flowchart illustrating an example of a procedure at the time of measurement setting of the image measurement apparatus 1. In step SC1 after the start, a plan-view image is generated. That is, an image of the stage 21 is captured by the imaging section 50. At this time, a workpiece image is acquired in a case where the user places the workpiece W on the placement table 21a of the stage 21. For example, the imaging section 50 can be used to capture the image of the workpiece W on the stage 21 after the measurement execution section 24 is moved by the Z-direction driving section 25 to move the imaging section 50 to a measurement position, and can also be used for illumination as necessary.

In step SC2, a bird's-eye view image is generated. An image of the workpiece W on the stage 21 is captured by the front camera 48 after the measurement execution section 24 is moved by the Z-direction driving section 25 to move the front camera 48 to the measurement position.

When the front camera 48 is used to capture the image of the workpiece W, the following control can be performed. That is, first, the control section 3d detects a position of the workpiece W on the stage 21 based on the workpiece image generated by the imaging section 50. Thereafter, the control section 3d determines whether or not the workpiece W on the stage 21 is located within a visual field range of the front camera 48 based on the detected position of the workpiece W on the stage 21 and the known visual field range of the front camera 48. Next, when the workpiece W on the stage 21 is located outside the visual field range of the front camera 48, the control section 3d controls the XY-direction driving section 23 to move the stage 21 such that the workpiece W on the stage 21 is located within the visual field range of the front camera 48. As a result, the front camera 48 can reliably capture the image of the workpiece W on the stage 21.

Further, after the image of the workpiece W on the stage 21 is captured by the front camera 48, the control section 3d can also control the XY-direction driving section 23 to move the stage 21 such that the front camera 48 can capture an image of another region on the stage 21.

Position information of the stage 21 when a bird's-eye view image is captured by the front camera 48 can be acquired by the X-direction linear scale 23a or the Y-direction linear scale 23b. The acquired position information of the stage 21 and the bird's-eye view image can be stored in the storage section 7 in association with each other. As a result, the position of the stage 21 when the bird's-eye view image is captured can be grasped.

In step SC3, it is determined whether or not to generate a color workpiece image (color image) based on a result selected by the user. Color image generation is selected on a user interface screen displayed on the display section 4 if the user desires to generate a color image, and the color image generation is not selected if not. The user's selection operation is performed by the keyboard 5, the mouse 6, or the like, and is received by a receiving section 3e of the control unit 3.

If the user does not desire to generate a color image, that is, if it is determined not to generate a color image in step SC3, the flow proceeds to step SC4, and a grayscale workpiece image (grayscale image) is generated based on data acquired by the imaging section 50 with illumination of monochromatic light. On the other hand, if the user desires to generate a color image, that is, if it is determined to generate a color image in step SC3, the flow proceeds to step SC5, and the color image is generated.

Figure 17:
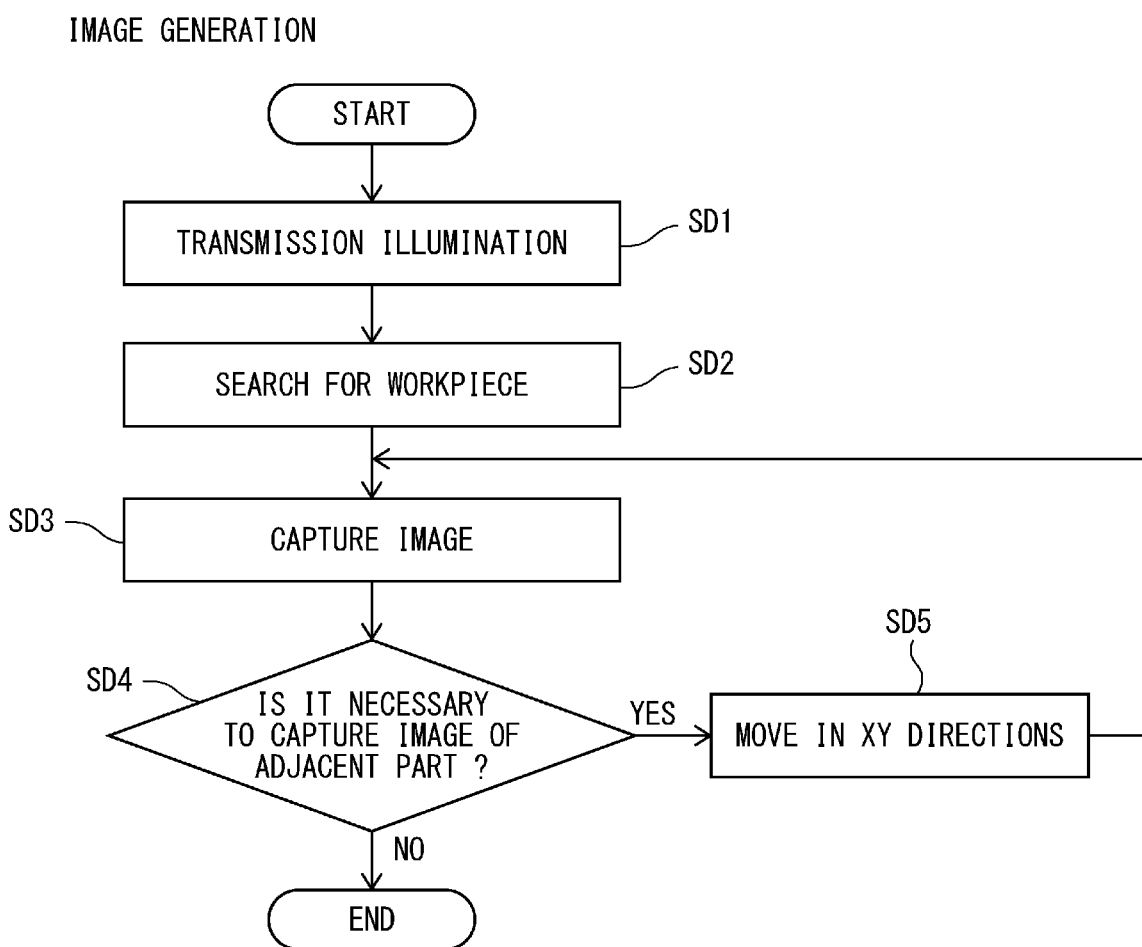
FIG. 17 is a flowchart illustrating an example of an image generation procedure.

The image generation in each of steps SC4 and SC5 will be described in detail based on a flowchart illustrated in FIG. 17. In step SD1 after the start of FIG. 17, the workpiece W is illuminated by the transmission illumination 30. In step SD2, the XY-direction driving section 23 is controlled to move the stage 21 in the X direction or the Y direction, and the workpiece W is searched for while causing the imaging section 50 to capture an image thereof. The stage 21 is moved in a spiral shape from the center in the X direction and the center in the Y direction, for example. Then, when a proportion of black pixels (pixels having luminance values equal to or less than a predetermined value) in the image captured by the imaging section 50 becomes equal to or more than a certain value, it is determined that the workpiece W is present in this region. In this manner, the workpiece W can be searched for, a position of the workpiece W on the stage 21 can be specified, and a size of the workpiece W, a part occupied by the workpiece W on the stage 21, and the like can be specified.

In step SD3, the imaging section 50 captures an image of the workpiece W searched for in step SD2. At this time, when a grayscale image is to be generated, the imaging section 50 captures the image in a state in which the red light source 45a, the green light source 45b, and the blue light source 45c of the ring illumination 45 are all turned on to illuminate the workpiece W with white light.

On the other hand, when a color image is to be generated, the above-described grayscale workpiece image is acquired, and further, a color information generating section 3f of the control unit 3 generates color information of the workpiece W based on a plurality of workpiece images generated by the imaging section 50 each time each beam off detection light having a plurality of different wavelengths is emitted from the ring illumination 45. Specifically, a workpiece image during red illumination captured by the imaging section 50 with only the red light source 45a turned on, a workpiece image during green illumination captured by the imaging section 50 with only the green light source 45b turned on, and a workpiece image during blue illumination captured by the imaging section 50 with only the blue light source 45c turned on are generated. The color information generating section 3f acquires hue and saturation as the color information from these three workpiece images.

The control section 3d generates a color image obtained by adding the color information of the workpiece generated by the color information generating section 3f to the grayscale workpiece image. Here, an RGB image including three channels of red, green, and blue can be converted into an HSV image including hue (H), saturation (S), and a value of brightness (V). The color information corresponds to the hue (H) and the saturation (S). It is possible to generate a new color image by assigning desired color information to the hue (H) and the saturation (H) with a single-channel image as the value of brightness (V) in order to add the color information to the single-channel image. In the present example, the color image is generated by combining the hue and saturation acquired by the color information generating section 3f with a value of brightness of the grayscale workpiece image. Note that a color space is not limited to HSV, and handling using another color space such as HLS is also possible.

When a color image is to be generated, the grayscale workpiece image is an image directly used for measurement, and thus, is obtained using a high-magnification image captured by the high-magnification-side imaging element 55, and the workpiece images for generating the color information, that is, the workpiece image during red illumination, the workpiece image during green illumination, and the workpiece image during blue illumination are obtained using low-magnification images captured by the low-magnification-side imaging element 56. Therefore, the color image is acquired by adding the color information generated based on the low-magnification images to the grayscale workpiece image which is the high-magnification image. Since a depth becomes deeper in imaging by the low-magnification-side imaging element 56, it is possible to acquire the color information of a wide range and a deep depth in a short time by acquiring the workpiece images for generating the color information by the low-magnification-side imaging element 56. The acquired color information can be added to the workpiece image captured by the high-magnification-side imaging element 55 with a shallow depth.

As the grayscale workpiece image, an image captured under different capturing conditions (exposure, illumination intensity, illumination type, lens magnification, and the like) from the workpiece images for generating the color information can be used. In addition, the color information may be added to workpiece images obtained under different illumination conditions, focus conditions, and the like. Further, even if an image captured in real time by the imaging section 50 has a single channel, the color information acquired by the color information generating section 3f can be added.

Next, the flow proceeds to step SD4. In step SD4, it is determined whether or not it is necessary to capture an image of a part adjacent to a range whose image is captured in step SD3. The search result in step SD2 is used in this determination. When the workpiece W is also present outside the range whose image is captured in step SD3 and it is necessary to capture the image of the part, it is determined as YES in step SD4, and the flow proceeds to step SD5. In step SD5, the XY-direction driving section 23 is controlled to move the stage 21 such that another part of the workpiece W enters the imaging visual field of the imaging section 50. Thereafter, the flow proceeds to step SD3, and an image of a part different from a part captured for the first time is captured by the imaging section 50. Steps SD5 and SD3 are repeated as many times as necessary, and a connection process of connecting a plurality of workpiece images thus acquired is executed. That is, the control section 3d controls the XY-direction driving section 23 and the imaging section 50, generates the plurality of workpiece images for different sites of the workpiece, and generates a connected image, which is an image of a region wider than the imaging visual field of the imaging section 50, by connecting the plurality of generated workpiece images. The color information of the workpiece generated by the color information generating section 3f is added to the connected image as well. As a result, the color connected image can be acquired. Note that additional imaging is unnecessary if it is determined as NO in step SD4, and thus, this flow is ended.

Thereafter, the flow proceeds to step SC6 of the flowchart illustrated in FIG. 16. In step SC6, the control section 3d causes the display section 4 to display the color image when the color image is generated in step SC5, and causes the display section 4 to display the grayscale image when the grayscale image is generated in step SC4. Further, when the connected image is generated, the control section 3d causes the display section 4 to display the color connected image or the grayscale connected image. Further, when a live-view image is generated, the control section 3d causes the display section 4 to display a color live-view image or a grayscale live-view image.

In step SC6, a bird's-eye view image captured by the front camera 48 can also be displayed on the display section 4. When the front camera 48 captures a plurality of bird's-eye view images, the plurality of bird's-eye view images can be displayed as thumbnails on the display section 4. That is, the respective bird's-eye view images are reduced in size and displayed side by side in a predetermined direction. When the user selects any one reduced image, the control section 3d causes the display section 4 to display the bird's-eye view image corresponding to the selected reduced image.

In step SC7, a measurement instrument is determined. The measurement instruments include the image measuring section 3a that measures a dimension of the workpiece W based on the workpiece image, the coordinate measuring section 3b that measures three-dimensional coordinates using the touch probe 80, and the displacement measuring section 3c that measures displacement using the non-contact displacement meter 70. The user can select any measurement instrument among the image measuring section 3a, the coordinate measuring section 3b, and the displacement measuring section 3c. For example, when an operation of selecting the measurement instrument is performed on a user interface screen displayed on the display section 4, such a selection operation is received by the receiving section 3e.

The flow proceeds to step SC8 if it is determined in step SC7 that the image measuring section 3a is selected, proceeds to step SC9 if it is determined that the coordinate measuring section 3b is selected, and proceeds to step SC10 if it is determined that the displacement measuring section 3c is selected.

Figure 18:
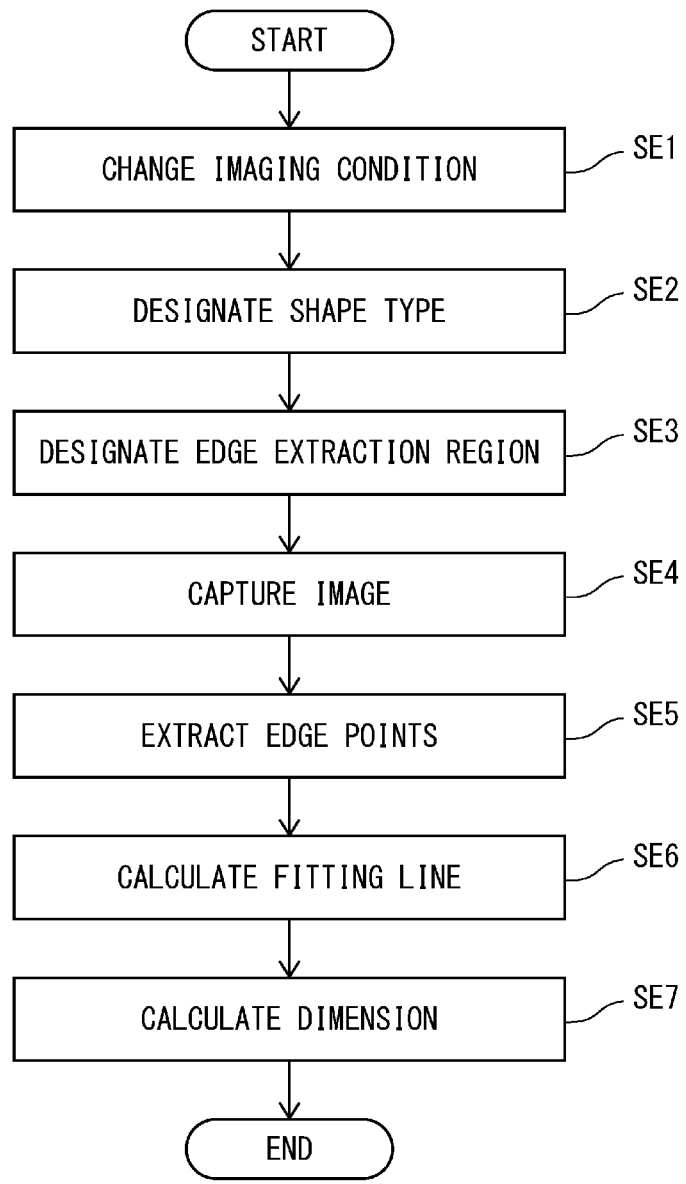
FIG. 18 is a flowchart illustrating an example of a procedure at the time of measurement setting of image measurement.

Details of a case where image measurement is selected (step SC8) are illustrated in a flowchart illustrated in FIG. 18. In step SE1 after the start, the control section 3d changes an imaging condition to an imaging condition corresponding to the image measurement of the workpiece W. The imaging condition includes illumination, exposure time, and the like.

In step SE2, the receiving section 3e receives a shape type designated by the user. In step SE3, the receiving section 3e receives designation of an edge extraction region performed by the user. The edge extraction region can be set to be a region extracted as an edge on a workpiece image and used for measurement. In step SE4, the imaging section 50 captures an image of the workpiece W on the stage 21. In step SE5, a plurality of edge points are detected on the workpiece image acquired in step SE4. The edge point can be detected based on a change in a luminance value on the workpiece image. In step SE6, a fitting line passing through the plurality of edge points is calculated. Thereafter, in step SE7, the image measuring section 3a calculates the dimension using the fitting line. The image measuring section 3a measures the dimension of the workpiece W based on a high-magnification image generated by the high-magnification-side imaging element 55.

Figure 19:
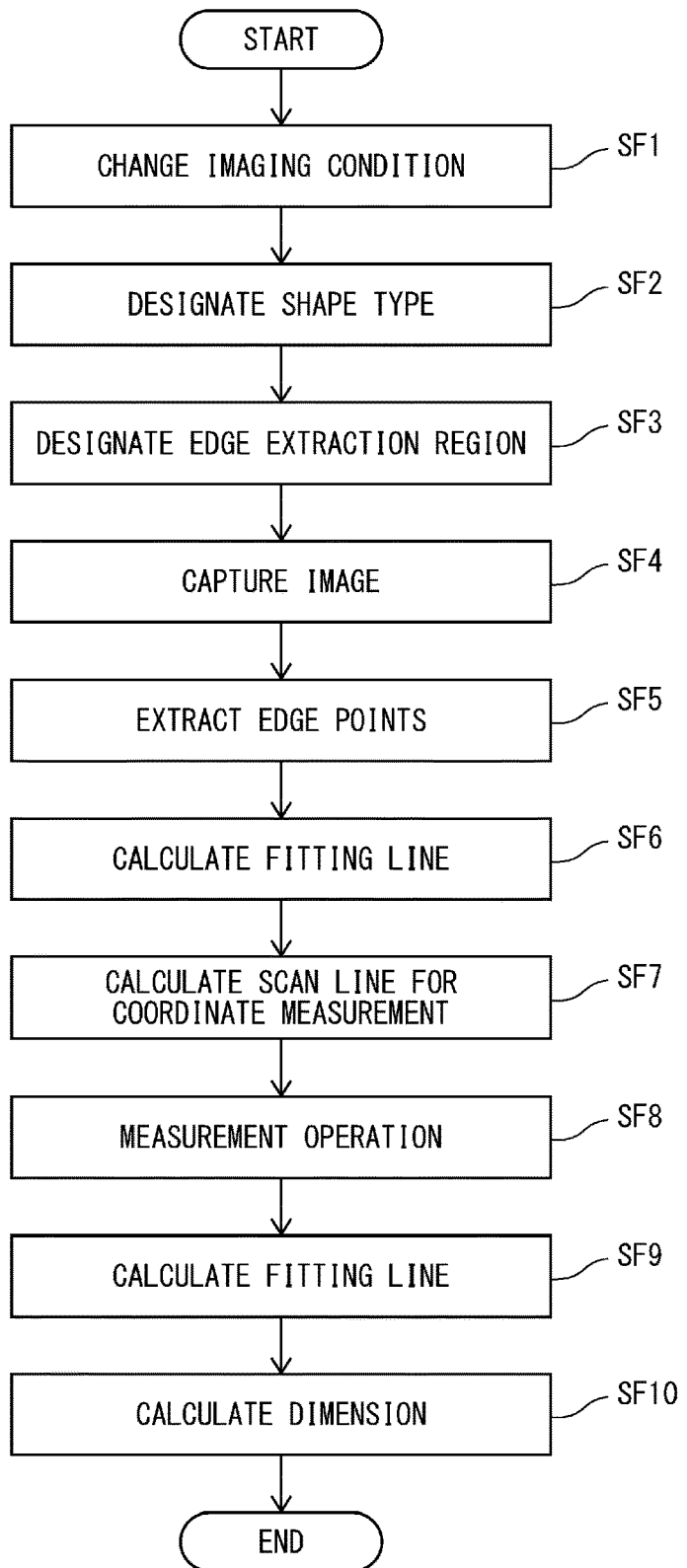
FIG. 19 is a flowchart illustrating an example of a procedure at the time of measurement setting of coordinate measurement.

Details of a case where coordinate measurement is selected (step SC9) are illustrated in a flowchart illustrated in FIG. 19. Steps SF1 to SF6 after the start are the same as SE1 to SE6 in the flowchart illustrated in FIG. 18. Thereafter, in step SF7, a scan line for the coordinate measurement, that is, a scan line of the touch probe 80 is calculated. In step SF8, a measurement operation using the touch probe 80 is performed. Thereafter, a fitting line is calculated again in step SF9, and then, the coordinate measuring section 3b calculates the dimension in step SF10.

Figure 20:
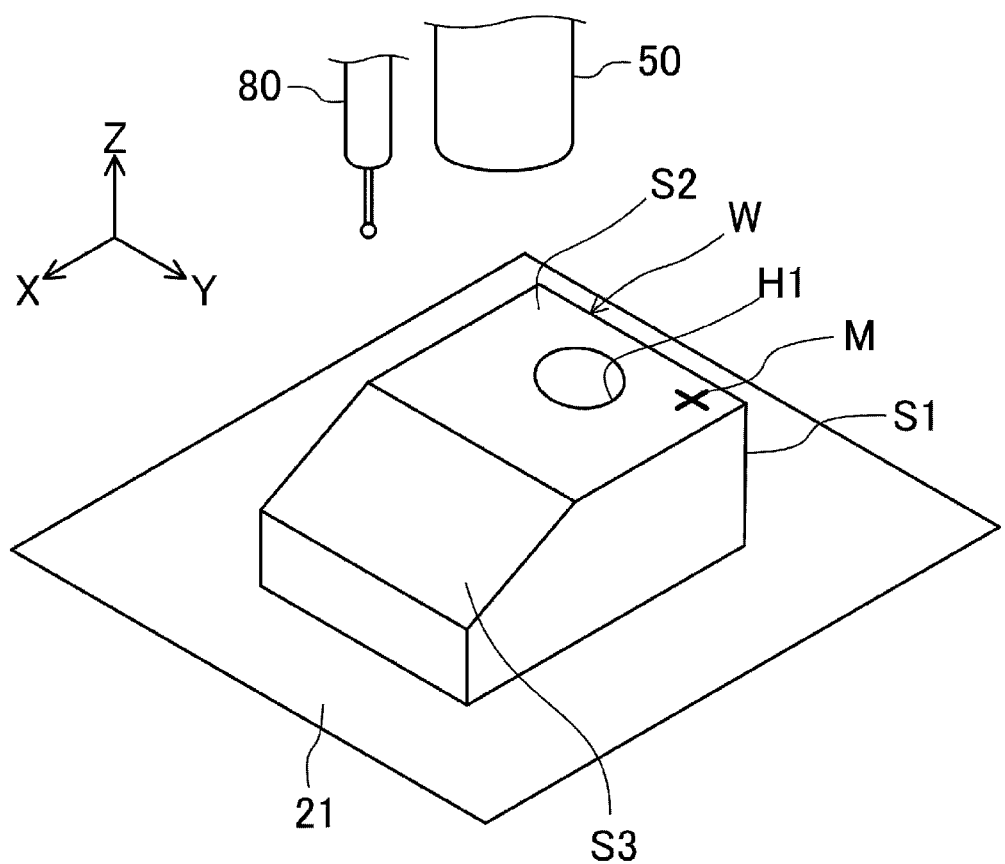
FIG. 20 is a perspective view of a workpiece on a stage.
Figure 21:
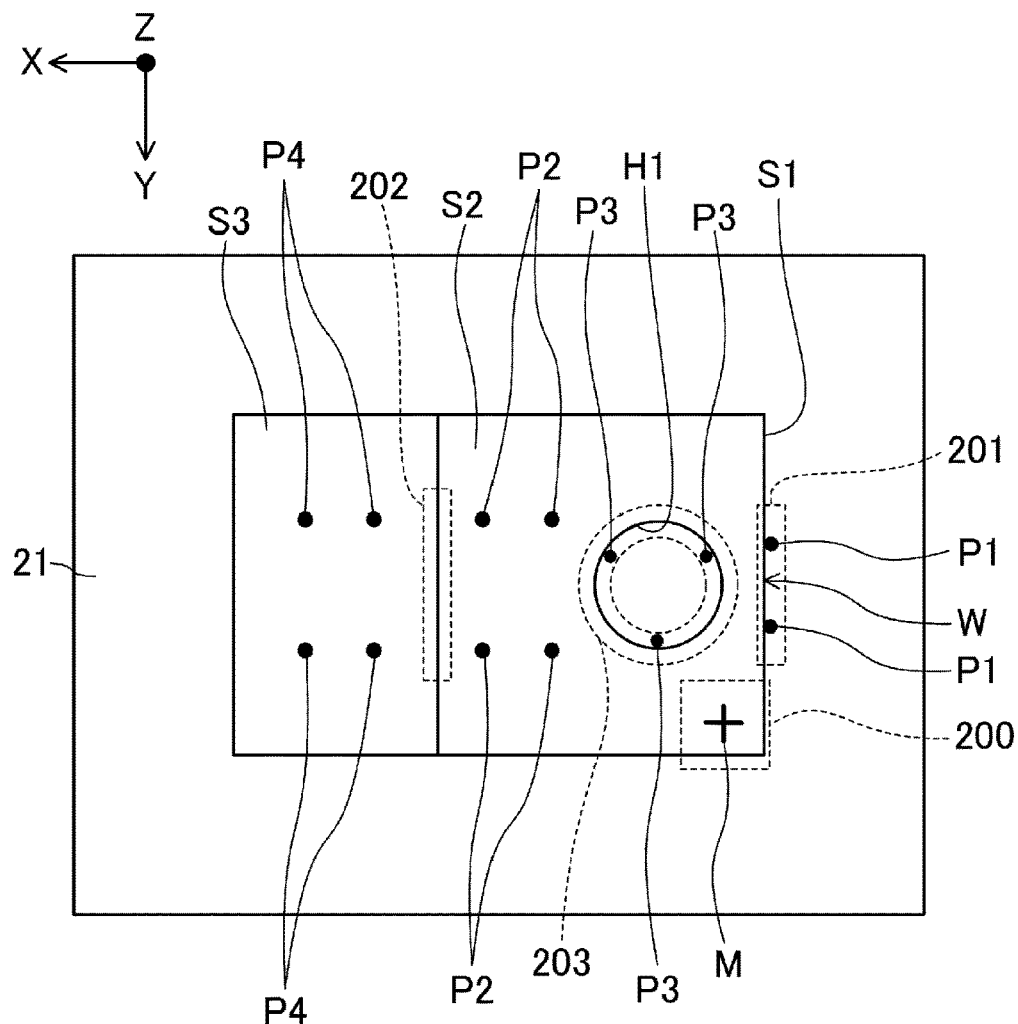
FIG. 21 is a planar image of the stage on which the workpiece is placed.

Here, details of the coordinate measurement will be described with a specific example. FIG. 20 is a perspective view illustrating a state in which the workpiece W is placed on the stage 21, and FIG. 21 is a planar image obtained by capturing an image of the state in which the workpiece W is placed on the stage 21 from above. In FIGS. 20 and 21, absolute coordinates in a three-dimensional space surrounded by the stage 21, the support section 22 (illustrated in FIG. 2 and the like), and the imaging section 50 are indicated by X, Y, and Z.

The workpiece W includes a side surface S1 extending along the Z direction, an upper surface S2 extending along the XY directions, an inclined surface S3 inclined at a predetermined tilt angle with respect to the Z direction, and a hole H1 that is open on the upper surface S2 and extends along the Z direction. Further, an alignment mark M for positioning is provided on the upper surface S2.

At the time of measurement setting, a plan-view image of the workpiece as illustrated in FIG. 21 is displayed on the display section 4. On the workpiece image displayed on the display section 4, the user sets a first contact target position P1 serving as a reference for bringing the touch probe 80 into contact with the side surface S1 of the workpiece W in the XY directions, a second contact target position P2 serving as a reference for bringing the touch probe 80 into contact with the upper surface S2 of the workpiece W in the Z direction, and a characteristic pattern for specifying a position and a posture of the workpiece W at the time of measurement execution in association with each other. The above-described setting can be performed by a setting section 3g of the control unit 3. Note that the "first contact target position P1" and the "second contact target position P2" referred to here are concepts including not only a contact point at which the touch probe 80 is brought into contact with the workpiece W, but also operation start position and end position and the like to be described later.

In the present example, the characteristic pattern is the alignment mark M. When the characteristic pattern is to be set, the user operates the mouse 6 or the like to designate a region such that the characteristic pattern is included on the workpiece image as indicated by a rectangular frame line 200 in FIG. 21. A method of setting the characteristic pattern is not limited to the illustrated example, and a region may be designated using a free curve, and a method of designating only the characteristic pattern may be used. Further, the characteristic pattern may be set by a method in which the setting section 3g performs automatically extraction.

The characteristic pattern may be a shape, a pattern, a color, a symbol, a character, or the like of a portion of the workpiece W, and can also be referred to as characteristic amount information. Further, the characteristic pattern only needs to be information for specifying the position and posture of the workpiece W at the time of measurement execution on the workpiece image displayed on the display section 4, and may be any type of information. The characteristic amount information may include a plurality of the characteristic patterns.

In FIG. 21, a third contact target position P3 and a fourth contact target position P4 are also set. The third contact target position P3 is a position serving as a reference for bringing the touch probe 80 into contact with an inner surface of the hole H1 of the workpiece W in the XY directions, and the fourth contact target position P4 is a position serving as a reference for bringing the touch probe 80 into contact with the inclined surface S3 of the workpiece W in a normal direction of the inclined surface S3. The setting section 3g can set the third contact target position P3, the fourth contact target position P4, and the characteristic pattern in association with each other.

Figure 22:
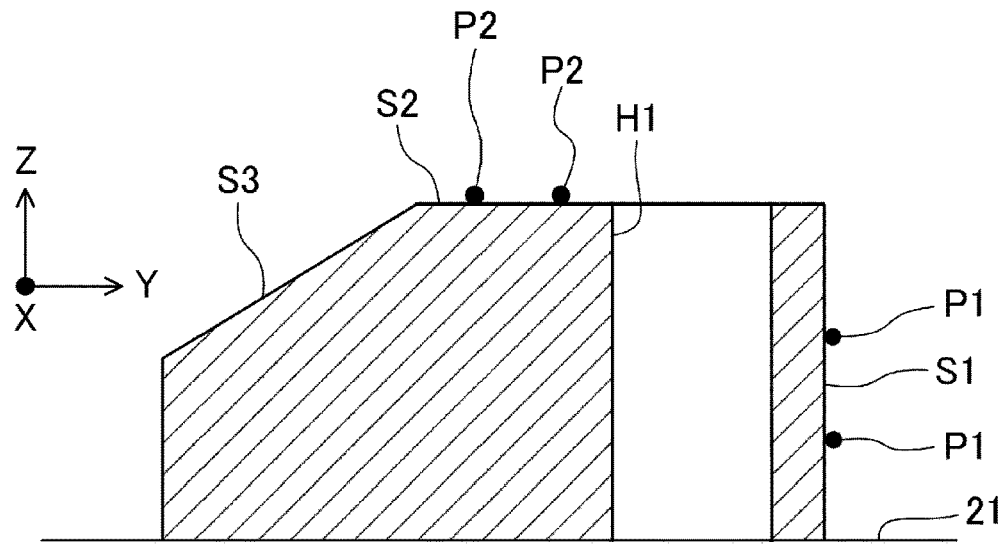
FIG. 22 is a longitudinal cross-sectional view of the workpiece on the stage along a Y direction.
Figure 23:
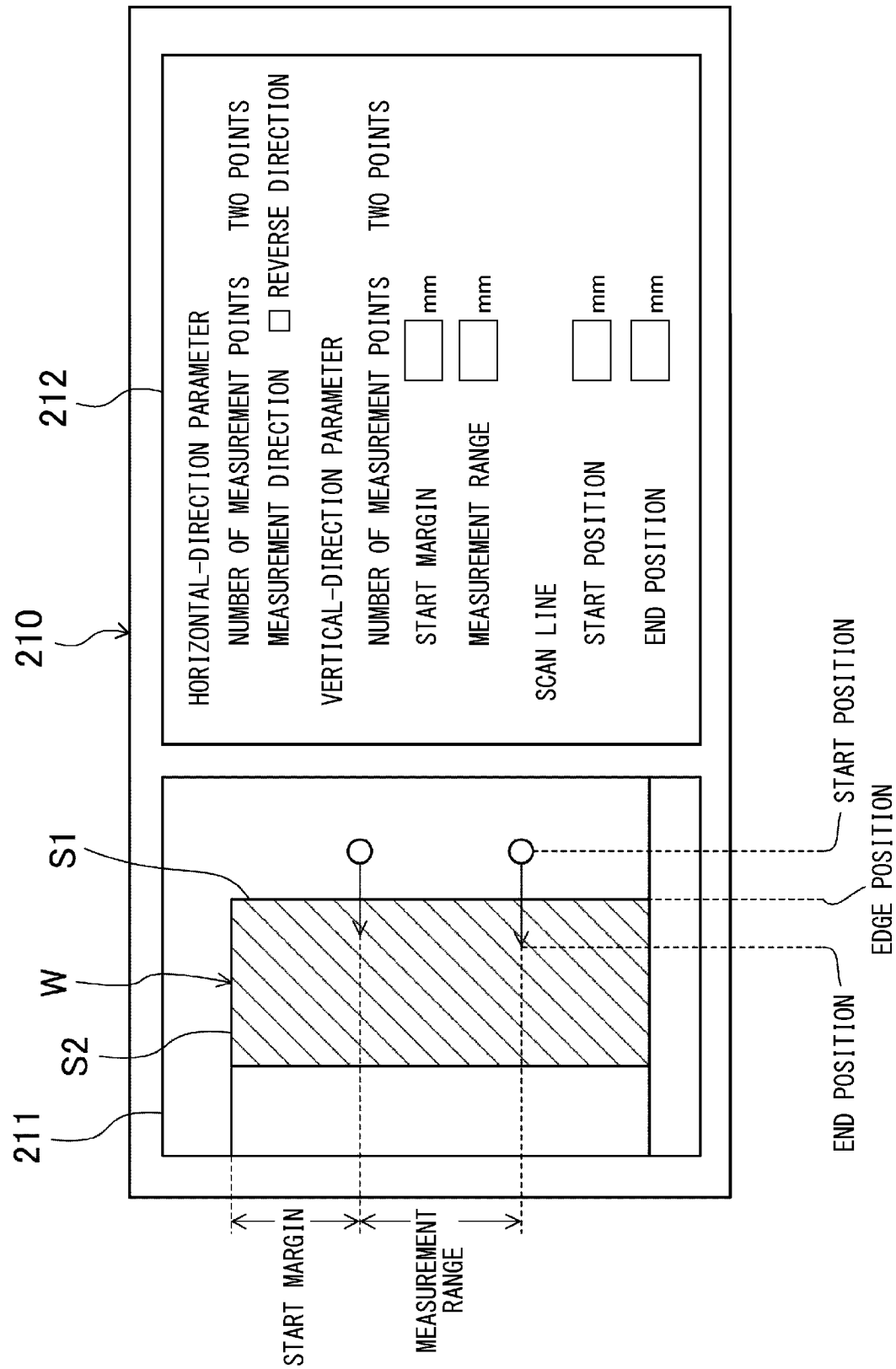
FIG. 23 is a view illustrating an example of a user interface screen for setting a contact target position.

A plurality of the first contact target positions P1 can be set based on the absolute coordinates, can be set to be spaced apart from each other in the Y direction as illustrated in FIG. 21, and can be set to be spaced apart from each other in the Z direction as illustrated in FIG. 22. As illustrated in FIGS. 22 and 23, the display section 4 can display a longitudinal cross section of the workpiece W. Each setting can also be performed on the longitudinal cross section of the workpiece W.

As surrounded by a frame line 201 in FIG. 21, the setting section 3g extracts and sets the side surface S1 of the workpiece W as a first edge measurement element (straight edge element) on the workpiece image. The first edge measurement element corresponds to an outer surface of the workpiece W, and thus, can be accurately and clearly extracted by illumination using the transmission illumination 30. The setting section 3g sets the first edge measurement element in association with the extracted first contact target position P1. In addition to the automatic setting described above, the user can manually set the edge by operating the mouse 6 or the like.

For example, a user interface screen 210 for setting a contact target position as illustrated in FIG. 23 can generated by the control section 3d and displayed on the display section 4. The user interface screen 210 for setting is provided with a cross section display region 211 in which a cross section of the workpiece W is displayed and a parameter setting region 212. In the parameter setting region 212, a plurality of parameters for setting the first contact target position P1 can be set. For example, the number of measurement points in the XY directions can be set as a horizontal-direction parameter. In the present example, the number of measurement points in the XY directions is two as illustrated in FIG. 21, and thus, the number of measurement points in the XY directions is set to two, but the number of measurement points is not limited thereto. As many measurement points as the set number of measurement points are displayed on the display section 4. The number of measurement points is the number of contact target positions of the touch probe 80 to be arranged.

The setting section 3g can set a position in the XY directions on the workpiece image at the time of setting the first contact target position P1. For example, the position of the first contact target position P1 in the XY directions is set by moving the first contact target position P1 on the workpiece image using the mouse 6 or the like. Further, the position of the first contact target position P1 in the XY directions can be arbitrarily set by inputting a separation distance from the reference position in each of the X direction and the Y direction separately using the keyboard 5 or the like, for example. Furthermore, a height position of the first contact target position P1 in the Z direction can be set in the same manner.

The horizontal-direction parameter may include a setting parameter in a measurement direction. The measurement direction is an approach direction of the touch probe 80 toward the contact target position. The measurement direction illustrated in FIG. 23 is set as indicated by an arrow, and from right to left, but there is a case where it is desired to set the opposite direction depending on the workpiece W. In such a case, the user checks "reverse direction" to select the reverse direction. This operation is set by the setting section 3g and then stored in the storage section 7 as the approach direction.

Further, the approach direction includes a first approach direction in which the touch probe 80 is moved from above to approach the workpiece W and a second approach direction in which the touch probe 80 is made to approach the inclined surface S3 of the workpiece W in the normal direction, and the approach directions can be arbitrarily selected by the user.

As vertical-direction parameters, the number of measurement points, a start margin, and a measurement range in the Z direction can be set. In the present example, the number of measurement points in the Z direction is two. The start margin is a dimension in the Z direction from the upper surface S2 of the workpiece W to the upper first contact target position P1. The measurement range is a dimension from the upper first contact target position P1 to the lower first contact target position P1.

In the parameter setting region 212, parameters related to a scan line can also be set. The scan line can also be defined as a path for moving the touch probe 80 from a position not in contact with the workpiece W to a position in contact with the workpiece W. The parameters related to the scan line is path information of the touch probe 80 when the touch probe 80 is caused to approach the workpiece W, and an approach path of the touch probe 80 to the contact target position can be the scan line. The scan line may be straight or bent.

A start position (start point) of the scan line is the operation start position of the touch probe 80, and any distance in the horizontal direction from an edge position of the side surface S1 of the workpiece W that the start position is to have can be set to a specific dimension. Further, any distance from the edge position of the side surface S1 of the workpiece W toward the inside of the cross section of the workpiece W that an end position of the scan line is to have can be set to a specific dimension. Even if the scan line reaches the inside of the cross section of the workpiece W, scanning is automatically stopped when the touch probe 80 comes into contact with the workpiece W.

A plurality of the second contact target positions P2 can also be set based on the absolute coordinates, and can be set to be spaced apart from each other in the X direction and the Y direction as illustrated in FIG. 21. Parameters of the second contact target position P2 are different from the parameters of the first contact target position P1, and the number of measurement points in the X direction and the number of measurement points in the Y direction are set. Setting of vertical-direction parameters is omitted. The setting section 3g extracts and sets, on the workpiece image, a line that is a boundary between the upper surface S2 and the inclined surface S3 of the workpiece W as a second edge measurement element (straight edge element), but the second edge measurement element (a part surrounded by a frame line 202) and the second contact target position P2 are not associated with each other.

A plurality of the third contact target positions P3 can also be set based on the absolute coordinates, can be set to be spaced apart from each other in the circumferential direction of the hole H1, and can be set to be spaced apart from each other in the Z direction. In the case of the hole H1, a position close to a central axis from the inner surface of the hole H1 in plan view is set as a start position. The approach direction is a direction from a position close to the central axis from the inner surface of the hole H1 toward the inner surface of the hole H1, and this direction can also be set by the user interface as illustrated in FIG. 23. Further, in the case of the hole H1, measurement points are arranged side by side in the circumferential direction, and the number of the measurement points can also be set. Parameters of the third contact target position P3 can be set similarly to the parameters of the first contact target position P1.

The setting section 3g extracts and sets a peripheral edge portion of the hole H1 as a third edge measurement element (circular edge element) on the workpiece image. The setting section 3g sets the third contact target position P3 in association with the extracted third edge measurement element (part surrounded by a frame line 203). When the workpiece W has a cylindrical portion, a measurement point of the cylindrical portion can be set in the same manner.

Figure 24:
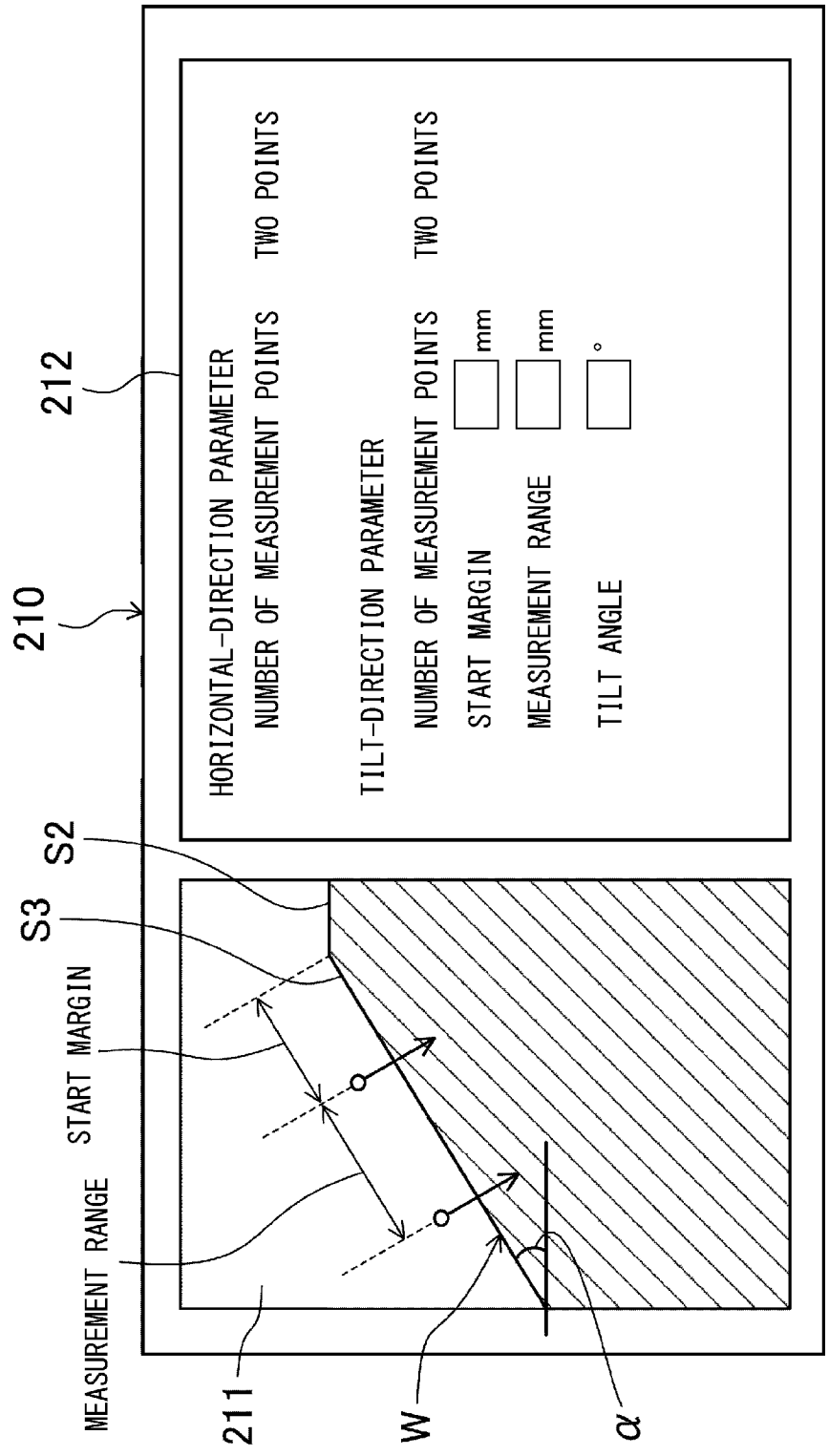
FIG. 24 is a view illustrating an example of the user interface screen for setting the contact position with respect to an inclined surface.

A plurality of the fourth contact target positions P4 can also be set based on the absolute coordinates. FIG. 24 illustrates the user interface screen 210 for setting the contact target position with respect to an inclined surface. The horizontal-direction parameters of the parameter setting region 212 are similar to those at the time of setting the first contact target position P1, but has a difference in setting of tilt-direction parameters. As the tilt-direction parameters, the number of measurement points, a start margin, and a measurement range in a tilt direction can be set. The start margin is a dimension in a direction along the inclined surface S3 from the second edge measurement element to the upper fourth contact target position P4 illustrated in FIG. 21. The measurement range is a dimension from the upper fourth contact target position P4 to the lower fourth contact target position P4. Further, a tilt angle α of the inclined surface S3 can also be set. The tilt angle α of the inclined surface S3 is angle information near the contact target position of the touch probe 80, and the setting section 3g can also receive an input of the tilt angle α. Further, the setting section 3g sets the fourth contact target position P4 in association with the above-described second edge measurement element (the part surrounded by the frame line 202 in FIG. 21). Various types of setting information set as described above are stored in the storage section 7.

At the time of measurement setting, a measurement range in which dimension measurement is performed can also be set. For example, when it is desired to measure only the upper surface S2 of the workpiece W, the user sets a measurement range so as to surround only the upper surface S2 on the workpiece image displayed on the display section 4. The receiving section 3e is configured to be capable of receiving the setting of the measurement range performed by the user. Setting information of the measurement range received by the receiving section 3e is also stored in the storage section 7.

Figure 25:
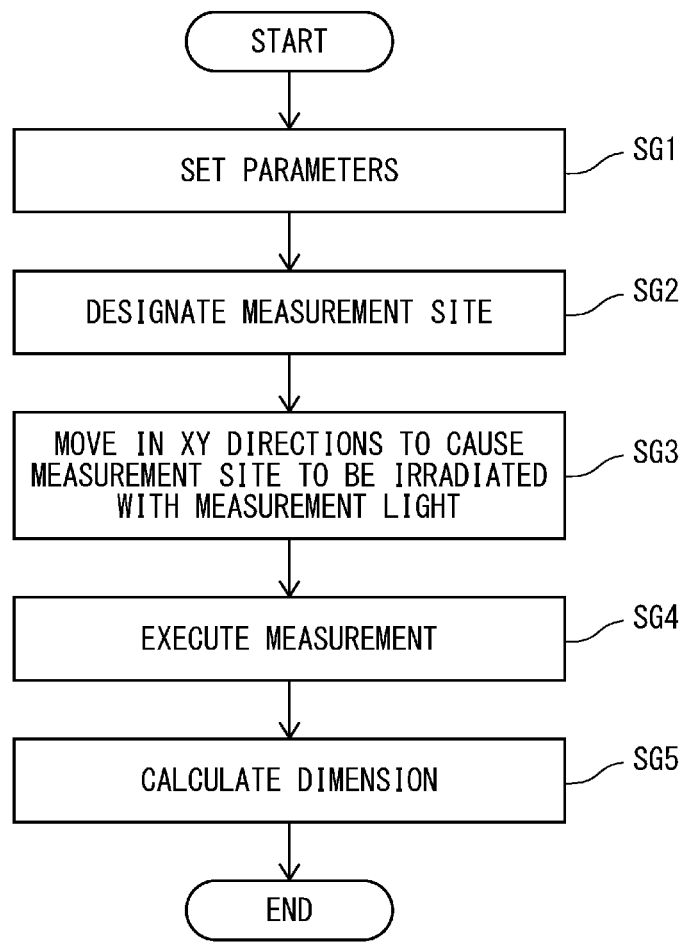
FIG. 25 is a flowchart illustrating an example of a procedure of measurement using a non-contact displacement meter.

Next, details in step SC10 (measurement using the non-contact displacement meter 70) of the flowchart illustrated in FIG. 16 are illustrated in a flowchart illustrated in FIG. 25. In step SG1 after the start, parameters for non-contact displacement measurement are set. Thereafter, the flow proceeds to step SG2, and the control section 3d receives designation of a height measurement site on the workpiece image. In step SG2, a position in the XY directions is designated. For example, the user may confirm a desired measurement site and designate the measurement site using the mouse 6 or the like while viewing the workpiece image displayed on the display section 4, or may input position designation information, such as coordinates, as numerical values to designate a measurement site. A plurality of measurement sites can be designated.

The flow proceeds to step SG3 after the designation of the measurement site, and the control section 3d controls the stage 21 such that the measurement site designated in step SG2 is irradiated with measurement light of the non-contact displacement meter 70. Specifically, the control section 3d controls the Z-direction driving section 25 and the XY-direction driving section 23 to make a focal point of the non-contact displacement meter 70 coincide with the measurement site designated in step SG2. Then, in step SG4, the measurement light is emitted to execute measurement. In step SG5, the displacement measuring section 3c calculates a dimension. At this time, an average process, which will be described later, may be executed.

After step SC10 in the flowchart of FIG. 16, the flow proceeds to step SC11. In step SC11, a measurement tool is set. For example, a tool for measuring a separation dimension between lines, a tool for measuring a diameter, a tool for measuring an angle, and the like can be displayed in a list form on the display section 4 such that the user can select a desired tool. The measurement tool selected by the user is saved.

In step SC12, a measurement result by the measurement tool set in step SC11 is superimposed and displayed on the workpiece image on the display section 4. When a color image is acquired, the measurement result is superimposed and displayed on the color image. Setting of a range in which the measurement result is displayed in a superimposed manner can also be received in advance by the receiving section 3e. At the time of measurement setting, for example, if the user designates a range in which the measurement result is desired to be superimposed and displayed on the color image displayed on the display section 4, the range is received by the receiving section 3e and then stored in the storage section 7. At the time of measurement execution, the designated range is read from the storage section 7, and the measurement result is displayed in a superimposed manner only within the designated range. Note that the measurement result can also be displayed in a moving image when a live-view image is acquired.

Figure 26:
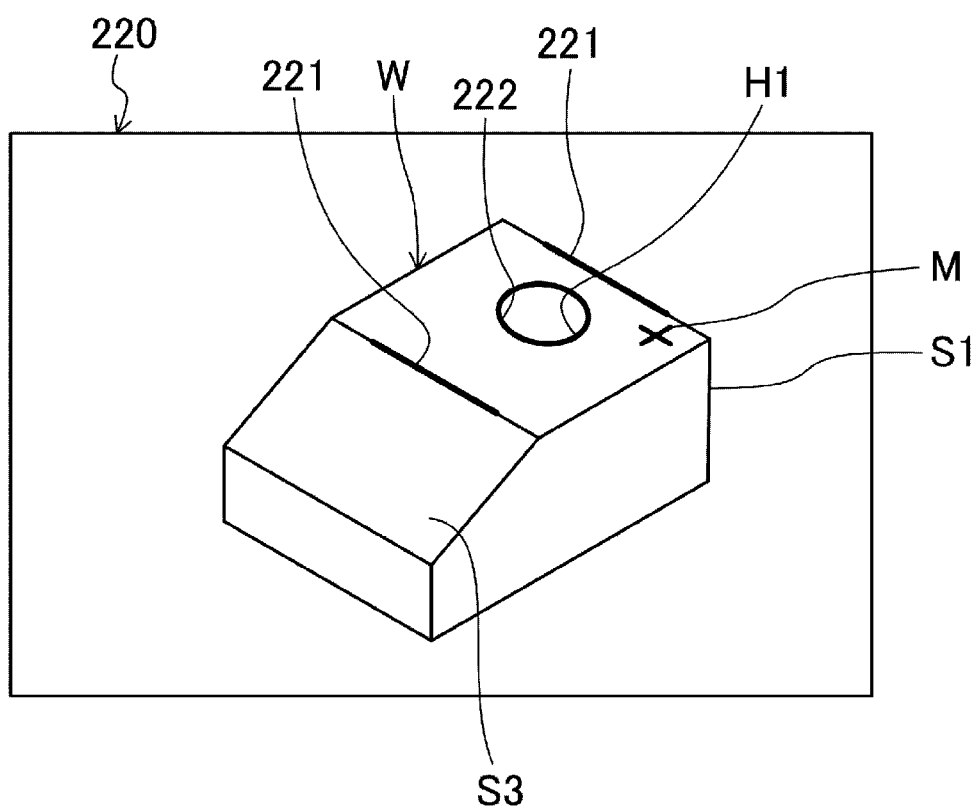
FIG. 26 is a view illustrating an example of a user interface screen for displaying a geometric element.

Further, in step SC13, for example, when a measurement result by the image measuring section 3a is acquired, the measurement result of the image measuring section 3a is superimposed and displayed on the bird's-eye view image generated by the front camera 48. In step SC13, geometric elements 221 and 222 corresponding to the measurement result of the image measuring section 3a can also be displayed on the bird's-eye view image, for example, as illustrated in FIG. 26. FIG. 26 is another example of a user interface screen 220 for displaying the geometric elements 221 and 222 (indicated by thick lines) on the display section 4, and a workpiece image and the geometric elements 221 and 222 corresponding to shapes of measurement elements of the workpiece image are displayed in a superimposed manner. The geometric elements 221 and 222 may have a rectangular shape and the like other than a straight line and a circle, and only need to have shapes corresponding to the measurement elements. The geometric elements 221 and 222 are set as edge measurement elements by the setting section 3g, and include a straight edge, a circular edge, a rectangular edge, and the like.

Arrangement positions and the number of contact target positions of the touch probe 80 can be made to correspond to each of the measurement elements. For example, the geometric element 221 and the geometric element 222 can be associated, respectively, with different positions as positions at which the contact target positions are arranged, and can be associated, respectively, with different numbers of contact target positions. The correspondence relationship between a shape type or a size of the measurement element and the arrangement positions and the number of contact target positions of the touch probe 80 with respect to the measurement element can be stored in the storage section 7. Note that the shape type, size, and the like of the geometric element can also be set on the bird's-eye view image.

The bird's-eye view image is an image generated by the front camera 48, whereas the workpiece image from which the geometric elements 221 and 222 are extracted is an image generated by the imaging section 50 different from the front camera 48, and thus, there is a possibility that a deviation occurs if the geometric element is superimposed and displayed on the bird's-eye view image without correction. However, the present example is configured such that it is possible to execute a correction process of correcting the deviation of the geometric element with respect to the bird's-eye view image before measurement. Examples of the deviation of the geometric element include a deviation due to optical characteristics of the camera and the lens, a deviation of the camera, and the like. The correction process may be performed at the time of shipment of the image measurement apparatus 1 from a factory, or may be performed after the shipment. The correction process may be performed by any method, and an example thereof will be described below.

In the correction process, for example, a workpiece for correction (not illustrated) having a dot chart or the like is prepared and placed on the stage 21. An image of the workpiece for correction on the stage 21 is captured by the imaging section 50, and center coordinates of each of dots are detected. Further, the front camera 48 also captures an image of the workpiece for correction on the stage 21, and detects center coordinates of each of the dots. A correction table is generated as an internal parameter so as to enable transformation of the center coordinates detected based on the image of the imaging section 50 and the center coordinates detected based on the image of the front camera 48. Instead of the correction table, a transformation function may be used. Thereafter, the correction table is applied to the image captured by the imaging section 50 to perform transformation into projection coordinates.

The correction process includes, for example, an external parameter detection process. That is, an image of the workpiece for correction on the stage 21 is captured by the imaging section 50, and three-dimensional coordinates of the center of each of dots are detected. Center coordinates of each of the dots in the projection coordinates of the image of the front camera 48 are obtained using the internal parameter. A transformation matrix of these corresponding images is obtained. Further, positions and postures of the imaging section 50 and the front camera 48 are defined in a three-dimensional space. The transformation matrix between the center coordinates detected based on the image of imaging section 50 for the detected dot and the center coordinates detected based on the image of front camera 48 is obtained.

Figure 27:
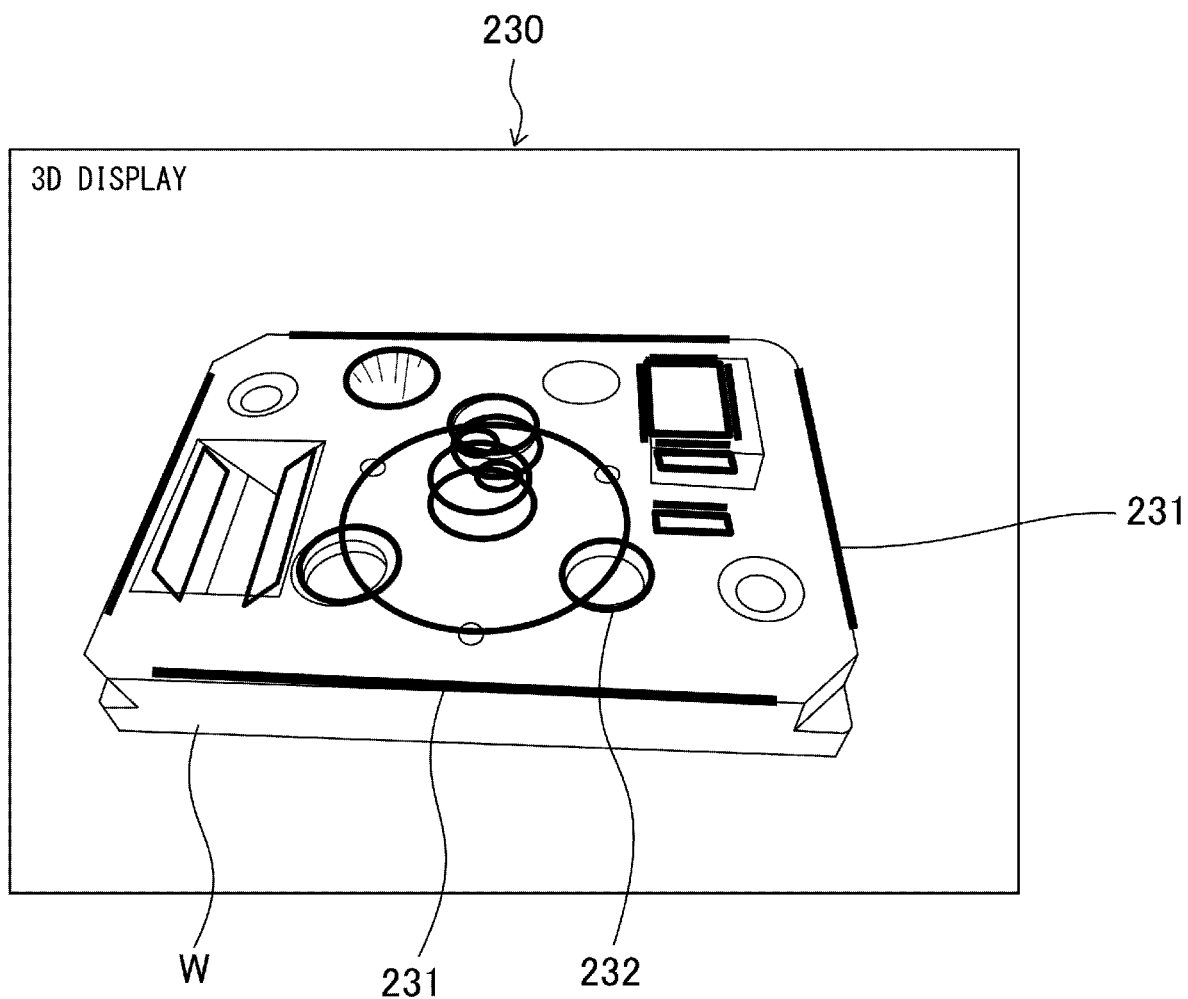
FIG. 27 is a view illustrating an example of a user interface screen for superimposing and displaying the geometric element on a three-dimensional image.

In step SC13 of the flowchart illustrated in FIG. 16, measurement results and the geometric elements 231 and 232 may be superimposed and displayed on a user interface screen 230 capable of three-dimensionally displaying the workpiece W as illustrated in FIG. 27.

In step SC14, it is determined if there is no other measurement element. If there is any other measurement element, the flow returns to step SC7. If there is no other measurement element, the flow proceeds to step SC15. In step SC15, a pattern search is set. For example, as illustrated in FIG. 21, the alignment mark M, which is the characteristic pattern, can be set as a search target. In this case, the user can generate the frame line 200 surrounding the alignment mark M, and can designate a region in the frame line 200 as a search region.

In step SC16, pieces of setting information set in the respective processes illustrated in this flowchart are stored in the storage section 7. That is, the characteristic pattern (characteristic amount information) set by the setting section 3*g*, a relative positional relationship between the first and second contact target positions P1 and P2 with respect to the characteristic pattern, and the like are stored. Further, for example, a fixed positional relationship between the imaging section 50 and the touch probe 80 or the like is also stored in the storage section 7. The fixed positional relationship is a relative positional relationship of the touch probe 80 with respect to the imaging section 50, and may be, for example, a relationship indicated by coordinate information, or a relationship indicated by a relative separation distance, separation direction, and the like.

(Measurement Operation of Touch Probe)

Figure 28:
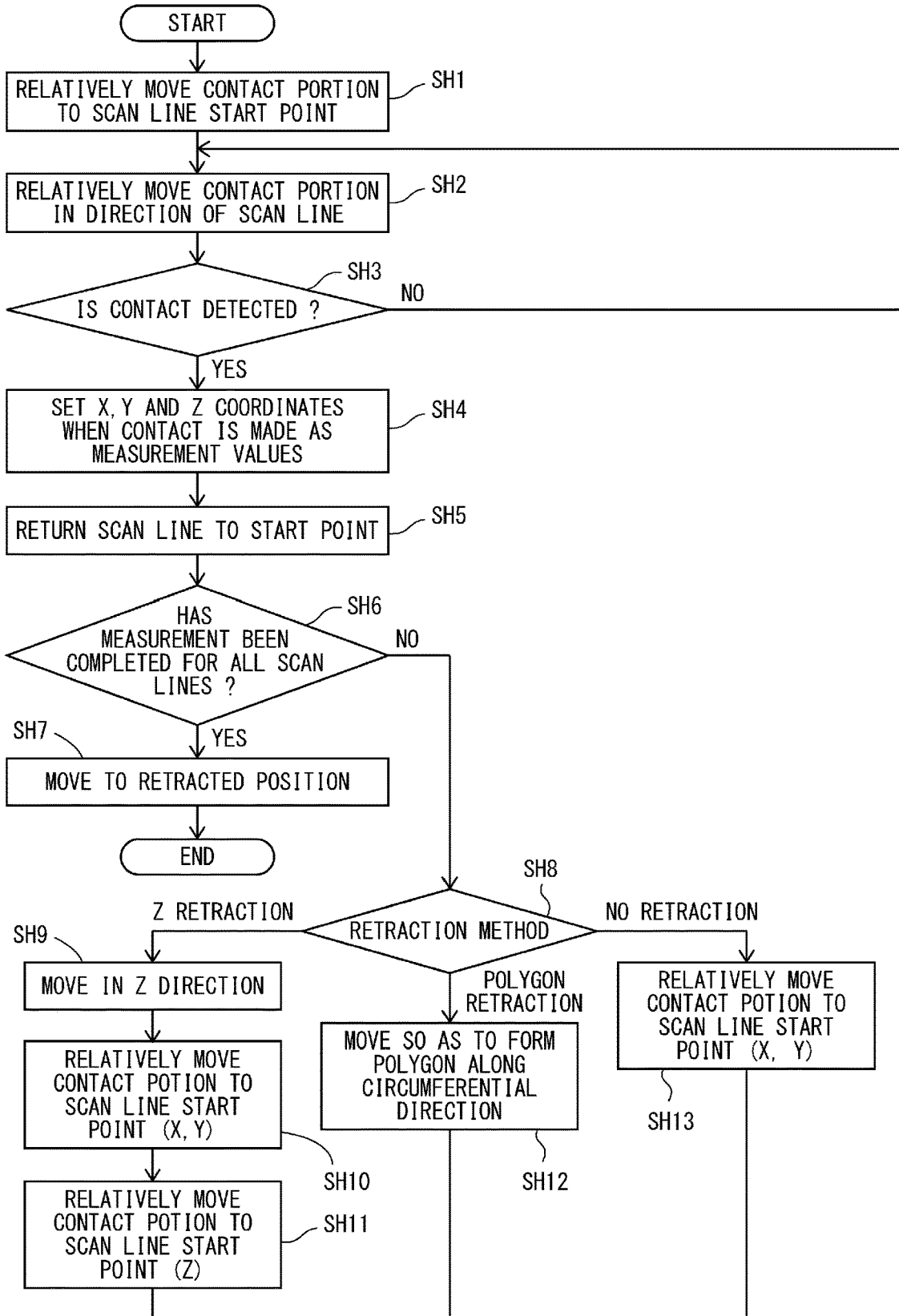
FIG. 28 is a flowchart illustrating an example of a detailed procedure of a measurement operation of the touch probe.

Next, details of the measurement operation of the touch probe 80, that is, details of step SF8 of the flowchart illustrated in FIG. 19 will be described based on a flowchart illustrated in FIG. 28. After the start, the control section 3*d* controls the Z-direction driving section 25 to move the measurement execution section 24 upward to the retracted position, and then mounts the desired stylus 83 to the touch probe 80 using the changer mechanism 100 although not illustrated in this flow. Thereafter, the flow proceeds to step SH1, and the contact portion 83*b* of the touch probe 80 is relatively moved to the start point of the scan line set on the user interface screen 210 for setting illustrated in FIG. 23. Specifically, the control section 3*d* controls the XY-direction driving section 23 to move the stage 21 in the XY directions, and causes XY coordinates of the start point of the scan line to coincide with XY coordinates of the contact portion 83*b* of the touch probe 80. Thereafter, the control section 3*d* controls the Z-direction driving section 25 to lower the measurement execution section 24, and places the contact portion 83*b* of the touch probe 80 at the start point of the scan line.

In step SF12, the control section 3*d* controls the XY-direction driving section 23 and the Z-direction driving section 25 to relatively move the contact portion 83*b* of the touch probe 80 in a direction of the scan line (an arrow direction in FIGS. 23 and 24). In step SF13, it is determined whether or not the touch probe 80 has detected contact. If the touch probe 80 does not detect any contact, the contact portion 83*b* of the touch probe 80 is kept relatively moved in the direction of the scan line. When the contact portion 83*b* of the touch probe 80 comes into contact with the workpiece W, the movement is stopped, and it is determined as YES in step SH3, and the flow proceeds to step SH4.

In step SH4, the coordinate measuring section 3*b* acquires X, Y, and Z coordinates when the contact portion 83*b* of the touch probe 80 comes into contact with the workpiece W, and uses the X, Y, and Z coordinates as measurement values. In step SH5, the control section 3*d* controls the XY-direction driving section 23 and the Z-direction driving section 25 to return the contact portion 83*b* of the touch probe 80 to the start point of the scan line. In step SH6, it is determined whether or not the measurement has been completed for all scan lines. When the measurement has been completed for all the scan lines, the flow proceeds to step SH7, and the control section 3*d* controls the Z-direction driving section 25 to move the measurement execution section 24 upward to the retracted position. Thereafter, the stylus 83 is detached by the changer mechanism 100 and stored in the retracted position as necessary.

In a case where it is determined as NO in step SH6 and there is a scan line for which measurement has not been completed, the flow proceeds to step SH8 to determine a retraction method. When the retraction method is a method of performing retraction in the Z direction, the flow proceeds to step SE19, and the control section 3*d* controls the Z-direction driving section 25 to move the measurement execution section 24 upward to the retracted position. In step SH10, the control section 3*d* controls the XY-direction driving section 23 to relatively move the contact portion 83*b* of the touch probe 80 to the start point (X, Y) of the scan line. Thereafter, in step SH11, the control section 3*d* controls the Z-direction driving section 25 to relatively move the contact portion 83*b* of the touch probe 80 to the start point (Z) of the scan line.

In a case where the retraction method is a polygon retraction method, the flow proceeds to step SH12. In step SH12, the control section 3d controls the XY-direction driving section 23 to relatively move the center of the contact portion 83b of the touch probe 80 to the start point (X, Y) of the scan line so as to form a polygon along the circumferential direction of the measurement element.

When no retraction is performed, the flow proceeds to step SH13, and the control section 3d controls the XY-direction driving section 23 to relatively move the contact portion 83b of the touch probe 80 to the start point (X, Y) of the scan line.

(At Time of Measurement Execution)

Figure 29A:
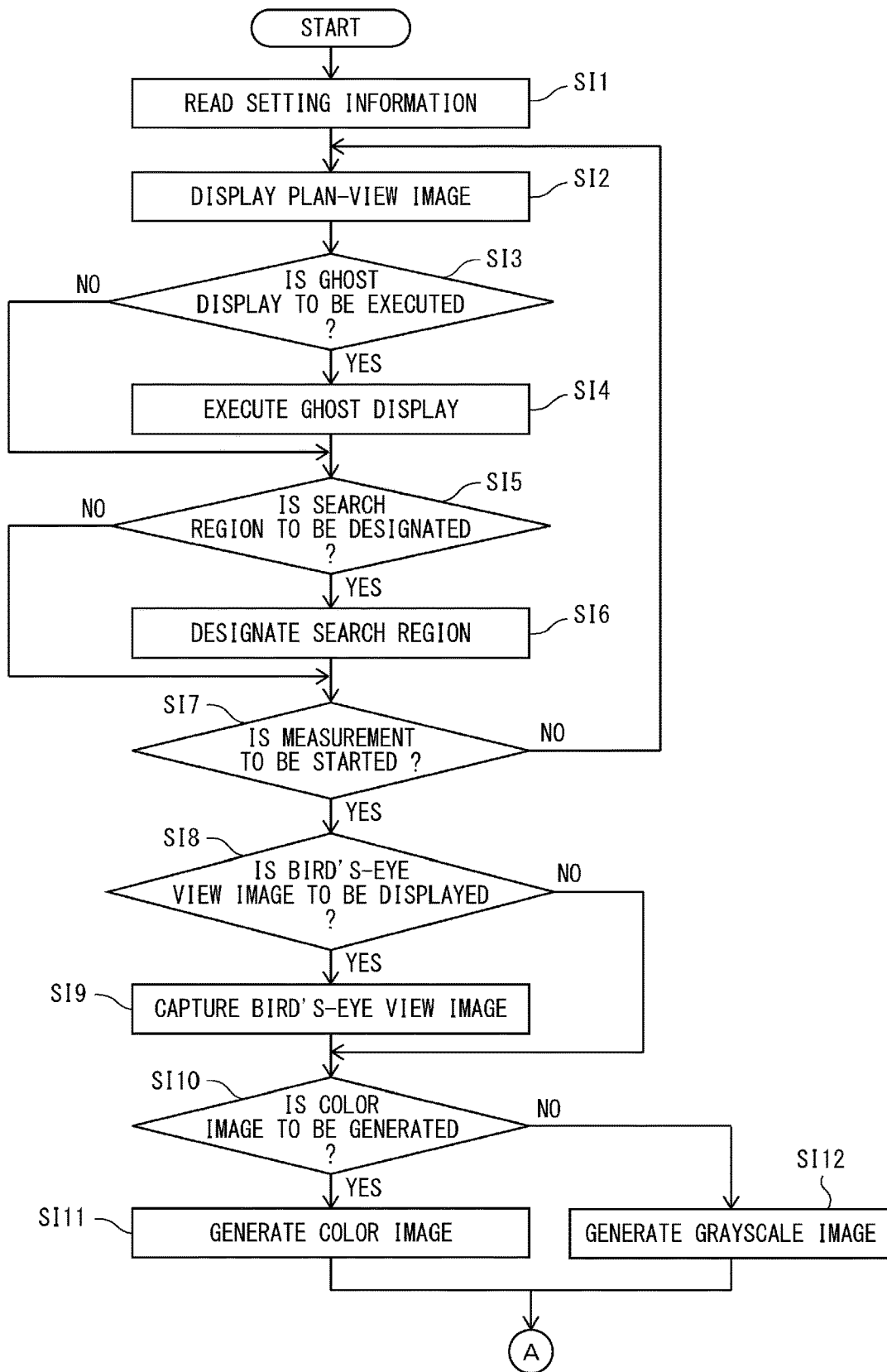
FIG. 29A is a flowchart illustrating an example of a procedure of the first half during the measurement execution of the image measurement apparatus.
Figure 29B:
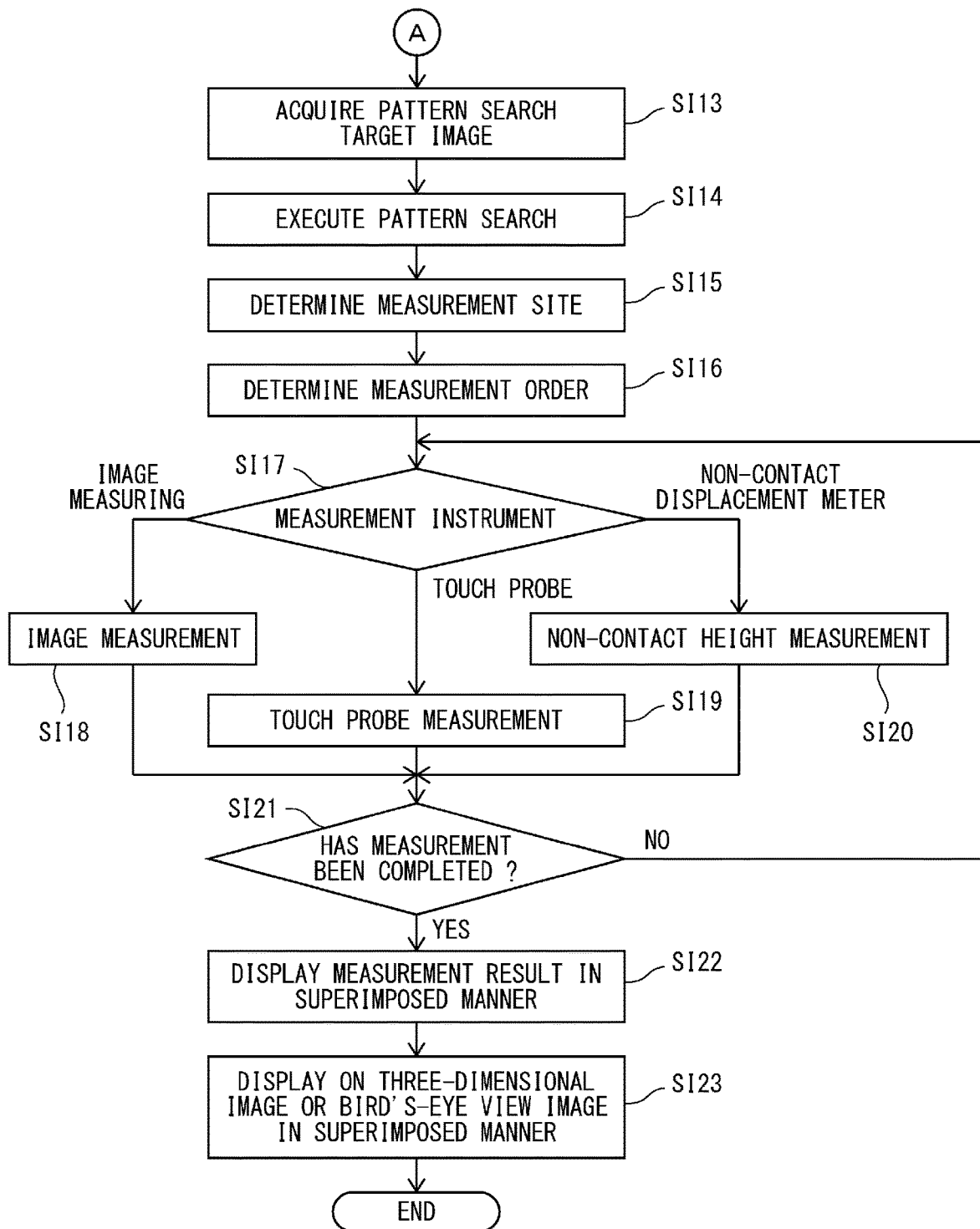
FIG. 29B is a flowchart illustrating an example of a procedure of the second half during the measurement execution of the image measurement apparatus.

FIGS. 29A and 29B are flowcharts illustrating an example of a procedure at the time of measurement execution of the image measurement apparatus 1. In step SI1 after the start, the setting information stored in the storage section 7 is read. For example, the characteristic pattern, the search region, the relative positional relationship between the first and second contact target positions P1 and P2 with respect to the characteristic pattern, the fixed positional relationship between the imaging section 50 and the touch probe 80, and the like are read. Due to provision of this step, it is unnecessary for the user to move the touch probe 80 to set reference coordinates each time the workpiece W is placed on the stage 21, thereby simplifying measurement work.

Further, in step SI1, the position of the measurement element on the workpiece image and the shape type or size of the measurement element are read from the storage section 7. Furthermore, the correspondence relationship between the shape type or size of the measurement element and the arrangement positions and the number of contact target positions of the touch probe 80 with respect to the measurement element is also read from the storage section 7.

In step SI2, the plan-view image is acquired by causing the imaging section 50 to capture the stage 21 from above, and is displayed on the display section 4. In step SI2, the connected image may be displayed, or the bird's-eye view image captured by the front camera 48 may be displayed. Further, the imaging section 50 may acquire the connected image using any one imaging element of the high-magnification-side imaging element 55 and the low-magnification-side imaging element 56, or may acquire the connected images using both the imaging elements, respectively. As described above, since the configuration of the bifurcated optical system using the beam splitter 52 is adopted in the present embodiment, the high-magnification image and the low-magnification image may be simultaneously acquired, and a first connected image obtained by connecting the high-magnification images and a second connected image obtained by connecting the low-magnification images may be acquired.

In step SI3, it is determined whether or not to execute ghost display. For example, if the user selects "Execute ghost display" at the time of measurement setting, it is determined as YES in step SI3, the flow proceeds to step SI4, and the control section 3d executes the ghost display of the search region on the display section 4 to guide the workpiece W to be placed at an appropriate position on the stage 21. The ghost display is to display the search region set in advance at the time of measurement setting to be superimposed on the plan-view image, and, for example, to display the search region to be lighter than the plan-view image so as not to interfere with recognition of the plan-view image. If the user selects "Do not execute ghost display" at the time of measurement setting, it is determined as NO in step SI3, and the flow proceeds to step SI5. The ghost display may be executed on the connected image, the bird's-eye view image, or the like.

In step SI5, it is determined whether or not to designate the search region. That is, when the user designates the search region of the characteristic pattern at the time of measurement execution, it is determined as YES in step SI5, and the flow proceeds to step SI6. On the other hand, when the user does not designate the search region, the flow proceeds to step SI7. The search region is designated as the user performs an operation of surrounding a specific region by operating the mouse 6 or the like on any image among, for example, the plan-view image, the connected image, the bird's-eye view image, and the like. At this time, for example, when the bird's-eye view image acquired by capturing the entire workpiece W using the imaging section 50 (which may be the stage cameras 46 and 47 or the front camera 48) is displayed on the display section 4, the designation of the search region by the user on the bird's-eye view image displayed on the display section 4 can be received. Note that the search range can be more easily designated by using the imaging section 50 or the stage cameras 46 and 47 capturing an image from directly above than the front camera 48 capturing an image obliquely.

In step SI7, it is determined whether or not the measurement start button 2a has been pressed. Steps SI2 to SI7 are repeated until the measurement start button 2a is pressed, and the flow proceeds to step SI8 at a timing at which the measurement start button 2a is pressed. In step SI8, it is determined whether or not to display the bird's-eye view image on the display section 4. If the user selects "Display bird's-eye view image" at the time of measurement setting, it is determined as YES in step SI8, the flow proceeds to step SI9, and the control section 3d causes the display section 4 to display the bird's-eye view image captured by the front camera 48. If the user selects "Do not display bird's-eye view image" at the time of measurement setting, it is determined as NO in step SI8, and the flow proceeds to step SI10.

In step SI10, it is determined whether or not to generate a color image. If the user selects "Generate color image" at the time of measurement setting, it is determined as YES in step SI10, and the flow proceeds to step SI12. In step SI12, a color image of the workpiece W (a workpiece image newly generated for measurement) is generated by processing similar to that in step SC5 illustrated in FIG. 16. On the other hand, if the user selects "Do not generate color image" at the time of measurement setting, it is determined as NO in step SI10, and the flow proceeds to step SI11. In step SI11, a grayscale image (a workpiece image newly generated for measurement) of the workpiece W is generated by processing similar to that in step SC4 illustrated in FIG. 16.

Next, the flow proceeds to step SI13 in FIG. 29B. In step SI13, a pattern search target image is acquired. For example, the control section 3d can acquire the color image of the workpiece W newly generated for measurement in step SI11 or the grayscale image of the workpiece W newly generated for measurement in step SI12 as the pattern search target image. After acquiring the pattern search target image, the flow proceeds to step SI14, and the control section 3d specifies a position and a posture of a characteristic pattern from the workpiece image newly generated for measurement. At this time, when the search region is designated by the user in step SIG, the position and posture of the characteristic pattern are specified by narrowing down to the designated search region. As a result, a processing speed is improved.

Further, in a case where a connected image is set as the workpiece image, the control section 3*d* controls the XY-direction driving section 23 to move the stage 21 in the XY directions until the workpiece W enters the visual field range of the imaging section 50. When the workpiece W enters the visual field range, the imaging section 50 captures an image of the workpiece W that has entered the visual field range. Thereafter, the stage 21 is moved in the XY directions such that another part of the workpiece W enters the visual field range, and then, the imaging section 50 captures an image of the another part of the workpiece W that has entered the visual field range. The connected image obtained by connecting the plurality of images acquired in this manner is used as the workpiece image, and the position and posture of the characteristic pattern are specified from the connected image. In this case as well, when the search region is designated by the user, the position and posture of the characteristic pattern are specified by narrowing down to the designated search region.

Thereafter, the flow proceeds to step SI15. In step SI15, the control section 3*d* specifies the first contact target position P1 and the second contact target position P2 for measurement based on the relative positional relationship between the first and second contact target positions P1 and P2 with respect to the position and posture of the workpiece W and the characteristic pattern specified in step SI14, and the fixed positional relationship between the imaging section 50 and the touch probe 80. For example, when at least one of the position and the posture of the workpiece W based on the workpiece image newly generated at the time of measurement execution is different from the position or the posture of the workpiece W used at the time of measurement setting, the position or the posture of the workpiece W can be corrected based on the position and the posture of the workpiece W specified in step SI14. A position is specified by an X coordinate and a Y coordinate, and a posture is specified by a rotation angle around the X axis and a rotation angle around the Y axis. Correcting a position can be referred to as position correction, and correcting a posture can be referred to as posture correction, but these may be collectively referred to as position correction.

When the relative positional relationship between the first and second contact target positions P1 and P2 with respect to the characteristic pattern is used at the time of position correction, the first and second contact target positions P1 and P2 can be specified as positions similar to those at the time of measurement setting even after the correction.

Further, the control section 3*d* can execute a pattern search on the workpiece image newly generated for measurement by the imaging section 50 to specify an edge measurement element, extract an edge from the specified edge measurement element, and specify the first contact target position P1 and the second contact target position P2 based on the extracted edge. The third contact target position P3 and the fourth contact target position P4 illustrated in FIG. 21 can also be specified in the same manner. Since the fourth contact target position P4 is the position specified on the inclined surface S3, the fourth contact target position P4 can be specified using the tilt angle α of the inclined surface S3 at the time of specifying the fourth contact target position P4. Since the tilt angle α is known, the normal direction of the inclined surface S3 can be estimated. As a result, the fourth contact target position P4 can be specified as a position where the touch probe 80 is brought into contact with the inclined surface S3 of the workpiece W in the normal direction of the inclined surface S3.

After the contact target position is specified, the flow proceeds to step SI16. In step SI16, when there are a plurality of measurement sites, the order of the measurement sites is determined.

Steps SI17 to SI20 are the same as Steps SC7 to SC10 in the flowchart illustrated in FIG. 16. For example, when image measurement is performed in step SI18, the measurement is performed only within the measurement range received by the receiving section 3*e*. As a result, the measurement accuracy is improved.

Further, for example, in step SI19, the control section 3*d* controls the XY-direction driving section 23 such that the touch probe 80 comes into contact with the side surface of the workpiece W with the first contact target position P1 for measurement specified in step SI15 as a reference. Further, the control section 3*d* controls the Z-direction driving section 25 such that the touch probe 80 comes into contact with the upper surface of the workpiece W with the second contact target position P2 for measurement specified in step SI15 as a reference. At this time, the touch probe 80 is relatively moved along the scan line set at the time of measurement setting, and the number of measurement points, the start margin, the start position, the end position, the approach direction, and the like are reflected.

When the touch probe 80 is to be relatively moved with respect to the workpiece W, the control section 3*d* controls the Z-direction driving section 25 and the XY-direction driving section 23 such that the touch probe moves along the approach direction set in FIG. 23. At this time, a relative movement speed is set to a first speed until the touch probe 80 comes into contact with the workpiece W, and the touch probe 80 is returned from a contact position by a predetermined distance when the contact is detected. Thereafter, the touch probe 80 is relatively moved at a second speed lower than the first speed until coming into contact with the workpiece W, and a measurement result is output based on a contact position at the second speed. This enables precise measurement.

Further, when the touch probe 80 is to be brought into contact with the inclined surface of the workpiece W, the touch probe 80 is brought close to the inclined surface of the workpiece W at the first speed, and the relative movement speed is set to the second speed at a time point when a distance between the touch probe 80 and the inclined surface of the workpiece W becomes a predetermined distance. Then, a measurement result is output based on a contact position at the second speed.

Further, in step S1, the control section 3*d* reads the position of the measurement element on the workpiece image, the shape type or size of the measurement element, and the correspondence relationship between the shape type or size of the measurement element and the arrangement positions and the number of contact target positions of the touch probe 80 with respect to the measurement element. Therefore, the control section 3*d* can specify a plurality of contact target positions of the touch probe 80 based on the position of the measurement element on the workpiece image, the shape type or size of the measurement element, and the correspondence relationship, and control the XY-direction driving section 23 and the Z-direction driving section 25 such that the touch probe 80 sequentially moves to the plurality of specified contact target positions. Since the plurality of contact target positions of the touch probe 80 are automatically specified based on the information at the time of measurement setting, and the XY-direction driving section 23 and the Z-direction driving section 25 are automatically controlled in this manner, the measurement work by the user is simplified.

Figure 30:
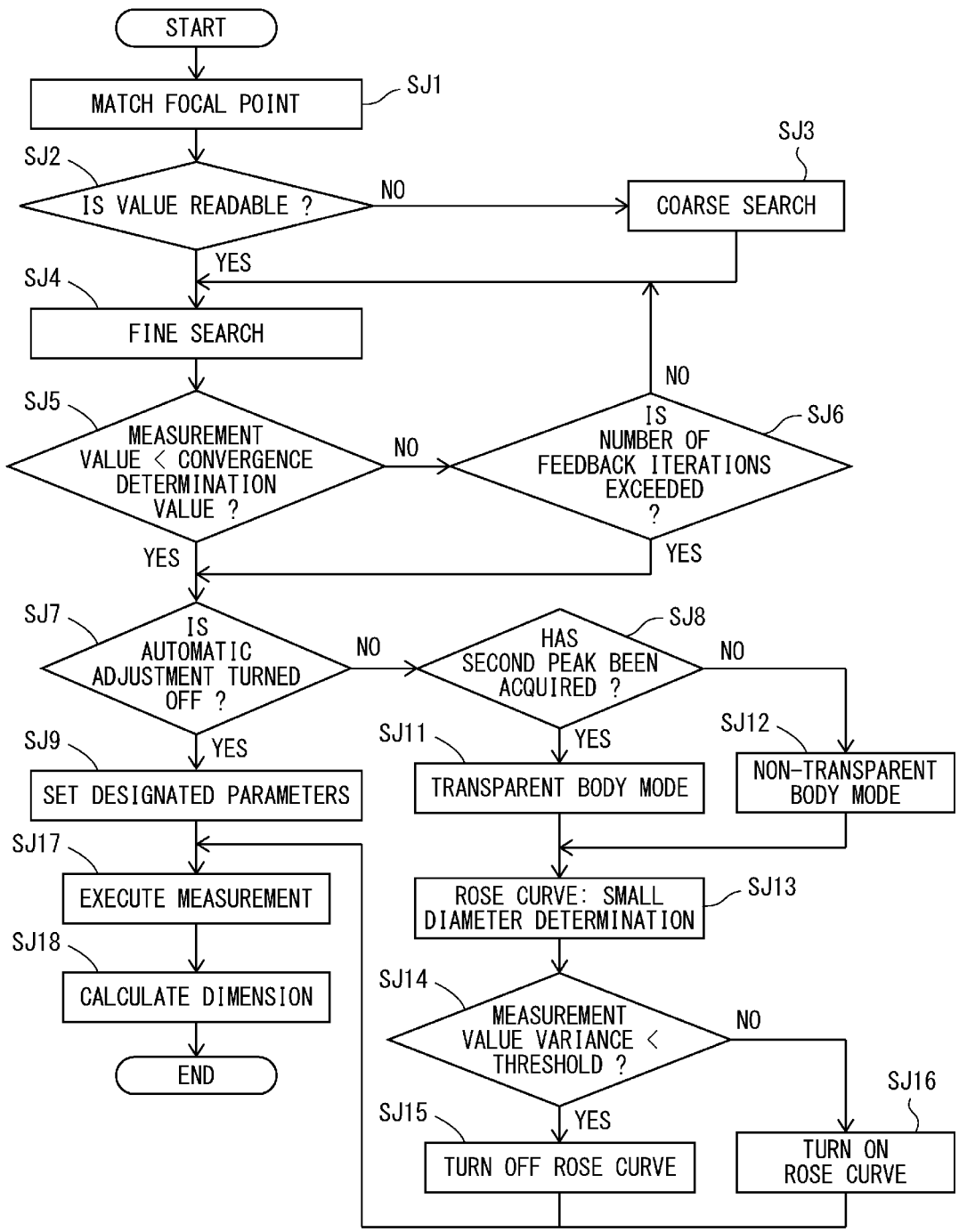
FIG. 30 is a flowchart illustrating an example of a procedure of non-contact measurement at the time of measurement execution.

In step SI20, non-contact height measurement using the non-contact displacement meter 70 is performed. At this time, there is a case where height measurement is performed a plurality of times by the non-contact displacement meter 70, and an averaging process of averaging a plurality of acquired height measurement values is executed. A specific example will be described with reference to a flowchart illustrated in FIG. 30.

In step SJ1 after the start, the control section 3d drives the Z-direction driving section 25 to move the measurement execution section 24 such that a focal point of the non-contact displacement meter 70 matches a measurement site. In step SJ2, it is determined whether or not a measurement value is readable by the non-contact displacement meter 70. When the measurement value is not readable, the flow proceeds to step SJ3 to perform a coarse search, that is, the measurement execution section 24 is moved to a position where the measurement value is readable by the non-contact displacement meter 70. When the measurement value is readable in step SJ2, the flow proceeds to step SJ3 to execute a refine search. In the refine search, the measurement execution section 24 is moved to perform focus adjustment such that the measurement value of the non-contact displacement meter 70 becomes approximately zero.

In step SJ5, it is determined whether or not the measurement value of the non-contact displacement meter 70 is less than a convergence determination value. The convergence determination value can be set to, for example, about 0.2 mm, but is not limited thereto. When it is determined as NO in step SJ5 and the measurement value of the non-contact displacement meter 70 is equal to or more than the convergence determination value, the flow proceeds to step SJ6 to determine whether or not the number of feedback iterations is exceeded. The number of feedback iterations can be set to, for example, five, but is not limited thereto. The flow proceeds to step SJ4 when the number of feedback iterations is not exceeded, and proceeds to step SJ7 when the number of feedback iterations is exceeded. In step SJ7, it is determined whether automatic adjustment is turned OFF. When the automatic adjustment is turned ON, the flow proceeds to step SJ8, and it is determined whether or not a second peak of a light reception waveform of the non-contact displacement meter 70 has been acquired. When the second peak has been acquired, the flow proceeds to step SJ11 to set a transparent body mode since the workpiece W is estimated to be a transparent body. When the second peak has not been acquired, the flow proceeds to step SJ12 to set a non-transparent body mode since the workpiece W is estimated to be a non-transparent body.

Thereafter, the flow proceeds to step SJ13. In step SJ13, a diameter of a rose curve, used in the averaging process of the measurement values, during scanning is set to a small diameter. In step SJ14, the control section 3d controls the stage 21 such that the focal point of the non-contact displacement meter 70 becomes a locus drawing the rose curve on the surface of the workpiece W. A figure formed by the rose curve in the averaging process is a point-symmetric and line-symmetric figure. The center of the rose curve is set as a measurement target point. The diameter of the rose curve may be selectable by the user from among predetermined values such as 0.25 mm, 0.5 mm, and 1 mm.

Whether or not to execute the averaging process may be selectable by the user. For example, it is also possible to adopt a configuration in which selection of execution or non-execution of the averaging process by the user is received on a user interface such that the averaging process is executed when the execution is selected, and the averaging process is not executed when the non-execution is selected.

In step SJ14, it is further determined whether or not a measurement value variance during scanning of the rose curve is smaller than an automatic adjustment threshold. The automatic adjustment threshold can be set to, for example, about 0.005 mm, but is not limited thereto. When the measurement value variance during the scanning of the rose curve is equal to or larger than the automatic adjustment threshold, the rose curve is set to ON (the averaging process is executed). On the other hand, when the measurement value variance during the scanning of the rose curve is smaller than the automatic adjustment threshold, the highly accurate measurement values can be acquired without executing the averaging process, and thus, the rose curve is set to OFF (the averaging process is not executed).

Next, the flow proceeds to step SJ17 to execute the measurement, and then, proceeds to step SJ18 to calculate a dimension. At the time of measurement execution, the scanning of the rose curve is executed to hold the measurement values at the plurality of points. During the dimension calculation, the averaging process of the measurement values at the plurality of points is executed to determine an output value.

After the measurement is executed as described above, the flow proceeds to step SI21 in FIG. 29B. In step SI21, it is determined whether or not the measurement has been completed for all the measurement sites. The flow proceeds to step SI17 when there remains a measurement site, and proceeds to steps SI22 and SI23 when the measurement has been completed for all the measurement sites. In steps SI22 and SI23, the measurement result is superimposed and displayed on the workpiece image as in steps SC12 and SC13 of the flowchart illustrated in FIG. 16.

In the measurement by the non-contact displacement meter 70, the control section 3d may execute an extraction process of extracting an edge measurement element to be used in image measurement on the workpiece image. When the edge measurement element is successfully extracted in this extraction process, the control section 3d executes the image measurement and the height measurement by the non-contact displacement meter 70.

Further, in the measurement by the non-contact displacement meter 70, the control section 3d may move the stage 21 in a direction orthogonal to the imaging axis of the imaging section 50 such that the focal point of the non-contact displacement meter 70 coincides with the measurement site, then execute the height measurement by the non-contact displacement meter 70 to determine whether or not the height measurement value is acquired, and control the Z-direction driving section 25 to move the non-contact displacement meter 70 along the imaging axis until the height measurement value is acquired in a case where the height measurement value is not acquired. Therefore, the non-contact displacement meter 70 is moved in the imaging-axis direction together with the imaging section 50 by using the Z-direction driving section 25 that adjusts the focal position of the imaging section 50, and thus, it is possible to shorten a measurement time in a case where highly accurate height measurement is performed using the non-contact displacement meter 70.

(Indicator)

As illustrated in FIG. 6, the apparatus body 2 is provided with an indicator 2c. The indicator 2c is provided on a surface of the apparatus body 2 facing the user, and is controlled by the control unit 3. The indicator 2c indicates the above-described measurement result, and includes, for example, a light emitting section, a display section, and the like. The control unit 3 controls the indicator 2c such that display differs between a case where the measurement result satisfies a predetermined condition and a case where the measurement result does not satisfy the predetermined condition. The predetermined condition is set in advance by the user and stored in the storage section 7 or the like. For example, red or the like is displayed as defective if the measurement result is equal to or more than a certain value, and green or the like is displayed as non-defective the measurement result is less than the certain value.

(Modified Examples)

Figure 31:
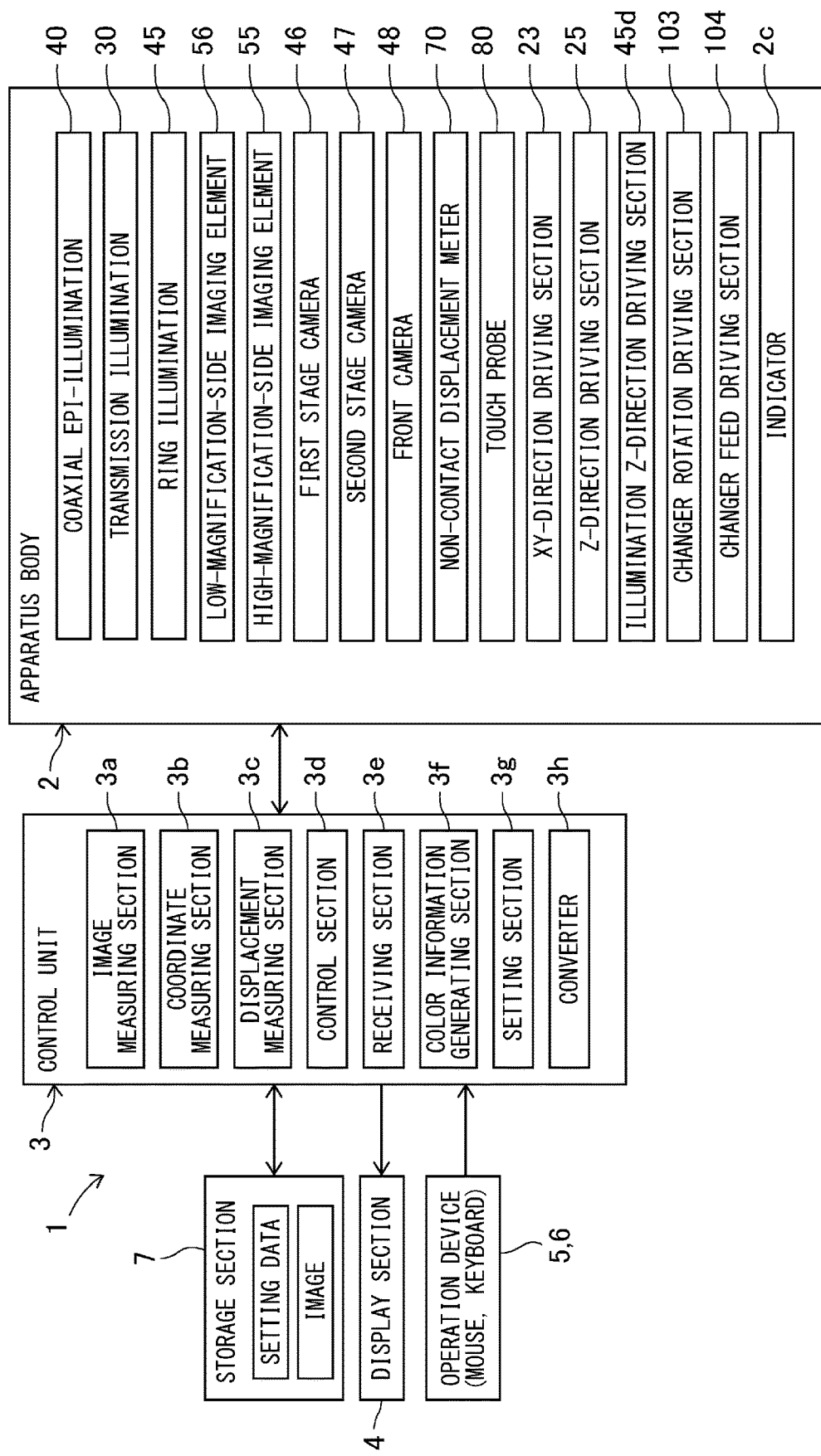
FIG. 31 is a diagram corresponding to FIG. 6 according to a first modified example including a three-channel imaging element.

FIG. 31 illustrates a first modified example in which the high-magnification-side imaging element 55 and the low-magnification-side imaging element 56 of the imaging section 50 are three-channel imaging elements. That is, since the high-magnification-side imaging element 55 and the low-magnification-side imaging element 56 are configured using three-channel imaging elements including RGB, the ring illumination 45 can generate a color workpiece image by projecting only one color of white light.

In the first modified example, the control unit 3 includes a converter 3h. The converter 3h is a part that converts a color workpiece image generated by the imaging section 50 into a grayscale workpiece image, and this conversion can be performed by a conventionally known technique. The image measuring section 3a is configured to measure a dimension of the workpiece W based on the grayscale workpiece image converted by the converter 3h.

Further, the color information generating section 3f generates color information of the workpiece W based on the color workpiece image generated by the imaging section 50. The control section 3d generates a color image obtained by adding the color information of the workpiece W generated by the color information generating section 3f to the grayscale workpiece image converted by the converter 3h. As a result, the display section 4 can display the color image, obtained by adding the color information of the workpiece generated by the color information generating section 3f to the grayscale workpiece image converted by the converter 3h, and display a result of the dimension measurement obtained by the image measuring section 3a on the color image in a superimposed manner.

Figure 32:
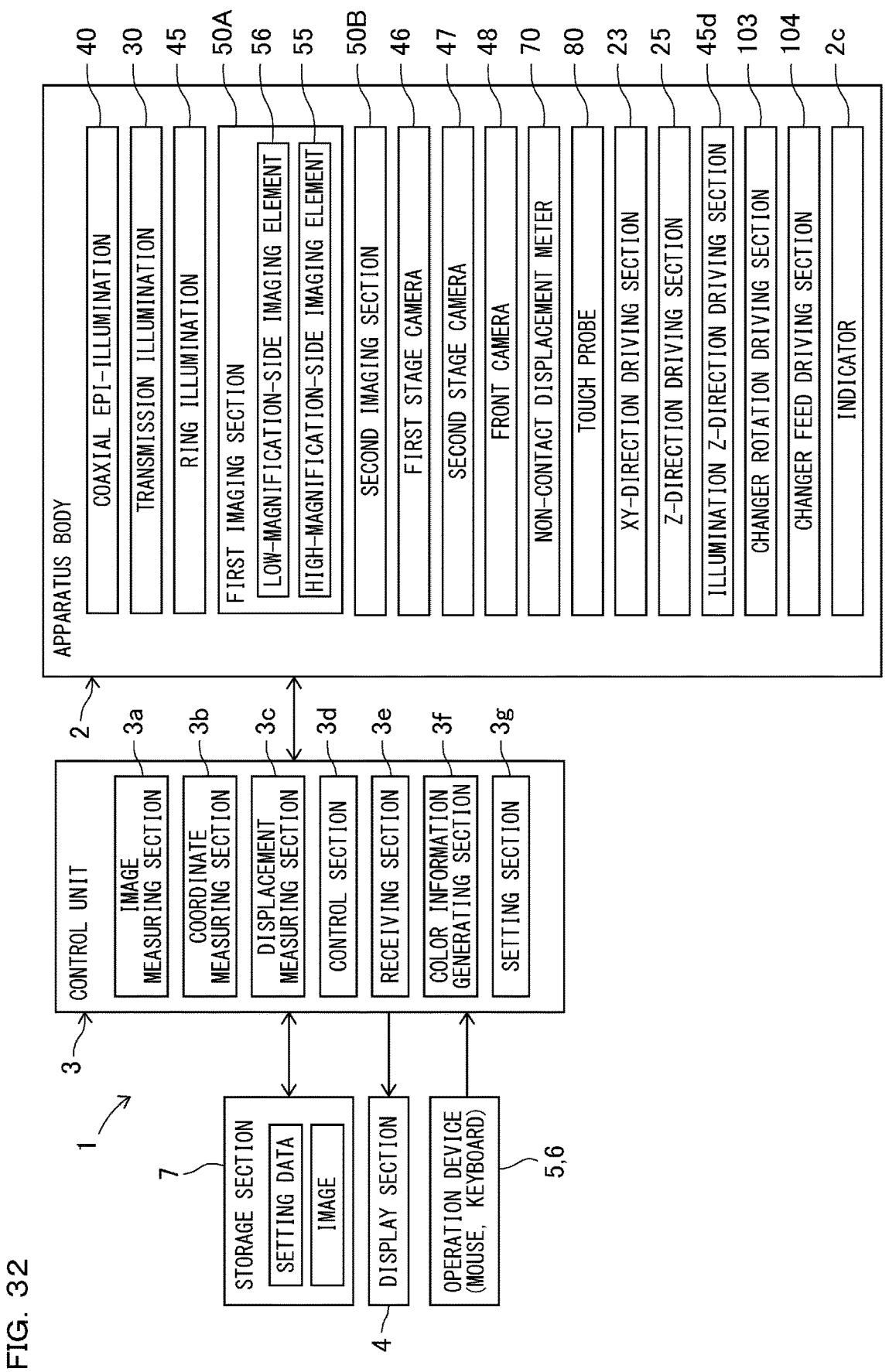
FIG. 32 is a diagram corresponding to FIG. 6 according to a second modified example including a single-channel imaging element and a three-channel imaging element.

Next, a second modified example illustrated in FIG. 32 will be described. The second modified example includes: a first imaging section 50A that includes a single-channel imaging element and receives detection light to generate a grayscale workpiece image; and a second imaging section 50B that includes a three-channel imaging element including RGB and receives detection light to generate a color workpiece image. The first imaging section 50A includes the single-channel high-magnification-side imaging element 55 and the single-channel low-magnification-side imaging element 56. The image measuring section 3a is configured to measure a dimension of the workpiece W based on the workpiece image generated by the first imaging section 50A.

The color information generating section 3f generates color information of the workpiece W based on a workpiece image generated by the second imaging section 50B. The control section 3d generates a color image obtained by adding the color information of the workpiece W generated by the color information generating section 3f to the grayscale workpiece image generated by the first imaging section 50A. The display section 4 displays the color image generated by the control section 3d and superimposes and displays a result of the dimension measurement in the image measuring section 3a on the color image.

The above-described embodiment is merely an example in all respects, and should not be construed as limiting. Further, all modifications and changes belonging to the equivalent range of the claims fall within the scope of the present invention.

As described above, the disclosure can be used to measure the three-dimensional coordinates of the workpiece placed on the stage.

What is claimed is:

1. An image measurement apparatus comprising:
   a stage on which a workpiece is placed;
   a light projecting section which irradiates the workpiece on the stage with detection light;
   an imaging section which receives the detection light and generates a workpiece image;
   a touch probe which outputs a contact signal when the touch probe comes into contact with the workpiece on the stage;
   a driving section which moves at least one of the stage and the touch probe with respect to another to bring the touch probe into contact with the workpiece placed on the stage;
   a display section which displays the workpiece image generated by the imaging section during measurement setting;
   a setting section which sets, on the workpiece image displayed on the display section, a first contact target position serving as a reference for bringing the touch probe into contact with a side surface of the workpiece in XY directions, a second contact target position serving as a reference for bringing the touch probe into contact with an upper surface of the workpiece in a Z direction, and a characteristic pattern for specifying a position and a posture of the workpiece during measurement execution in association with each other when a direction of an imaging axis of the imaging section is defined as a Z axis, a direction orthogonal to the Z axis is defined as an X axis, and a direction orthogonal to the Z axis and orthogonal to the X axis is defined as a Y axis;
   a storage section which stores the characteristic pattern set by the setting section, a relative positional relationship between the first and second contact target positions with respect to the characteristic pattern, and a fixed positional relationship between the imaging section and the touch probe;
   a control section which specifies a position and a posture of the characteristic pattern stored in the storage section from a workpiece image newly generated for measurement by the imaging section during the measurement execution, specifies first and second contact target positions for measurement based on the specified position and posture, and the relative positional relationship and the fixed positional relationship stored in the storage section, controls the driving section to bring the touch probe into contact with the side surface of the workpiece with the specified first contact target position for measurement as a reference, and controls the driving section to bring the touch probe into contact with the upper surface of the workpiece with the specified second contact target position for measurement as a reference; and
   a measuring section which measures three-dimensional coordinates of a contact point at which the touch probe comes into contact with the workpiece based on the contact signal output when the touch probe comes into contact with the workpiece by an operation of the driving section controlled by the control section.

2. The image measurement apparatus according to claim 1, wherein the setting section sets the first and second contact target positions in association with an edge measurement element extracted on the workpiece image and used in image measurement.

3. The image measurement apparatus according to claim 2, wherein the control section executes a pattern search on the workpiece image newly generated for measurement by the imaging section to specify the edge measurement element, extracts an edge from the specified edge measurement element, and specifies the first contact target position based on the extracted edge.

4. The image measurement apparatus according to claim 1, wherein
the setting section sets a position in the XY directions on the workpiece image when the setting section sets the first contact target position, and also sets a height position in the Z direction of the first contact target position, and
the control section controls the driving section to bring the touch probe into contact with the side surface of the workpiece with a position in the XY directions and a position in the Z direction of the specified first contact target position for measurement as references.

5. The image measurement apparatus according to claim 1, wherein the setting section sets path information for causing the touch probe to approach the workpiece from an operation start position included in the first contact target position.

6. The image measurement apparatus according to claim 1, further comprising:
a base which supports the stage to be movable in a horizontal direction; and
a support section which is connected to the base and supports the imaging section above the stage,
wherein the setting section sets the first and second contact target positions based on absolute coordinates in a three-dimensional space surrounded by the stage, the support section, and the imaging section.

7. The image measurement apparatus according to claim 1, wherein the control section controls the driving section to move the stage in the XY directions until the workpiece enters a visual field range of the imaging section, controls the imaging section to capture an image of the workpiece entering the visual field range when the workpiece enters the visual field range, moves the stage in the XY directions to make another part of the workpiece enter the visual field range, then controls the imaging section to capture an image of the workpiece entering the visual field range, sets a connected image obtained by connecting a plurality of the acquired images as the workpiece image, and specifies the position and the posture of the characteristic pattern from the workpiece image.

8. The image measurement apparatus according to claim 1, wherein the control section causes the display section to display a bird's-eye view image, acquired by capturing a whole of the workpiece using the imaging section or another imaging section, during the measurement execution, receives designation of a search region performed by a user on the bird's-eye view image displayed on the display section, and specifies the position and the posture of the characteristic pattern by narrowing down to the search region designated by the user.

9. The image measurement apparatus according to claim 1, wherein the control section causes the display section to display an image acquired by capturing the workpiece using the imaging section or another imaging section during the measurement execution, and performs ghost display of a preset search region on the display section to guide the workpiece to be placed at an appropriate position on the stage.

10. The image measurement apparatus according to claim 1, wherein
the setting section sets another contact target position serving as a reference for bringing the touch probe into contact with an inclined surface of the workpiece in a direction inclined with respect to the Z axis in association with the characteristic pattern,
the storage section stores a relative positional relationship of the other contact target position with respect to the characteristic pattern, and
the control section specifies another contact target position for measurement based on the specified position and posture, and the relative positional relationship and the fixed positional relationship stored in the storage section, and controls the driving section to bring the touch probe into contact with the inclined surface of the workpiece with the specified other contact target position for measurement as a reference.

11. An image measurement apparatus comprising:
a stage on which a workpiece is placed;
a light projecting section which irradiates the workpiece on the stage with detection light;
an imaging section which receives the detection light and generates a workpiece image;
a touch probe which outputs a contact signal when the touch probe comes into contact with the workpiece on the stage;
a driving section which moves at least one of the stage and the touch probe with respect to another to bring the touch probe into contact with the workpiece placed on the stage;
a display section which displays the workpiece image generated by the imaging section;
a setting section which sets, on the workpiece image displayed on the display section, an edge measurement element from which an edge of a side surface of the workpiece is to be extracted, a first contact target position serving as a reference for bringing the touch probe into contact with the side surface of the workpiece in XY directions, and a characteristic pattern for specifying a position and a posture of the workpiece;
a control section which searches for the position and posture of the characteristic pattern set by the setting section from a workpiece image newly generated for measurement by the imaging section to specify the edge measurement element, extracts the edge from the specified edge measurement element, specifies the first contact target position based on the extracted edge, and controls the driving section to bring the touch probe into contact with the side surface of the workpiece with the specified first contact target position as the reference; and
a measuring section which measures three-dimensional coordinates of a contact point at which the touch probe comes into contact with the workpiece based on a contact signal output when the touch probe comes into contact with the workpiece by an operation of the driving section controlled by the control section.

12. The image measurement apparatus according to claim 11, wherein the setting section sets a scan line which is path information for causing the touch probe to approach the workpiece from an operation start position included in the first contact target position.

13. The image measurement apparatus according to claim 12, wherein the setting section is capable of setting any distance from an edge position of the side surface of the workpiece in a horizontal direction that a start position of the scan line is to have, and is capable of setting any distance from the edge position of the side surface of the workpiece inward a cross section of the workpiece that an end position of the scan line is to have.

14. The image measurement apparatus according to claim 11, wherein the setting section is capable of setting a number of the first contact target positions to be arranged, and is capable of setting a position of the first contact target position in the XY directions by moving the first contact target position displayed on the display section on the workpiece image.

15. An image measurement apparatus comprising:
a stage on which a workpiece is placed;
a light projecting section which irradiates the workpiece on the stage with detection light;
an imaging section which receives the detection light and generates a workpiece image;
a touch probe which outputs a contact signal when the touch probe comes into contact with the workpiece on the stage;
a driving section which moves at least one of the stage and the touch probe with respect to another to bring the touch probe into contact with the workpiece placed on the stage;
a display section which displays the workpiece image generated by the imaging section during measurement setting;
a setting section capable of setting, on the workpiece image displayed on the display section, a first contact target position serving as a reference for bringing the touch probe into contact with a straight edge element of a side surface of the workpiece in XY directions, a second contact target position serving as a reference for bringing the touch probe into contact with an upper surface of the workpiece in a Z direction, a third contact target position serving as a reference for bringing the touch probe into contact with an arcuate edge element of the side surface of the workpiece in the XY directions, a fourth contact target position serving as a reference for bringing the touch probe into contact with an inclined surface of the workpiece in a normal direction of the inclined surface, and a characteristic pattern for specifying a position and a posture of the workpiece when a direction of an imaging axis of the imaging section is defined as a Z axis, a direction orthogonal to the Z axis is defined as an X axis, and a direction orthogonal to the Z axis and orthogonal to the X axis is defined as a Y axis;
a control section which specifies a position and a posture of the characteristic pattern from a workpiece image newly generated for measurement by the imaging section, specifies first, second, third, and fourth contact target positions for measurement based on the specified position and posture, controls the driving section to bring the touch probe into contact with the side surface of the workpiece with the specified first and third contact target positions for measurement as references, controls the driving section to bring the touch probe into contact with the upper surface of the workpiece with the specified second contact target position for measurement as a reference, and controls the driving section to bring the touch probe into contact with the inclined surface of the workpiece with the specified fourth contact target position for measurement as a reference; and
a measuring section which measures three-dimensional coordinates of a contact point at which the touch probe comes into contact with the workpiece based on the contact signal output when the touch probe comes into contact with the workpiece by an operation of the driving section controlled by the control section.

* * * * *